US012527845B2

(12) United States Patent
Gerring et al.

(10) Patent No.: US 12,527,845 B2
(45) Date of Patent: Jan. 20, 2026

(54) FORMULATIONS

(71) Applicant: Arecor Limited, Saffron Walden (GB)

(72) Inventors: David Gerring, Saffron Walden (GB); Sarah Howell, Saffron Walden (GB); Jan Jezek, Saffron Walden (GB); Leon Zakrzewski, Saffron Walden (GB)

(73) Assignee: Arecor Limited, Saffron Walden (GB)

( * ) Notice: Subject to any disclaimer, the term of this patent is extended or adjusted under 35 U.S.C. 154(b) by 227 days.

(21) Appl. No.: 16/337,706

(22) PCT Filed: Sep. 29, 2017

(86) PCT No.: PCT/GB2017/052940

§ 371 (c)(1),
(2) Date: Mar. 28, 2019

(87) PCT Pub. No.: WO2018/060735

PCT Pub. Date: Apr. 5, 2018

(65) Prior Publication Data

US 2019/0290737 A1 Sep. 26, 2019

(30) Foreign Application Priority Data

Sep. 29, 2016 (GB) ..................................... 1616509
Oct. 21, 2016 (GB) ..................................... 1617866
May 5, 2017 (GB) ..................................... 1707190

(51) Int. Cl.

| | |
|---|---|
| ***A61K 38/28*** | (2006.01) |
| ***A61K 9/00*** | (2006.01) |
| ***A61K 9/08*** | (2006.01) |
| ***A61K 31/194*** | (2006.01) |
| ***A61K 33/30*** | (2006.01) |
| ***A61K 38/06*** | (2006.01) |
| ***A61K 47/02*** | (2006.01) |
| ***A61K 47/10*** | (2017.01) |
| ***A61K 47/12*** | (2006.01) |
| ***A61K 47/18*** | (2017.01) |
| ***A61K 47/26*** | (2006.01) |
| ***A61K 47/34*** | (2017.01) |
| ***A61M 5/142*** | (2006.01) |
| ***A61M 5/315*** | (2006.01) |
| ***A61M 5/32*** | (2006.01) |

(52) U.S. Cl.

CPC ............ *A61K 38/28* (2013.01); *A61K 9/0019* (2013.01); *A61K 9/08* (2013.01); *A61K 31/194* (2013.01); *A61K 33/30* (2013.01); *A61K 38/063* (2013.01); *A61K 47/02* (2013.01); *A61K 47/10* (2013.01); *A61K 47/12* (2013.01); *A61K 47/18* (2013.01); *A61K 47/26* (2013.01); *A61K 47/34* (2013.01); *A61M 5/142* (2013.01); *A61M 5/31591* (2013.01); *A61M 5/31593* (2013.01); *A61M 5/32* (2013.01)

(58) Field of Classification Search

CPC ........ A61K 38/28; A61K 9/0019; A61K 9/08; A61K 31/194; A61K 33/30; A61K 38/063; A61K 47/02; A61K 47/10; A61K 47/12; A61K 47/18; A61K 47/26; A61K 47/34; A61K 45/06; A61K 2300/00; A61M 5/142; A61M 5/31591; A61M 5/31593; A61M 5/32; A61P 3/10; A61P 5/50; A61P 43/00

See application file for complete search history.

(56) References Cited

U.S. PATENT DOCUMENTS

| | | | | |
|---|---|---|---|---|
| 4,476,118 | A | 10/1984 | Brange et al. | |
| 5,866,538 | A | 2/1999 | Norup et al. | |
| 6,960,561 | B2 | 11/2005 | Boderke | |
| 7,205,276 | B2 | 4/2007 | Boderke | |
| 7,279,457 | B2 | 10/2007 | Pohl et al. | |
| 7,452,860 | B2 | 11/2008 | Boderke | |
| 7,476,652 | B2 | 1/2009 | Brunner-Schwarz et al. | |
| 7,696,162 | B2 | 4/2010 | Boderke | |
| 7,998,927 | B2 | 8/2011 | Maggio | |
| 8,318,154 | B2 | 11/2012 | Frost et al. | |
| 8,324,157 | B2 | 12/2012 | Olsen et al. | |
| 8,772,231 | B2 | 7/2014 | Maggio | |
| 11,278,624 | B2 * | 3/2022 | Gerring | A61K 9/0019 |
| 2005/0214251 | A1 | 9/2005 | Pohl et al. | |
| 2008/0039365 | A1 | 2/2008 | Steiner et al. | |

(Continued)

FOREIGN PATENT DOCUMENTS

| | | | |
|---|---|---|---|
| EP | 0214826 | A2 | 3/1987 |
| EP | 0375437 | A2 | 6/1990 |

(Continued)

OTHER PUBLICATIONS

Website: https://www.accessdata.fda.gov/drugsatfda_docs/label/2011/018780s120lbl.pdf, 27 pages, 2011 (Year: 2011).*

(Continued)

*Primary Examiner* — Sudhakar Katakam

(74) *Attorney, Agent, or Firm* — Nixon & Vanderhye P.C.

(57) ABSTRACT

There is provided inter alia an aqueous liquid pharmaceutical formulation comprising (i) an insulin compound, (ii) ionic zinc, (iii) a zinc binding species at a concentration of 1 mM or more selected from species having a log K with respect to zinc ion binding in the range 4.5-12.3 at 25° C., and (iv) a non-ionic surfactant which is an alkyl glycoside; and wherein the formulation is substantially free of EDTA and any other zinc binding species having a log K with respect to zinc ion binding of more than 12.3 at 25° C.

51 Claims, 3 Drawing Sheets

Figure 1:
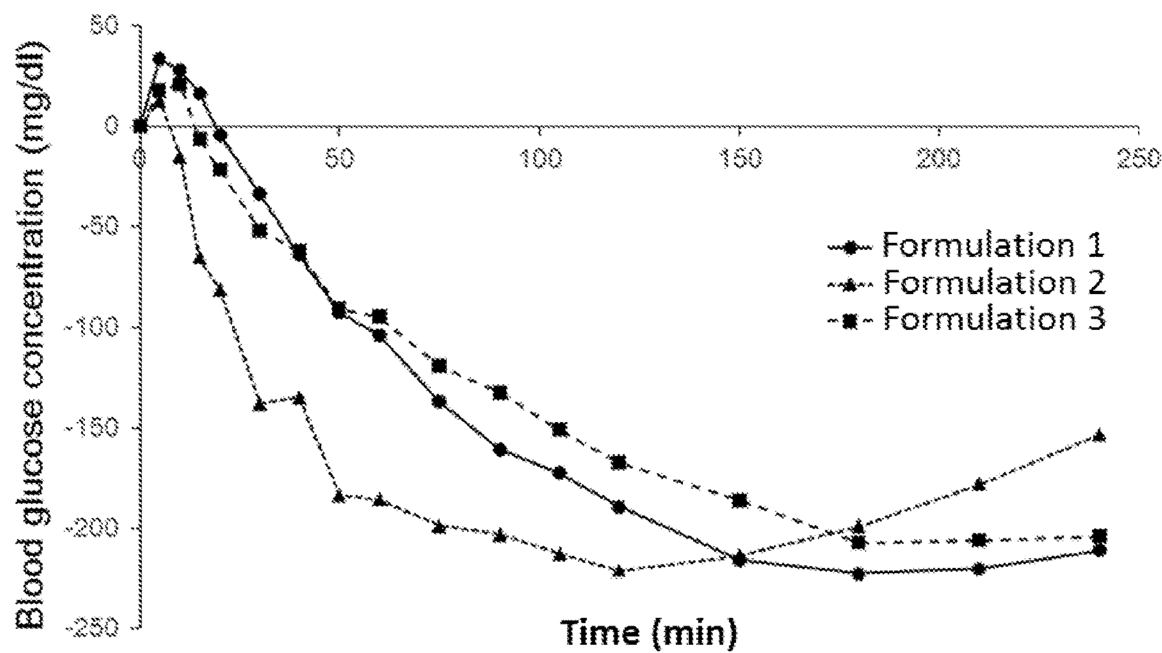

Specification includes a Sequence Listing.

(56) References Cited

U.S. PATENT DOCUMENTS

2008/0194461 A1 8/2008 Maggio
2008/0268032 A1 10/2008 Maggio
2009/0011976 A1 1/2009 Ludvigsen et al.
2009/0137455 A1 5/2009 Steiner et al.
2010/0210506 A1 8/2010 Quay et al.
2010/0227795 A1 9/2010 Steiner et al.
2012/0035103 A1* 2/2012 Pillon et al. ........... A61K 38/28 514/6.3
2012/0178675 A1 7/2012 Pohl et al.
2013/0231281 A1 9/2013 Adocia
2013/0302275 A1 11/2013 Wei et al.
2013/0331320 A1 12/2013 Havelund et al.
2014/0024582 A1 1/2014 Yang
2014/0135263 A1 5/2014 Pohl et al.
2014/0142034 A1 5/2014 Adocia
2014/0221285 A1 8/2014 Bley et al.
2014/0357554 A1 12/2014 Pohl et al.
2015/0190475 A1 7/2015 Sanofi
2015/0265683 A1 9/2015 Sahib et al.
2015/0273022 A1 10/2015 Wilson et al.
2016/0015814 A1 1/2016 Adocia
2016/0082106 A1 3/2016 Adocia
2016/0166695 A1* 6/2016 Akers et al. ........... A61K 47/12 514/5.9
2018/0078645 A1 3/2018 Gerring et al.

FOREIGN PATENT DOCUMENTS

EP 0678522 A1 10/1995
EP 1283051 A1 2/2003
EP 1381385 B1 1/2004
EP 1740154 B1 1/2007
EP 2106790 B1 10/2009
EP 2289539 B1 3/2011
EP 2319500 B1 5/2011
EP 2340033 B1 7/2011
JP 58-192818 A 11/1983
JP 2012-531431 A 12/2012
WO WO 9109617 A1 7/1991
WO WO 9610417 A1 4/1996
WO WO 9717945 A2 5/1997
WO WO 9934821 A1 7/1999
WO WO 02076495 A1 10/2002
WO WO 2005089722 A1 9/2005
WO WO 2007041481 A1 4/2007
WO WO 2007121256 A2 10/2007
WO WO-2007149096 A1 * 12/2007 ........... A61K 9/0019
WO WO 2008084237 A2 7/2008
WO WO 2010102020 A1 9/2010
WO WO 2010115819 A1 10/2010
WO 2010/151703 A1 12/2010
WO WO-2010149772 A1 * 12/2010 ................ A61P 3/10
WO WO 2011094632 A1 8/2011
WO WO 2012006283 A1 1/2012
WO WO 2013021143 A1 2/2013
WO WO 2013158618 A1 10/2013
WO WO 2013186138 A1 12/2013
WO WO 2014096985 A2 6/2014
WO WO 2015059302 A1 4/2015
WO WO 2015114374 A1 8/2015
WO WO 2015120457 A1 8/2015
WO WO 2015171484 A1 11/2015
WO WO 2016100042 A1 6/2016
WO WO 2017034956 A1 3/2017
WO WO 2017191464 A1 11/2017
WO WO 2018060736 A1 4/2018
WO WO 2018060735 A1 5/2018
WO WO 2018203059 A1 11/2018
WO WO 2018203060 A2 11/2018
WO WO 2018203061 A1 11/2018
WO WO 2019193349 A1 10/2019
WO WO 2019193351 A1 10/2019
WO WO 2019193353 A1 10/2019

OTHER PUBLICATIONS

Maggio (J.Excipients and Food Chem., 2012, 3(2), 45-53) (Year: 2012).*

De la Peña et al., "Pharmacokinetics and Pharmacodynamics of High-Dose Human Regular U-500 Insulin Versus Human Regular U-100 Insulin in Healthy Obese Subjects," Diabetes Care, 2011, vol. 34, pp. 2496-2501.

5.0 European Pharmacopoeia Monograph (Insulin, Human, pp. 1800-1802). 2005.

2.9.20. European Pharmacopoeia Monograph (Particulate Contamination: Visible Particles, p. 302), 2008.

Lougheed et al., "Physical stability of insulin formulations," Diabetes, American Diabetes Association, 1983, vol. 32, No. 5, pp. 424-432.

Cooper, "Therapeutic potential of copper chelation with triethylenetetramine in managing diabetes mellitus and Alzheimer's disease," Medline, US National Library of Medicine, XP002774649, Jul. 9, 2011.

Pohl et al., "Ultra-Rapid Absorption of Recombinant Human Insulin Induced by Zinc Chelation and Surface Charge Masking," Journal of Diabetes Science and Technology, 2012, vol. 6, No. 4, pp. 755-763.

Steiner et al., "A novel insulin formulation with a more rapid onset of action," Diabetologia; Clinical & Experimental Diabetes & Metabolism, 2008, vol. 51, No. 9, pp. 1602-1606.

Pillai et al., "Transdermal iontophoresis of insulin II. Physicochemical considerations," International Journal of Pharmaceutics, 2003, vol. 254, pp. 271-280.

Liu et al., "Insulin Aggregation in Aqueous Media and Its Effect on Alpha-Chymotrypsin-Mediated Proteolytic Degradation," Pharmaceutical Research, 1991, vol. 8, No. 7, pp. 925-929.

Prabhu et al., "A study of factors controlling dissolution kinetics of zinc complexed protein suspensions in various ionic species," International Journal of Pharmaceutics, 2001, vol. 217, pp. 71-78.

Arnebrant et al., "Adsorption of Insulin on Metal Surfaces in Relation to Association Behavior," Journal of Colloid and Interface Science, 1988, vol. 122, No. 2, pp. 557-566.

Okada et al., "Vaginal Absorption of a Potent Luteinizing Hormone-Releasing Hormone Analogue (Leuprolide) in Rats II: Mechanism of Absorption Enhancement with Organic Acids," Journal of Pharmaceutical Sciences, 1983, vol. 72, No. 1, pp. 75-78.

Moghaddam et al., "Evaluation of Insulin Stability in the Presence of Nonionic Surface Active Agents (Polysorbate Groups) by Circular Dichroism and Fluorescence Spectroscopy," 2015, Asian Journal of Biochemistry, vol. 10, No. 1, pp. 17-30.

Lilly USA, LLC, "Information for the Physician Humulin® R Regular Insulin Human Injection, USP, (rDNA Origin) 100 Units Per ML (U-100)", Retrieved from the Internet: https://www.accessdata.fda.gov/drugsatfda_docs/label/2011/018780s1201bl.pdf Mar. 31, 2011 (Mar. 31, 2011) Reference ID: 2923994, 27 pages.

* cited by examiner

FORMULATIONS

CROSS-REFERENCE TO RELATED APPLICATIONS

This application is a U.S. National Phase of PCT Application No. PCT/GB2017/052940, filed Sep. 29, 2017, which claims the benefit of Great Britain Patent Application No. 1616509.4, filed Sep. 29, 2016, Great Britain Patent Application No. 1617866.7, filed Oct. 21, 2016, and Great Britain Patent Application 1707190.3, filed May 5, 2017, each of which is incorporated herein by reference in its entirety.

REFERENCE TO SEQUENCE LISTING SUBMITTED ELECTRONICALLY

The content of the electronically submitted sequence listing (Name: (6662_0400_Sequence Listing.txt; Size: 2,044 bytes; and Date of Creation: Mar. 26, 2019) filed with the application is incorporated herein by reference in its entirety.

FIELD OF THE INVENTION

This invention relates inter alia to rapid acting aqueous liquid formulations of insulin and insulin analogues. Such compositions are suitable for the treatment of subjects suffering from diabetes mellitus, especially Type I diabetes mellitus.

BACKGROUND OF THE INVENTION

Diabetes mellitus ("diabetes") is a metabolic disorder associated with poor control of blood sugar.

Furthermore, there is a need to provide formulations of higher concentration of insulin compound, wherein the speed of onset of action of the insulin compound is maintained.

SUMMARY OF THE INVENTION

According to the invention there is provided an aqueous liquid pharmaceutical formulation comprising (i) an insulin compound, (ii) ionic zinc, (iii) a zinc binding species at a concentration of 1 mM or more selected from species having a log K with respect to zinc ion binding in the range 4.5-12.3 at 25° C., and (iv) a non-ionic surfactant which is an alkyl glycoside; and wherein the formulation is substantially free of EDTA and any other zinc binding species having a log K with respect to zinc ion binding of more than 12.3 at 25° C. ("the formulation of the invention"). In some embodiments, the alkyl glycoside is dodecyl maltoside. In further embodiments, the zinc binding species is citrate.

The formulations of the invention provide insulin in a form which is rapid or ultra-rapid acting with good physical and chemical stability. As noted in the background discussion above, use of EDTA to chelate zinc ions in hexameric insulin does increase the rapidity of action but at the cost of greatly reduced stability. Without being limited by theory, the present inventors have appreciated that the use of zinc together with species which bind zinc less strongly can achieve similar effects in terms of speed of action and their moderately destabilising effects can be reduced or eliminated by using a non-ionic surfactant which is an alkyl glycoside.

Formulations of the invention may be used in the treatment of subjects suffering from diabetes mellitus, particularly Type 1 diabetes mellitus especially for administration at meal times.

As can be seen from the accompanying examples, formulations of the invention are significantly more stable than corresponding formulations without non-ionic surfactant. The formulations achieve a rapid speed of action of insulin and are more stable than prior art rapid acting insulin formulations containing EDTA.

DESCRIPTION OF THE SEQUENCE LISTING

SEQ ID NO: 1: A chain of human insulin

SEQ ID NO: 2: B chain of human insulin

SEQ ID NO: 3: B chain of insulin lispro

SEQ ID NO: 4: B chain of insulin aspart

SEQ ID NO: 5: B chain of insulin glulisine

FIGURES

FIG. 1. Pharmacodynamic profiles of Formulations 1-3 of Example 4 in a validated diabetic Yucatan miniature pig model.

Figure 2:
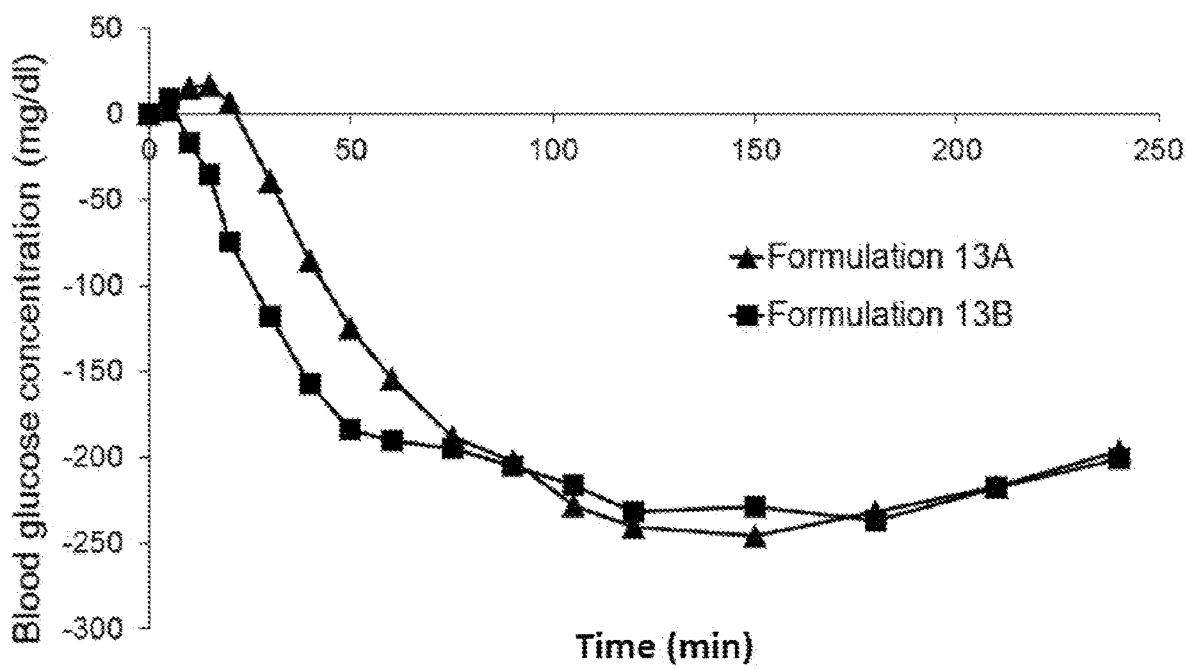

FIG. 2. Pharmacodynamic profile of Formulations 13A and 13B of Example 13 in a validated diabetic Yucatan miniature pig model.

Figure 3:
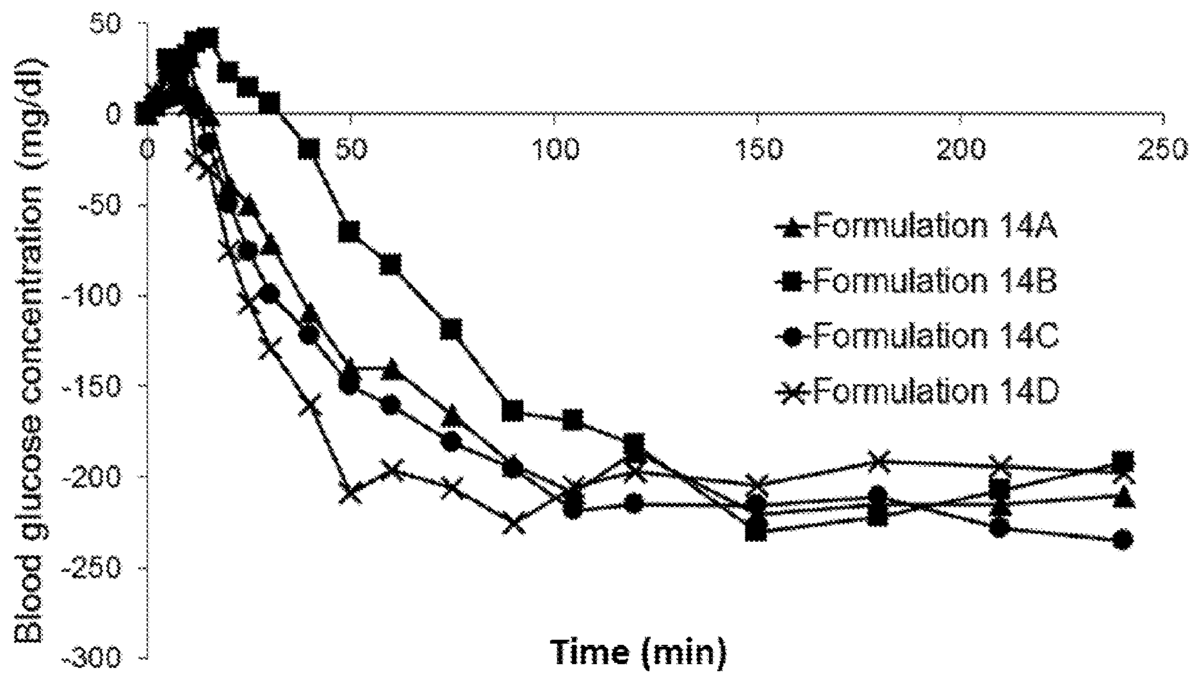

FIG. 3. Pharmacodynamic profiles of formulations 14A-14D of Example 14 in a validated diabetic Yucatan miniature pig model.

Figure 4:
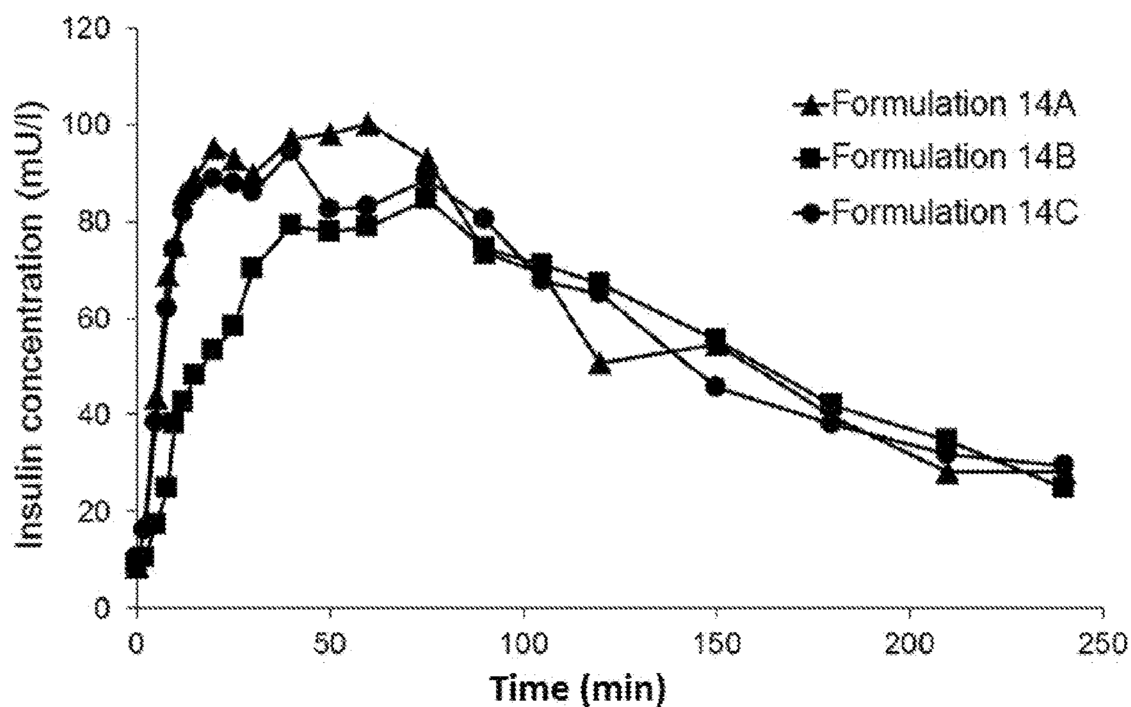

FIG. 4. Pharmacokinetic profiles of formulations 14A-14C of Example 14 in a validated diabetic Yucatan miniature pig model.

Figure 5:
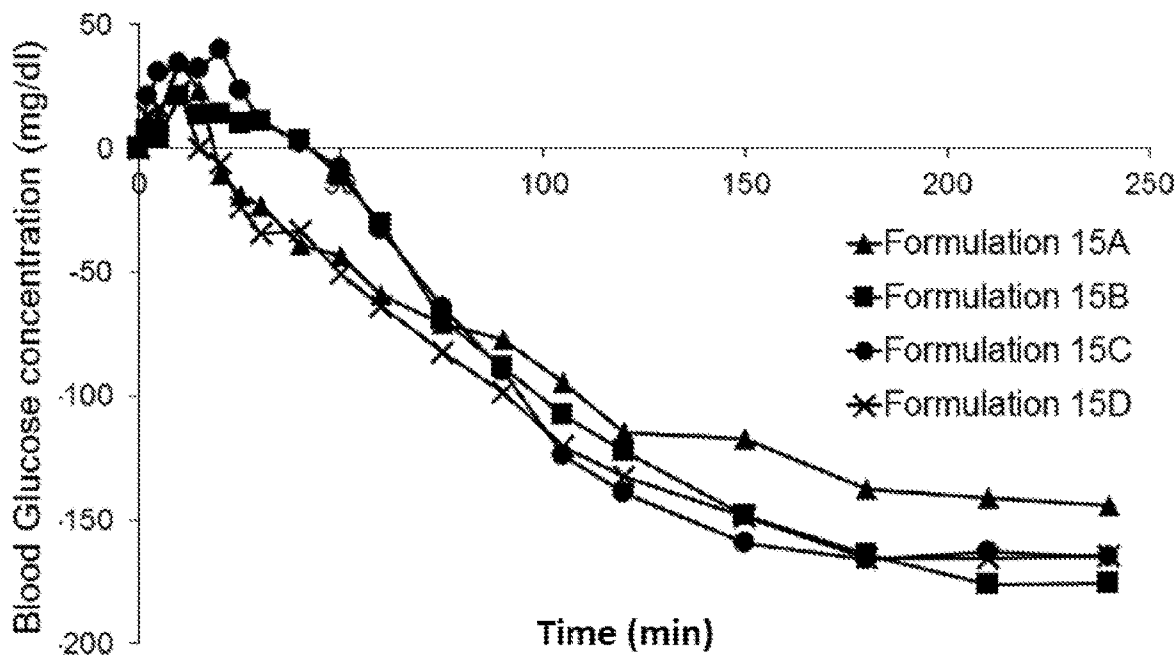

FIG. 5. Pharmacodynamic profiles of formulations 15A-15D of Example 15 in a validated diabetic Yucatan miniature pig model.

Figure 6:
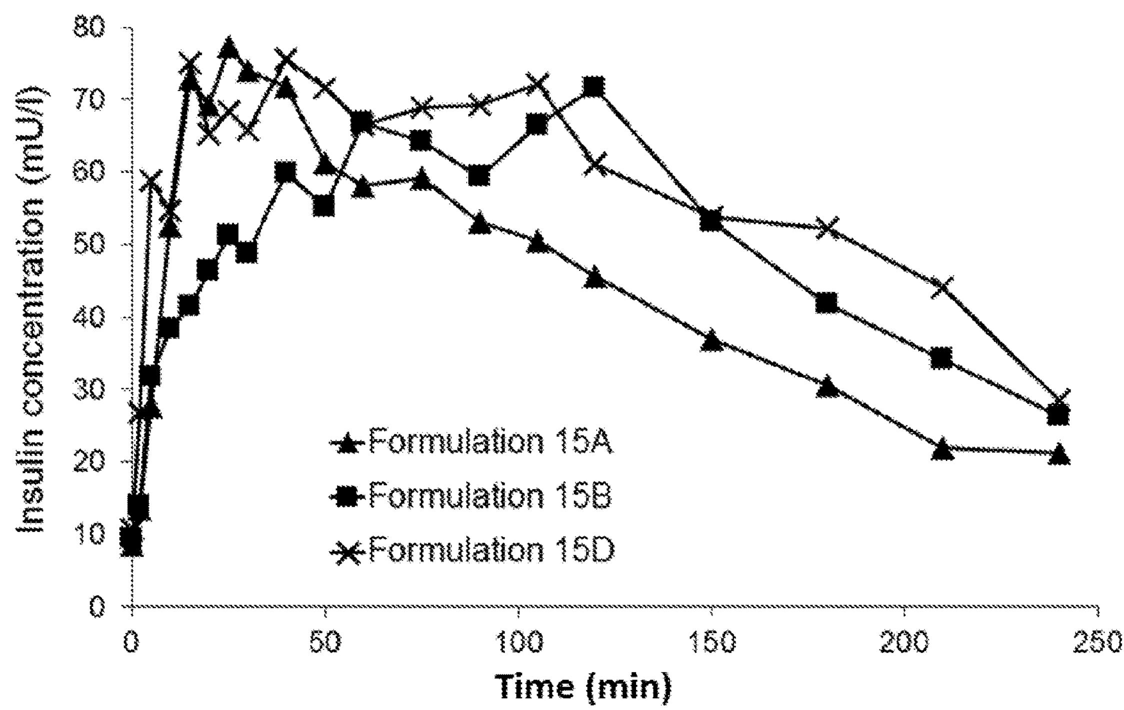

FIG. 6. Pharmacokinetic profiles of formulations 15A, 15B and 15D of Example 15 in a validated diabetic Yucatan miniature pig model.

DETAILED DESCRIPTION OF THE INVENTION

As used herein, "insulin compound" refers to insulin and insulin analogues.

As used herein, "insulin" refers to native human insulin having an A chain and a B chain as set out in SEQ ID NOs. 1 and 2 and containing and connected by disulfide bridges as in the native molecule (Cys A6-Cys A11, Cys B7 to Cys A7 and Cys-B19-Cys A20). Insulin is suitably recombinant insulin.

"Insulin analogue" refers to an analogue of insulin which is an insulin receptor agonist and has a modified amino acid sequence, such as containing 1 or 2 amino acid changes in the sequence of the A or B chain (especially the B chain). Desirably such amino acid modifications are intended to reduce affinity of the molecule for zinc and thus increase speed of action. Thus, desirably an insulin analogue has a speed of action which is the same as or preferably greater than that of insulin. The speed of action of insulin or an insulin analogue may be determined in the Diabetic Pig Pharmacokinetic/Pharmacodynamic Model (see Examples, General Methods (c)). Exemplary insulin analogues include faster acting analogues such as insulin lispro, insulin aspart and insulin glulisine. These forms of insulin have the human insulin A chain but variant B chains—see SEQ ID NOs. 3-5. Further faster acting analogues are described in EP0214826, EP0375437 and EP0678522 the contents of which are herein incorporated by reference in their entirety. Suitably, the insulin compound is not insulin glargine. Suitably, the insulin compound is not insulin degludec. Suitably, the insulin compound is a rapid-acting insulin compound, wherein "rapid-acting" is defined as an insulin compound which has a speed of action which is greater than that of native human insulin e.g. as measured using the Diabetic Pig Pharmacokinetic/Pharmacodynamic Model (see Examples, General Methods (c)).

In one embodiment, the insulin compound is recombinant human insulin. In another embodiment, it is insulin lispro. In another embodiment, it is insulin aspart. In another embodiment, it is insulin glulisine.

The term "aqueous liquid pharmaceutical formulation", as used herein, refers to a formulation suitable for therapeutic use in which the aqueous component is or comprises water, preferably distilled water, deionized water, water for injection, sterile water for injection or bacteriostatic water for injection. The aqueous liquid pharmaceutical formulations of the invention are solution formulations in which all components are dissolved in water.

The concentration of insulin compound in the formulation will typically be in the range 10-1000 U/ml, such as 50-500 U/ml e.g. 50-200 U/ml. An exemplary formulation contains insulin compound at a concentration of 100 U/ml (around 3.6 mg/ml). Another range of interest is 500-1000 U/ml e.g. 800-1000 U/ml and another exemplary formulation contains insulin compound at a concentration of 1000 U/ml (around 36 mg/ml). Another range of interest is 50-1000 U/ml.

In one embodiment, the concentration of insulin compound in the formulation is 10-500 U/ml e.g. 10-<500 U/ml, 20-500 U/ml, 20-<500 U/ml, 50-500 U/ml, 50-<500 U/ml, 100-500 U/ml or 100-<500 U/ml. In one embodiment, the concentration of insulin compound in the formulation is 10-400 U/ml e.g. 10 to <400 U/ml, 20-400 U/ml, 20-<400 U/ml, 50-400 U/ml, 50-<400 U/ml, 100-400 U/ml or 100-<400 U/ml. In one embodiment, the concentration of insulin compound in the formulation is 10-300 U/ml e.g. 10-<300 U/ml, 20-300 U/ml, 20-<300 U/ml, 50-300 U/ml, 50-<300 U/ml, 100-300 U/ml or 100-<300 U/ml. In one embodiment, the concentration of insulin compound in the formulation is 10-250 U/ml e.g. 10-<250 U/ml, 20-250 U/ml, 20-<250 U/ml, 50-250 U/ml, 50-<250 U/ml, 100-250 U/ml or 100-<250 U/ml. In one embodiment, the concentration of insulin compound in the formulation is 10-200 U/ml e.g. 10-<200 U/ml, 20-200 U/ml, 20-<200 U/ml, 50-200 U/ml, 50-<200 U/ml, 100-200 U/ml or 100-<200 U/ml. In one embodiment, the concentration of insulin compound in the formulation is 10-100 U/ml, e.g. 10-<100 U/ml, 20-100 U/ml, 20-<100 U/ml, 50-100 U/ml or 50-<100 U/ml.

In one embodiment, the concentration of insulin compound in the formulation is 400-1000 U/ml e.g. >400-1000 U/ml. In one embodiment, the concentration of insulin compound in the formulation is 500-1000 U/ml e.g. >500-1000 U/ml. In one embodiment, the concentration of insulin compound in the formulation is 600-1000 U/ml, e.g. >600-1000 U/ml. In one embodiment, the concentration of insulin compound in the formulation is 700-1000 U/ml e.g. >700-1000 U/ml. In one embodiment, the concentration of insulin compound in the formulation is 750-1000 U/ml e.g. >750-1000 U/ml. In one embodiment, the concentration of insulin compound in the formulation is 800-1000 U/ml e.g. >800-1000 U/ml. In one embodiment, the concentration of insulin compound in the formulation is 900-1000 U/ml e.g. >900-1000 U/ml.

"U/ml" as used herein describes the concentration of insulin compound in terms of a unit per volume, wherein "U" is the international unit of insulin activity (see e.g. European Pharmacopoeia 5.0, Human Insulin, pp 1800-1802).

The formulations of the invention contain ionic zinc i.e. $Zn^{2+}$ ions. The source of the ionic zinc will typically be a water-soluble zinc salt such as $ZnCl_2$, ZnO, $ZnSO_4$, $Zn(NO_3)_2$ or $Zn(acetate)_2$ and most suitably $ZnCl_2$ or ZnO.

The concentration of the ionic zinc in the formulation will typically be more than 0.05% e.g. more than 0.1% e.g. more than 0.2%, more than 0.3% or more than 0.4% by weight of zinc based on the weight of insulin compound in the formulation. Thus, the concentration of the ionic zinc in the formulation may be more than 0.5% by weight of zinc based on the weight of insulin compound in the formulation, for example 0.5-1%, e.g. 0.5-0.75%, e.g. 0.5-0.6% by weight of zinc based on the weight of insulin compound in the formulation. For the purpose of the calculation the weight of the counter ion to zinc is excluded. The concentration of the ionic zinc in the formulation will (for example, for a formulation containing 100 U/ml of insulin compound) typically be more than 0.015 mM e.g. more than 0.03 mM e.g. more than 0.06 mM, more than 0.09 mM or more than 0.12 mM. Thus, the concentration of the ionic zinc in the formulation may be more than 0.15 mM, for example 0.15-0.60 mM, e.g. 0.20-0.45 mM, e.g. 0.25-0.35 mM.

In a formulation e.g. containing 1000 U/ml of insulin compound the concentration of the ionic zinc will typically be more than 0.15 mM e.g. more than 0.3 mM, e.g. more than 0.6 mM, more than 0.9 mM or more than 1.2 mM. Thus, the concentration of the ionic zinc in the formulation may be more than 1.5 mM, for example 1.5-6.0 mM, e.g. 2.0-4.5 mM, e.g. 2.5-3.5 mM.

The formulations of the invention contain a zinc binding species. Zinc binding species should be capable of complexing ionic zinc and will have a log K metal binding stability constant with respect to zinc ion binding of 4.5-12.3 as determined at 25° C. Metal binding stability constants listed in the National Institute of Standards and Technology reference database 46 (Critically Selected Stability Constants of Metal Complexes) can be used. The database typically lists log K constants determined at 25° C. Therefore, the suitability of a zinc binding species for the present invention can be determined based on its log K metal binding stability constant with respect to zinc binding, as measured at 25° C. and as quoted by the database. The zinc binding species may also be described as an "accelerator" in the formulations according to the invention. Exemplary zinc binding species include polydendate organic anions. Thus, a preferred zinc binding species is citrate (log K=4.93) which can, for example, be employed as trisodium citrate. Further examples include pyrophosphate (log K=8.71), aspartate (log K=5.87), glutamate (log K=4.62), cysteine (log K=9.11), cystine (log K=6.67) and glutathione (log K=7.98). Other possible zinc binding species include substances that can contribute a lone pair of electrons or electron density for interaction with ionic zinc such as polydendate amines including ethylenediamine (log K=5.69), diethylenetriamine (DETA, log K=8.88) and triethylenetetramine (TETA, log K=11.95); and aromatic or heteroaromatic substances that can contribute a lone pair of electrons especially those comprising an imidazole moiety such as histidine (log K=6.51). Thus, in one embodiment, the zinc binding species having a log K with respect to zinc ion binding in the range 4.5-12.3 is selected from citrate, pyrophosphate, aspartate, glutamate, cysteine, cystine, glutathione, ethylenediamine, histidine, DETA and TETA.

In an embodiment, the zinc binding species will have a log K metal binding stability constant with respect to zinc ion binding of 4.5-10 at 25° C.

The most suitable concentration of the zinc binding species will depend on the agent and its log K value and will typically be in the range 1-100 mM e.g. 1-50 mM, 5-50 mM, 10-50 mM, 20-50 mM, 30-50 mM, 40-50 mM, 15-60 mM, 30-60 mM, 20-30 mM or 10-30 mM, in particular 15-60 mM e.g. 20-50 mM. The concentration of zinc binding species can be adjusted according to the particular concentration of insulin compound present in the composition in order to provide the desired accelerating effect. In a particular embodiment, the the zinc binding species is citrate. In a further embodiment, the concentrate of the citrate is 1-100 mM, e.g. 15-60 mM, 20-50 mM, 20-30 mM or 30-60 mM.

For example, the concentration of the zinc binding species in the formulation may typically be in the range 1-50 mM, more preferably 5-50 mM e.g. 10-50 mM e.g. 10-30 mM, more preferably around 20 mM (e.g. 22 mM), especially when the zinc binding species is citrate or histidine and especially for insulin compound 100 U/ml formulations. Suitably the concentration of the zinc binding species in the formulation is 10-50 mM e.g. 30-50 mM e.g. 40-50 mM, more preferably around 44 mM when the zinc binding species is citrate or histidine for insulin compound 1000 U/ml formulations.

In an embodiment, the concentration of the zinc binding species is 10 mM or more. In a further embodiment, the zinc binding species is citrate and the concentration of the citrate is 10 mM or more e.g. 1-100 mM, 15-60 mM, 20-50 mM, 20-30 mM, or 30-60 mM.

Anionic zinc binding species may be employed as the free acid or a salt form, such as a salt form with sodium or calcium ions, especially sodium ions.

A mixture of zinc binding species may be employed, although a single zinc binding species is preferred.

Suitably the molar ratio of ionic zinc to zinc binding species in the formulation is in the range 1:1 to 1:1000 e.g. 1:1 to 1:500 e.g. 1:1 to 1:250 or 1:3 to 1:500 e.g. 1:3 to 1:175.

For example, a suitable molar ratio of ionic zinc to zinc binding species is 1:10-1:500 e.g. 1:20-1:500 e.g. 1:20-1:100 or 1:40-1:250, e.g. 1:40-1:90 or 1:60-1:200, e.g. 1:60-1:80, especially for citrate or histidine as zinc binding species. The following ranges are particularly of interest especially for citrate or histidine as zinc binding species: 1:10-1:500 e.g. 1:10-1:200 e.g. 1:10 to 1:100 e.g. 1:10-1:50, e.g. 1:10 to 1:30, e.g. 1:10- to 1:20 (especially for insulin compound 1000 U/ml formulation) or 1:50-1:100, e.g. 1:60-1:80 (especially for insulin compound 100 U/ml formulation).

For example, a formulation containing 100 U/ml of insulin compound may contain around 0.3 mM of ionic zinc (i.e. around 19.7 μg/ml of ionic zinc, i.e. around 0.54% by weight of zinc based on the weight of insulin compound in the formulation) and around 15-30 mM e.g. 20-30 mM zinc binding species (especially citrate).

For example, a formulation containing 1000 U/ml of insulin compound may contain around 3 mM of ionic zinc (i.e. around 197 μg/ml of ionic zinc, i.e. around 0.54% by weight of zinc based on the weight of insulin compound in the formulation) and around 30-60 mM e.g. 40-60 mM zinc binding species (especially citrate).

In one embodiment, the ratio of insulin compound concentration (U/ml) to zinc binding species (mM) in the formulation is in the range 100:1 to 2:1 e.g. 50:1 to 2:1 e.g. 40:1 to 2:1.

The formulations of the invention are substantially free of zinc binding species which have a log K metal binding stability constant with respect to zinc binding of more than 12.3 as determined at 25° C. Specifically, the formulations of the invention are substantially free of EDTA (log K=14.5). Further examples of zinc binding species which have a log K metal binding stability constant with respect to zinc binding of more than 12.3 to be avoided include EGTA (log K=12.6). In general formulations of the invention will be substantially free of tetradentate ligands or ligands of higher denticity. In an embodiment, the formulations of the invention are also substantially free of zinc binding species which have a log K metal binding stability constant with respect to zinc ion binding of 10-12.3 as determined at 25° C. "Substantially free" means that the concentration of zinc binding species which have a log K metal binding stability constant with respect to zinc binding as specified (such as EDTA) is less than 0.1 mM, such as less than 0.05 mM, such as less than 0.04 mM or less than 0.01 mM.

Zinc ion binding species which have acid forms (e.g. citric acid) may be introduced into the aqueous formulations of the invention in the form of a salt of the acid, such as a sodium salt (e.g. trisodium citrate). Alternatively, they can be introduced in the form of the acid with subsequent adjustment of pH to the required level. Thus, in an embodiment, the source of the citrate as zinc ion binding species is citric acid.

In one embodiment is provided an aqueous liquid pharmaceutical formulation comprising (i) an insulin compound at a concentration of 50-500 U/ml (ii) ionic zinc, (iii) citrate as a zinc binding species at a concentration of 1 mM or more, and (iv) a non-ionic surfactant which is an alkylglycoside; and wherein the formulation is substantially free of EDTA and any other zinc binding species having a log K with respect to zinc ion binding of more than 12.3 at 25° C. Suitably, the citrate is present in the formulation at a concentration of 10-30 mM.

In another embodiment is provided an aqueous liquid pharmaceutical formulation comprising (i) an insulin compound at a concentration of 400-1000 U/ml e.g. 500-1000 U/ml (ii) ionic zinc, (iii) citrate as a zinc binding species at a concentration of 1 mM or more, and (iv) a non-ionic surfactant which is an alkyl glycoside; and wherein the formulation is substantially free of EDTA and any other zinc binding species having a log K with respect to zinc ion binding of more than 12.3 at 25° C. Suitably, the citrate is present in the formulation at a concentration of 30-50 mM.

The formulations of the invention contain a non-ionic surfactant which is an alkyl glycoside, especially dodecyl maltoside. In another embodiment, the alkyl glycoside is decyl glucopyranoside. Other alkyl glycosides include dodecyl glucoside, octyl glucoside, octyl maltoside, decyl glucoside, decyl maltoside, tridecyl glucoside, tridecyl maltoside, tetradecyl glucoside, tetradecyl maltoside, hexadecyl glucoside, hexadecyl maltoside, sucrose monooctanoate, sucrose monodecanoate, sucrose monododecanoate, sucrose monotridecanoate, sucrose monotetradecanoate and sucrose monohexadecanoate. The concentration of the non-ionic surfactant in the formulation will typically be in the range 1-1000 μg/ml, e.g. 5-500 μg/ml, e.g. 10-200 μg/ml, such as 10-100 μg/ml especially around 50 μg/ml. In one embodiment, the non-ionic surfactant is present at a concentration of 10-400 μg/ml e.g. 20-400 μg/ml, 50-400 μg/ml, 10-300 μg/ml, 20-300 μg/ml, 50-300 μg/ml, 10-200 μg/ml, 20-200 μg/ml, 50-200 μg/ml, 10-100 μg/ml, 20-100 μg/ml or 50-100 μg/ml.

In one embodiment, the concentration of insulin compound is 10-250 U/ml and the non-ionic surfactant is present at a concentration of 50-100 μg/ml. In this embodiment, suitably the non-ionic surfactant is dodecyl maltoside.

In another embodiment, the concentration of insulin compound is 10-<400 U/ml e.g. 20-400 U/ml, 50-400 U/ml, 10-300 U/ml, 20-300 U/ml, 50-300 U/ml, 10-200 U/ml, 20-200 U/ml, 50-200 U/ml, 10-100 U/ml, 20-100 U/ml or 50-100 U/ml, and the non-ionic surfactant is present at a concentration of 50-200 μg/ml. In this embodiment, suitably the non-ionic surfactant is dodecyl maltoside.

In another embodiment, the concentration of insulin compound is 400-1000 U/ml e.g. 500-1000 U/ml and the non-ionic surfactant is present at a concentration of 50-200 μg/ml. In this embodiment, suitably the non-ionic surfactant is dodecyl maltoside.

Suitably the pH of the aqueous formulations of the invention is in the range 5.5-9.0 especially 6.5-8.0 e.g. 7.0-7.8. e.g. 7.0-7.5. In order to minimise injection pain, the pH is preferably close to physiological pH (around pH 7.4). Another pH of interest is 7.6-8.0 e.g. around 7.8. An additional pH of interest is 7.2-7.8, e.g. around 7.6.

Suitably, the composition of the invention comprises a buffer (e.g. one or more buffers) in order to stabilise the pH of the formulation, which can also be selected to enhance protein stability. In one embodiment, a buffer is selected to have a pKa close to the pH of the composition; for example, histidine is suitably employed as a buffer when the pH of the composition is in the range 5.0-7.0. Such a buffer may be employed in a concentration of 0.5-20 mM e.g. 2-5 mM. If histidine is included in the formulation as a zinc binding species it will also have a buffering role at this pH. As another example, phosphate e.g. sodium phosphate is suitably employed as a buffer when the pH of the composition is in the range 6.1-8.1. Such a buffer may be employed in a concentration of 0.5-20 mM e.g. 2-5 mM, e.g. 2 mM. Alternatively, in another embodiment, the formulation of the invention is further stabilised as disclosed in WO2008/084237 (herein incorporated by reference in its entirety), which describes a formulation comprising a protein and one or more additives, characterised in that the system is substantially free of a conventional buffer, i.e. a compound with an ionisable group having a pKa within 1 unit of the pH of the formulation at the intended temperature range of storage of the composition, such as 25° C. In this embodiment, the pH of the formulation is set to a value at which the formulation has maximum measurable stability with respect to pH; the one or more additives (displaced buffers) are capable of exchanging protons with the insulin compound and have pKa values at least 1 unit more or less than the pH of the formulation at the intended temperature range of storage of the formulation. The additives may have ionisable groups having pKa between 1 to 5 pH units, preferably between 1 to 3 pH units, most preferably from 1.5 to 2.5 pH units, of the pH of the aqueous formulation at the intended temperature range of storage of the composition (e.g. 25° C.). Such additives may typically be employed at a concentration of 0.5-10 mM e.g. 2-5 mM.

The aqueous formulations of the present invention cover a wide range of osmolarity, including hypotonic, isotonic and hypertonic compositions. Preferably, the formulations of the invention are substantially isotonic. Suitably the osmolarity of the formulation is selected to minimize pain according to the route of administration e.g. upon injection. Preferred formulations have an osmolarity in the range of about 200 to about 500 mOsm/L. Preferably, the osmolarity is in the range of about 250 to about 350 mOsm/L. More preferably, the osmolarity is about 300 mOsm/L.

Tonicity of the formulation may be adjusted with a tonicity modifying agent (e.g. one or more tonicity modifying agents). Tonicity modifying agents may be charged or uncharged. Examples of charged tonicity modifying agents include salts such as a combination of sodium, potassium, magnesium or calcium ions, with chloride, sulfate, carbonate, sulfite, nitrate, lactate, succinate, acetate or maleate ions (especially sodium chloride or sodium sulphate, particularly sodium chloride). The insulin compound formulations of the invention may contain a residual NaCl concentration of 2-4 mM as a result of the use of standard acidification and subsequent neutralization steps employed in preparing insulin formulations. Amino acids such as arginine, glycine or histidine may also be used for this purpose. Charged tonicity modifying agent (e.g. NaCl) is preferably used at a concentration of 100-300 mM, e.g. around 150 mM. In one embodiment, the formulation of the invention comprises >60 mM chloride e.g. sodium chloride, for example >65 mM, >75 mM, >80 mM, >90 mM, >100 mM, >120 mM or >140 mM, such as >60-300 mM, >60-200 mM, 50-175 mM, 75-300 mM, 75-200 mM or 75-175 mM. In one embodiment, the charged tonicity modifying agent in the formulation is sodium chloride at a concentration of 100-300 mM, e.g. around 150 mM.

In one embodiment, the insulin compound is insulin lispro at a concentration of 50-500 U/ml e.g. 50-200 U/ml such as 100 U/ml, and the charged tonicity modifying agent in the formulation is sodium chloride at a concentration of 100-300 mM, e.g. around 150 mM.

In one embodiment, the insulin compound is insulin aspart at a concentration of 50-500 U/ml e.g. 50-200 U/ml such as 100 U/ml, and the charged tonicity modifying agent in the formulation is sodium chloride at a concentration of 100-300 mM, e.g. around 150 mM.

In one embodiment, the insulin compound is insulin glulisine at a concentration of 50-500 U/ml e.g. 50-200 U/ml such as 100 U/ml, and the charged tonicity modifying agent in the formulation is sodium chloride at a concentration of 100-300 mM, e.g. around 150 mM.

Examples of uncharged tonicity modifying agents include sugars, sugar alcohols and other polyols, such as trehalose, sucrose, mannitol, glycerol, 1,2-propanediol, raffinose, lactose, dextrose, sorbitol or lactitol (especially trehalose, mannitol, glycerol or 1,2-propanediol, particularly glycerol). Uncharged tonicity modifying agent is preferably used at a concentration of 200-500 mM, e.g. around 300 mM. Another range of interest is 100-500 mM. In one embodiment, the uncharged tonicity modifying agent is used at a concentration of 100-300 mM, e.g. 150-200 mM, 170-180 mM or around 174 mM. In one embodiment, the uncharged tonicity modifying agent is glycerol at a concentration of 100-300 mM, e.g. 150-200 mM, 170-180 mM or around 174 mM.

When the insulin compound is insulin lispro, in particular at a concentration of >400 U/ml e.g. >400-1000 U/ml such as >500 U/ml e.g. >500-1000 U/ml or 1000 U/ml, the tonicity is suitably adjusted using an uncharged tonicity modifying agent, preferably at a concentration of 200-500 mM, e.g. around 300 mM. In this embodiment, the uncharged tonicity modifying agent is suitably selected from the group consisting of trehalose, mannitol, glycerol and 1,2-propanediol (most suitably glycerol). In another embodiment, the uncharged tonicity modifying agent is used at a concentration of 100-300 mM, e.g. 150-200 mM, 170-180 mM or around 174 mM. In one embodiment, the uncharged tonicity modifying agent is glycerol at a concentration of 100-300 mM, e.g. 150-200 mM, 170-180 mM or around 174 mM.

When the insulin compound is insulin aspart at a concentration of >400 U/ml; such as >500 U/ml (e.g. 1000 U/ml), the tonicity is suitably adjusted using an uncharged tonicity modifying agent, preferably at a concentration of 200-500 mM, e.g. around 300 mM. In this embodiment, the uncharged tonicity modifying agent is suitably selected from the group consisting of trehalose, mannitol, glycerol and 1,2-propanediol (most suitably glycerol). In another embodiment, the uncharged tonicity modifying agent is used at a concentration of 100-300 mM, e.g. 150-200 mM, 170-180 mM or around 174 mM. In one embodiment, the uncharged tonicity modifying agent is glycerol at a concentration of 100-300 mM, e.g. 150-200 mM, 170-180 mM or around 174 mM.

The ionic strength of a formulation may be calculated according to the formula Ia:

$$I = 0.5 \times \sum_{X=1}^{n} c_x z_x^2$$

in which $c_x$ is molar concentration of ion x (mol $L^{-1}$), $z_x$ is the absolute value of the charge of ion x and the sum covers all ions (n) present in the composition. The contribution of the insulin compound itself should be ignored for the purposes of the calculation. The contribution of the zinc binding species should be ignored for the purposes of the calculation. Suitably, the contribution of the ionic zinc should be included for the purposes of the calculation. For zwitterions, the absolute value of the charge is the total charge excluding polarity, e.g. for glycine the possible ions have absolute charge of 0, 1 or 2 and for aspartate the possible ions have absolute charge of 0, 1, 2 or 3.

In general, the ionic strength of the formulation is suitably in the range of around 1 mM up to around 500 mM.

In one embodiment, the insulin compound is present at a concentration >400 U/ml or >500 U/ml e.g. >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml, >900-1000 U/ml or 1000 U/ml, and the ionic strength taking account of ions in the formulation except for the zinc binding species and the insulin compound is less than 40 mM, e.g. less than 30 mM, e.g. less than 20 mM, e.g. less than 10 mM such as 1-10 mM. In a further embodiment, the ionic strength taking account of ions in the formulation except for the zinc binding species and the insulin compound is less than 35 mM, less than 30 mM, less than 25 mM, less than 20 mM, less than 15 mM, or less than 10 mM, or is in the range 5-<40 mM, 5-30 mM, 5-20 mM, 2-20 mM, 1-10 mM, 2-10 mM or 5-10 mM. The tonicity may suitably be adjusted using an uncharged tonicity modifying agent.

When the insulin compound is insulin lispro, in particular insulin lispro at a concentration of >400 U/ml or >500 U/ml e.g. >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml, >900-1000 U/ml or 1000 U/ml, the ionic strength of the formulation is suitably kept to a minimum level since higher ionic strength formulations are less stable than lower ionic strength formulations, particularly at high concentrations of insulin. Suitably the ionic strength taking account of ions in the formulation except for the zinc binding species and the insulin compound is less than 40 mM, e.g. less than 30 mM, e.g. less than 20 mM, e.g. less than 10 mM such as 1-10 mM. In particular, the ionic strength taking account of ions in the formulation except for the zinc binding species and the insulin compound is less than 35 mM, less than 30 mM, less than 25 mM, less than 20 mM, less than 15 mM, or less than 10 mM, or is in the range 5-<40 mM, 5-30 mM, 5-20 mM, 2-20 mM, 1-10 mM, 2-10 mM or 5-10 mM. The tonicity may suitably be adjusted using an uncharged tonicity modifying agent.

When the insulin compound is insulin aspart at a concentration of >400 U/ml or >500 U/ml (e.g. >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml, >900-1000 U/ml or 1000 U/ml), the ionic strength of the formulation is suitably kept to a minimum level since higher ionic strength formulations are less stable than lower ionic strength formulations. Suitably the ionic strength taking account of ions in the formulation except for the zinc binding species and the insulin compound is less than 40 mM, e.g. less than 30 mM, e.g. less than 20 mM, e.g. less than 10 mM. In particular, the ionic strength taking account of ions in the formulation except for the zinc binding species and the insulin compound is less than 35 mM, less than 30 mM, less than 25 mM, less than 20 mM, less than 15 mM, or less than 10 mM, or is in the range 5-<40 mM, 5-30 mM, 5-20 mM, 2-20 mM, 1-10 mM, 2-10 mM or 5-10 mM. The tonicity may suitably be adjusted using an uncharged tonicity modifying agent.

When the insulin compound is insulin glulisine at a concentration of >400 U/ml or >500 U/ml (e.g. >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml, >900-1000 U/ml or 1000 U/ml), the ionic strength of the formulation is suitably kept to a minimum level since higher ionic strength formulations may be less stable than lower ionic strength formulations. Suitably the ionic strength taking account of ions in the formulation except for the zinc binding species and the insulin compound is less than 40 mM, e.g. less than 30 mM, e.g. less than 20 mM, e.g. less than 10 mM. In particular, the ionic strength taking account of ions in the formulation except for the zinc binding species and the insulin compound is less than 35 mM, less than 30 mM, less than 25 mM, less than 20 mM, less than 15 mM, or less than 10 mM, or is in the range 5-<40 mM, 5-30 mM, 5-20 mM, 2-20 mM, 1-10 mM, 2-10 mM or 5-10 mM. The tonicity may suitably be adjusted using an uncharged tonicity modifying agent.

In another embodiment, the ionic strength of a formulation may be calculated according to the formula Ib:

$$I = 0.5 \times \sum_{X=1}^{n} c_x z_x^2$$

in which $c_x$ is molar concentration of ion x (mol $L^{-1}$), $z_x$ is the absolute value of the charge of ion x and the sum covers all ions (n) present in the composition, wherein the contribution of the insulin compound, zinc binding species and ionic zinc should be ignored for the purposes of the calculation. For zwitterions, the absolute value of the charge is the total charge excluding polarity, e.g. for glycine the possible ions have absolute charge of 0, 1 or 2 and for aspartate the possible ions have absolute charge of 0, 1, 2 or 3.

In this embodiment, the ionic strength of the formulation is suitably in the range of around 1 mM up to around 500 mM.

In one embodiment, the insulin compound is present at a concentration >400 U/ml or >500 U/ml e.g. >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml, >900-1000 U/ml or 1000 U/ml, and the ionic strength taking account of ions in the formulation except for the zinc binding species, the insulin compound and the ionic zinc is less than 30 mM, e.g. less than 20 mM, e.g. less than 10 mM such as 1-10 mM. In a further embodiment, the ionic strength taking account of ions in the formulation except for the zinc binding species, the insulin compound and the ionic zinc is less than 25 mM, less than 20 mM, less than 15 mM, or less than 10 mM, or is in the range 5-<30 mM, 5-30 mM, 5-20 mM, 2-20 mM, 1-10 mM, 2-10 mM or 5-10 mM. The tonicity may suitably be adjusted using an uncharged tonicity modifying agent.

When the insulin compound is insulin lispro, in particular insulin lispro at a concentration of >400 U/ml or >500 U/ml e.g. >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml, >900-1000 U/ml or 1000 U/ml, the ionic strength of the formulation is suitably kept to a minimum level since higher ionic strength formulations are less stable than lower ionic strength formulations, particularly at high concentrations of insulin. Suitably the ionic strength taking account of ions in the formulation except for the zinc binding species, the insulin compound and the ionic zinc is less than 30 mM, e.g. less than 20 mM, e.g. less than 10 mM such as 1-10 mM. In particular, the ionic strength taking account of ions in the formulation except for the zinc binding species, the insulin compound and the ionic zinc is less than 25 mM, less than 20 mM, less than 15 mM, or less than 10 mM, or is in the range 5-<30 mM, 5-30 mM, 5-20 mM, 2-20 mM, 1-10 mM, 2-10 mM or 5-10 mM. The tonicity may suitably be adjusted using an uncharged tonicity modifying agent.

Alternatively, when the insulin compound is insulin aspart at a concentration of >400 U/ml or >500 U/ml (e.g. >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml, >900-1000 U/ml or 1000 U/ml), the ionic strength of the formulation is suitably kept to a minimum level since higher ionic strength formulations are less stable than lower ionic strength formulations. Suitably the ionic strength taking account of ions in the formulation except for the zinc binding species, the insulin compound and the ionic zinc is less than 30 mM, e.g. less than 20 mM, e.g. less than 10 mM. In particular, the ionic strength taking account of ions in the formulation except for the zinc binding species, the insulin compound and the ionic zinc is less than 25 mM, less than 20 mM, less than 15 mM, or less than 10 mM, or is in the range 5-<30 mM, 5-30 mM, 5-20 mM, 2-20 mM, 1-10 mM, 2-10 mM or 5-10 mM. The tonicity may suitably be adjusted using an uncharged tonicity modifying agent.

Alternatively, when the insulin compound is insulin glulisine at a concentration of >400 U/ml or >500 U/ml (e.g. >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml, >900-1000 U/ml or 1000 U/ml), the ionic strength of the formulation is suitably kept to a minimum level since higher ionic strength formulations may be less stable than lower ionic strength formulations. Suitably the ionic strength taking account of ions in the formulation except for the zinc binding species, the insulin compound and the ionic zinc is less than 30 mM, e.g. less than 20 mM, e.g. less than 10 mM. In particular, the ionic strength taking account of ions in the formulation except for the zinc binding species, the insulin compound and ionic zinc is less than 25 mM, less than 20 mM, less than 15 mM, or less than 10 mM, or is in the range 5-<30 mM, 5-30 mM, 5-20 mM, 2-20 mM, 1-10 mM, 2-10 mM or 5-10 mM. The tonicity may suitably be adjusted using an uncharged tonicity modifying agent.

The formulations of the invention can optionally include a preservative (e.g. one or more preservatives), preferably phenol, m-cresol, chlorocresol, benzyl alcohol, propylparaben, methylparaben, benzalkonium chloride or benzethonium chloride. In one embodiment, the formulation includes phenol or m-cresol. In one embodiment, a mixture of preservatives is employed e.g. phenol and m-cresol.

The formulations of the invention may optionally comprise nicotinamide. The presence of nicotinamide may further increase the speed of onset of action of insulin formulated in compositions of the invention. Suitably, the concentration of nicotinamide is in the range 10-150 mM, preferably in the range 20-100 mM, such as around 80 mM.

The formulations of the invention may optionally comprise nicotinic acid or a salt thereof. The presence of nicotinic acid or a salt thereof may also further increase the speed of onset of action of insulin formulated in compositions of the invention. Suitably, the concentration of nicotinic acid or a salt thereof is in the range 10-150 mM, preferably in the range 20-100 mM, such as around 80 mM. Example salts include metal salts such as sodium, potassium and magnesium salts.

Typically, one of nicotinamide and nicotinic acid (or as salt thereof) may be included in the formulation but not both.

The formulations of the invention may optionally comprise treprostinil or a salt thereof. The presence of the treprostinil may further increase the speed of onset of action of insulin formulated in compositions of the invention. Suitably, the concentration of treprostinil in the formulation is in the range of 0.1-12 μg/ml e.g. 0.1-10 μg/ml, 0.1-9 μg/ml, 0.1-8 μg/ml, 0.1-7 μg/ml, 0.1-6 μg/ml, 0.1-5 μg/ml, 0.1-4 μg/ml, 0.1-3 μg/ml, 0.1-2 μg/ml, 0.5-2 μg/ml e.g. about 1 μg/ml.

In one embodiment, the formulation does not contain a vasodilator. In a further embodiment, the formulation does not contain treprostinil, nicotinamide, nicotinic acid or a salt thereof.

Formulations of the invention may optionally include other beneficial components including stabilising agents. For example, amino acids such as arginine or proline may be included which may have stabilising properties. Thus, in one embodiment, the formulations of the invention comprise arginine.

In an embodiment of the invention the formulations are free of acids selected from glutamic acid, ascorbic acid, succinic acid, aspartic acid, maleic acid, fumaric acid, adipic acid and acetic acid and are also free from the corresponding ionic forms of these acids.

In an embodiment of the invention the formulations are free of arginine.

In an embodiment of the invention the formulations are free of protamine and protamine salts.

In an embodiment of the invention the formulations are free of magnesium ions.

The addition of magnesium ions e.g. in the form of magnesium chloride can provide a stabilising effect. Thus, in an embodiment of the invention a formulation contains magnesium ions e.g. $MgCl2$.

In an embodiment of the invention the formulations are free of calcium ions.

Formulations of the invention may further comprise an additional therapeutically active agent (an "active agent"), in particular an agent of use in the treatment of diabetes (i.e. in addition to the insulin compound in particular the rapid-acting insulin compound) e.g. an amylin analogue or a GLP-1 agonist. In one embodiment, the formulation further comprises an amylin analogue such as pramlintide, suitably at a concentration of 0.1-10 mg/ml e.g. 0.2-6 mg/ml. In one embodiment, the formulation further comprises a GLP-1 agonist such as liraglutide, dulaglutide, albiglutide, exenatide or lixisenatide, suitably at a concentration of 10 μg/ml to 50 mg/ml e.g. 200 μg/ml to 10 mg/ml or 1-10 mg/ml.

Suitably the formulations of the invention are sufficiently stable that the concentration of high molecular weight species remains low upon extended storage. The term "high molecular weight species" as used herein, refers to any irreversibly formed component of the protein content which has an apparent molecular weight at least about double the molecular weight of the parent insulin compound, as detected by a suitable analytical method, such as size-exclusion chromatography. That is, high molecular weight species are multimeric aggregates of the parent insulin compound. The multimeric aggregates may comprise the parent protein molecules with considerably altered conformation or they may be an assembly of the parent protein units in the native or near-native conformation. The determination of high molecular weight species can be done using methods known in the art, including size exclusion chromatography, electrophoresis, analytical ultracentrifugation, light scattering, dynamic light scattering, static light scattering and field flow fractionation.

Suitably the formulations of the invention are sufficiently stable that they remain substantially free of visible particles after storage at 30° C. for at least one, two or three months. Visible particles are suitably detected using the 2.9.20. European Pharmacopoeia Monograph (Particulate Contamination: Visible Particles). For example, a formulation is substantially free of visible particles if it has a Visual score according to Visual Assessment Method B of 1, 2 or 3, especially 1 or 2 according to the definition given in the Examples section.

Suitably the formulations of the invention are sufficiently stable that the concentration of related species remains low upon extended storage. The term "related species" as used herein, refers to any component of the protein content formed by a chemical modification of the parent insulin compound, particularly desamido or cyclic imide forms of insulin. Related species are suitably detected by RP-HPLC.

In a preferred embodiment, the formulation of the invention retains at least 95%, e.g. at least 96%, e.g. at least 97%, e.g. at least 98%, e.g. at least 99% parent insulin compound (by weight of total protein) after storage at 30° C. for one, two or three months. The percentage of insulin compound (by weight of total protein) may be determined by size-exclusion chromatography or RP-HPLC.

In a preferred embodiment, the formulation of the invention comprises no more than 4% (by weight of total protein), preferably no more than 2% high molecular weight species after storage at 30° C. for one, two or three months.

In a preferred embodiment, the formulation of the invention comprises no more than 4% (by weight of total protein), preferably no more than 2%, preferably no more than 1% A-21 desamido form of the insulin compound after storage at 30° C. for one, two or three months.

In preferred embodiments, a composition of the present invention should exhibit an increase in high molecular weight species during storage which is at least 10% lower, preferably at least 25% lower, more preferably at least 50% lower, than a composition lacking the non-ionic surfactant but otherwise identical, following storage under the same conditions (e.g. 30° C.) and length of time (e.g. one, two or three months).

In preferred embodiments, a composition of the present invention should exhibit an increase in related species during storage which is at least 10% lower, preferably at least 25% lower, more preferably at least 50% lower, than a composition lacking the non-ionic surfactant but otherwise identical, following storage under the same conditions (e.g. 30° C.) and length of time (e.g. one, two or three months).

The speed of action of a formulation of the invention may be determined in the Diabetic Pig Pharmacokinetic/Pharmacodynamic Model (see Examples, General Methods (c)). In preferred embodiments, a composition of the present invention exhibits a Tmax (i.e. time to peak insulin concentration) that is at least 20% shorter, for example preferably at least 30% shorter than a composition lacking the zinc binding species having a log K with respect to zinc ion binding in the range 4.5-12.3 (e.g. in the range 4.5-10) at 25° C. but otherwise identical, using the model. In preferred embodiments, a composition of the present invention exhibits an area under the curve on the pharmacodynamics profile within the first 45 minutes after injection that is at least 20% greater, preferably at least 30% greater than a composition lacking the zinc binding species having a log K with respect to zinc ion binding in the range 4.5-12.3 (e.g. in the range 4.5-10) at 25° C. but otherwise identical, using the model.

In one embodiment, the present invention provides a composition comprising (i) an insulin compound e.g. a concentration of 400-1000 U/ml or 500-1000 U/ml, (ii) ionic zinc, (iii) a zinc binding species at a concentration of 1 mM or more selected from species having a log K with respect to zinc ion binding in the range 4.5-12.3 at 25° C. e.g. citrate, and (iv) a non-ionic surfactant which is an alkyl glycoside e.g. dodecyl maltoside; and wherein the formulation is substantially free of EDTA and any other zinc binding species having a log K with respect to zinc ion binding of more than 12.3 at 25° C., which exhibits a TMAX (i.e. time to peak insulin concentration) that is at least 20% shorter, preferably at least 30% shorter than a formulation lacking the zinc binding species and non-ionic surfactant which is an alkylglycoside, but otherwise identical, using the Diabetic Pig Pharmacokinetic/Pharmacodynamic Model (see Examples, General Methods (c)).

In one embodiment, the present invention provides a composition comprising (i) an insulin compound e.g. a concentration of 400 U/ml or <400 U/ml e.g. 10-400 U/ml, 10-300 U/ml, 10-200 U/ml, 10-100 U/ml or 100 U/ml (ii) ionic zinc, (iii) a zinc binding species at a concentration of 1 mM or more selected from species having a log K with respect to zinc ion binding in the range 4.5-12.3 at 25° C. e.g. citrate, and (iv) a non-ionic surfactant which is an alkyl glycoside e.g. dodecyl maltoside; and wherein the formulation is substantially free of EDTA and any other zinc binding species having a log K with respect to zinc ion binding of more than 12.3 at 25° C., which exhibits a TMAX (i.e. time to peak insulin concentration) that is at least 20% shorter, preferably at least 30% shorter than a formulation lacking the zinc binding species and non-ionic surfactant which is an alkylglycoside, but otherwise identical, using the Diabetic Pig Pharmacokinetic/Pharmacodynamic Model (see Examples, General Methods (c)).

In one embodiment, the present invention provides a composition comprising (i) insulin lispro e.g. a concentration of 400-1000 U/ml or 500-1000 U/ml, (ii) ionic zinc, (iii) a zinc binding species at a concentration of 1 mM or more selected from species having a log K with respect to zinc ion binding in the range 4.5-12.3 at 25° C. e.g. citrate, and (iv) a non-ionic surfactant which is an alkyl glycoside e.g. dodecyl maltoside; and wherein the formulation is substantially free of EDTA and any other zinc binding species having a log K with respect to zinc ion binding of more than 12.3 at 25° C., which exhibits a TMAX (i.e. time to peak insulin concentration) substantially the same as (e.g. within ±20% e.g. ±10%) that of an aqueous formulation consisting of: insulin lispro (100 U/ml), sodium phosphate (13.2 mM), glycerol (174 mM), m-cresol (29 mM), ionic zinc (19.7 μg/ml, excluding counter-ion) adjusted to pH 7.3, using the Diabetic Pig Pharmacokinetic/Pharmacodynamic Model (see Examples, General Methods (c)).

In one embodiment, the present invention provides a composition comprising (i) insulin lispro e.g. a concentration of 400-1000 U/ml or 500-1000 U/ml, (ii) ionic zinc, (iii) a zinc binding species at a concentration of 1 mM or more selected from species having a log K with respect to zinc ion binding in the range 4.5-12.3 at 25° C. e.g. citrate, and (iv) a non-ionic surfactant which is an alkyl glycoside e.g. dodecyl maltoside; and wherein the formulation is substantially free of EDTA and any other zinc binding species having a log K with respect to zinc ion binding of more than 12.3 at 25° C., which exhibits a TMAX (i.e. time to peak insulin concentration) that is at least 20% shorter, preferably at least 30% shorter than an aqueous formulation consisting of: insulin lispro (100 U/ml), sodium phosphate (13.2 mM), glycerol (174 mM), m-cresol (29 mM), ionic zinc (19.7 μg/ml, excluding counter-ion) adjusted to pH 7.3, using the Diabetic Pig Pharmacokinetic/Pharmacodynamic Model (see Examples, General Methods (c)).

In another embodiment, the present invention provides a composition comprising (i) an insulin compound e.g. at a concentration of 400-1000 U/ml or 500-1000 U/ml, (ii) ionic zinc, (iii) a zinc binding species at a concentration of 1 mM or more selected from species having a log K with respect to zinc ion binding in the range 4.5-12.3 at 25° C. e.g. citrate, and (iv) a non-ionic surfactant which is an alkyl glycoside e.g. dodecyl maltoside; and wherein the formulation is substantially free of EDTA and any other zinc binding species having a log K with respect to zinc ion binding of more than 12.3 at 25° C., which exhibits an area under the curve on the pharmacodynamics profile within the first 45 minutes after injection that is at least 20% greater, preferably at least 30% greater than that of a formulation lacking the zinc binding species and non-ionic surfactant which is an alkylglycoside, but otherwise identical, using the Diabetic Pig Pharmacokinetic/Pharmacodynamic Model (see Examples, General Methods (c)).

In another embodiment, the present invention provides a composition comprising (i) an insulin compound e.g. a concentration of 400 U/ml or <400 U/ml e.g. 10-400 U/ml, 10-300 U/ml, 10-200 U/ml, 10-100 U/ml or 100 U/ml, (ii) ionic zinc, (iii) a zinc binding species at a concentration of 1 mM or more selected from species having a log K with respect to zinc ion binding in the range 4.5-12.3 at 25° C. e.g. citrate, and (iv) a non-ionic surfactant which is an alkyl glycoside e.g. dodecyl maltoside; and wherein the formulation is substantially free of EDTA and any other zinc binding species having a log K with respect to zinc ion binding of more than 12.3 at 25° C., which exhibits an area under the curve on the pharmacodynamics profile within the first 45 minutes after injection that is at least 20% greater, preferably at least 30% greater than that of a formulation lacking the zinc binding species and non-ionic surfactant which is an alkylglycoside, but otherwise identical, using the Diabetic Pig Pharmacokinetic/Pharmacodynamic Model (see Examples, General Methods (c)).

In another embodiment, the present invention provides a composition comprising (i) insulin lispro e.g. at a concentration of 400-1000 U/ml or 500-1000 U/ml, (ii) ionic zinc, (iii) a zinc binding species at a concentration of 1 mM or more selected from species having a log K with respect to zinc ion binding in the range 4.5-12.3 at 25° C. e.g. citrate, and (iv) a non-ionic surfactant which is an alkyl glycoside e.g. dodecyl maltoside; and wherein the formulation is substantially free of EDTA and any other zinc binding species having a log K with respect to zinc ion binding of more than 12.3 at 25° C., which exhibits an area under the curve on the pharmacodynamics profile within the first 45 minutes after injection that is substantially the same as (e.g. within ±20% e.g. ±10%) that of am aqueous formulation consisting of: insulin lispro (100 U/ml), sodium phosphate (13.2 mM), glycerol (174 mM), m-cresol (29 mM), ionic zinc (19.7 μg/ml, excluding counter-ion) adjusted to pH 7.3, using the Diabetic Pig Pharmacokinetic/Pharmacodynamic Model (see Examples, General Methods (c)).

In another embodiment, the present invention provides a composition comprising (i) insulin lispro e.g. at a concentration of 400-1000 U/ml or 500-1000 U/ml, (ii) ionic zinc, (iii) a zinc binding species at a concentration of 1 mM or more selected from species having a log K with respect to zinc ion binding in the range 4.5-12.3 at 25° C. e.g. citrate, and (iv) a non-ionic surfactant which is an alkyl glycoside e.g. dodecyl maltoside; and wherein the formulation is substantially free of EDTA and any other zinc binding species having a log K with respect to zinc ion binding of more than 12.3 at 25° C., which exhibits an area under the curve on the pharmacodynamics profile within the first 45 minutes after injection that is at least 20% greater, preferably at least 30% greater than an aqueous formulation consisting of: insulin lispro (100 U/ml), sodium phosphate (13.2 mM), glycerol (174 mM), m-cresol (29 mM), ionic zinc (19.7 μg/ml, excluding counter-ion) adjusted to pH 7.3, using the Diabetic Pig Pharmacokinetic/Pharmacodynamic Model (see Examples, General Methods (c)).

In one embodiment, the present invention provides a composition comprising (i) insulin aspart e.g. at a concentration of 400-1000 U/ml or 500-1000 U/ml, (ii) ionic zinc, (iii) a zinc binding species at a concentration of 1 mM or more selected from species having a log K with respect to zinc ion binding in the range 4.5-12.3 at 25° C. e.g. citrate, and (iv) a non-ionic surfactant which is an alkyl glycoside e.g. dodecyl maltoside; and wherein the formulation is substantially free of EDTA and any other zinc binding species having a log K with respect to zinc ion binding of more than 12.3 at 25° C. which exhibits a Tmax (i.e. time to peak insulin concentration) that is at least 20% shorter, preferably at least 30% shorter than an aqueous formulation consisting of: insulin aspart (100 U/ml), sodium phosphate (7 mM), glycerol (174 mM), sodium chloride (10 mM), phenol (15.9 mM), m-cresol (15.9 mM) and ionic zinc (19.7 μg/ml, excluding counter-anion) adjusted to pH 7.4, using the Diabetic Pig Pharmacokinetic/Pharmacodynamic Model (see Examples, General Methods (c)).

In one embodiment, the present invention provides a composition comprising (i) insulin aspart e.g. at a concentration of 400-1000 U/ml or 500-1000 U/ml, (ii) ionic zinc, (iii) a zinc binding species at a concentration of 1 mM or more selected from species having a log K with respect to zinc ion binding in the range 4.5-12.3 at 25° C. e.g. citrate, and (iv) a non-ionic surfactant which is an alkyl glycoside e.g. dodecyl maltoside; and wherein the formulation is substantially free of EDTA and any other zinc binding species having a log K with respect to zinc ion binding of more than 12.3 at 25° C. which exhibits a Tmax (i.e. time to peak insulin concentration) that is substantially the same as (e.g. within ±20% e.g. ±10%) that of an aqueous formulation consisting of: insulin aspart (100 U/ml), sodium phosphate (7 mM), glycerol (174 mM), sodium chloride (10 mM), phenol (15.9 mM), m-cresol (15.9 mM) and ionic zinc (19.7 μg/ml, excluding counter-anion) adjusted to pH 7.4, using the Diabetic Pig Pharmacokinetic/Pharmacodynamic Model (see Examples, General Methods (c)).

In another embodiment, the present invention provides a composition comprising (i) insulin aspart e.g. at a concentration of 400-1000 U/ml or 500-1000 U/ml, (ii) ionic zinc, (iii) a zinc binding species at a concentration of 1 mM or more selected from species having a log K with respect to zinc ion binding in the range 4.5-12.3 at 25° C. e.g. citrate, and (iv) a non-ionic surfactant which is an alkyl glycoside e.g. dodecyl maltoside; and wherein the formulation is substantially free of EDTA and any other zinc binding species having a log K with respect to zinc ion binding of more than 12.3 at 25° C., which exhibits an area under the curve on the pharmacodynamics profile within the first 45 minutes after injection that is at least 20% greater, preferably at least 30% greater than an aqueous formulation consisting of: insulin aspart (100 U/ml), sodium phosphate (7 mM), glycerol (174 mM), sodium chloride (10 mM), phenol (15.9 mM), m-cresol (15.9 mM) and ionic zinc (19.7 μg/ml, excluding counter-anion) adjusted to pH 7.4, using the Diabetic Pig Pharmacokinetic/Pharmacodynamic Model (see Examples, General Methods (c)).

In another embodiment, the present invention provides a composition comprising (i) insulin aspart e.g. at a concentration of 400-1000 U/ml or 500-1000 U/ml, (ii) ionic zinc, (iii) a zinc binding species at a concentration of 1 mM or more selected from species having a log K with respect to zinc ion binding in the range 4.5-12.3 at 25° C. e.g. citrate, and (iv) a non-ionic surfactant which is an alkyl glycoside e.g. dodecyl maltoside; and wherein the formulation is substantially free of EDTA and any other zinc binding species having a log K with respect to zinc ion binding of more than 12.3 at 25° C., which exhibits an area under the curve on the pharmacodynamics profile within the first 45 minutes after injection that is substantially the same as (e.g. within ±20% e.g. ±10%) that of an aqueous formulation consisting of: insulin aspart (100 U/ml), sodium phosphate (7 mM), glycerol (174 mM), sodium chloride (10 mM), phenol (15.9 mM), m-cresol (15.9 mM) and ionic zinc (19.7 μg/ml, excluding counter-anion) adjusted to pH 7.4, using the Diabetic Pig Pharmacokinetic/Pharmacodynamic Model (see Examples, General Methods (c)).

In another aspect of the invention is provided an aqueous liquid pharmaceutical formulation comprising (i) an insulin compound at a concentration of 400-1000 U/ml and (ii) ionic zinc; wherein the formulation is bioequivalent to a corresponding formulation comprising the insulin compound at a concentration of 100 U/ml.

As used herein, "bioequivalent" means that the formulation of the invention has an equivalent or similar pharmacokinetic/pharmacodynamic (PK/PD) profile to a corresponding formulation. For example, the formulation of the invention exhibits a TMAX or T½MAX (measured in accordance with the diabetic pig pharmacokinetic/pharmacodynamic model described in section (c) of General Methods) which is substantially the same as (e.g. within ±20%, e.g. within ±10%) of that of the corresponding formulation. Bioequivalence can also be established by applying the Student's t-test to the pharmacokinetic/pharmacodynamics results achieved using two different compositions as described in the diabetic pig pharmacokinetic/pharmacodynamic model described in section (c) of General Methods.

By "corresponding formulation" is meant a standard formulation e.g. a commercially available formulation of the same insulin compound at a concentration of 100 U/ml such as Humalog® (for insulin lispro) or NovoRapid® (for insulin aspart) or Apidra® (for insulin glulisine).

In one embodiment, the insulin compound is present at a concentration of 400-1000 U/ml e.g. >400-1000 U/ml, 500-1000 U/ml, >500-1000 U/ml e.g. 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the insulin compound is present at a concentration of 1000 U/ml.

In one embodiment is provided an aqueous liquid pharmaceutical formulation comprising (i) insulin lispro at a concentration of 500-1000 U/ml and (ii) ionic zinc; wherein the formulation is bioequivalent to a commercial formulation of insulin lispro at a concentration of 100 U/ml e.g. an aqueous formulation consisting of: insulin lispro (100 U/ml), sodium phosphate (13.2 mM), glycerol (174 mM), m-cresol (29 mM), ionic zinc (19.7 μg/ml, excluding counter-ion) adjusted to pH 7.3 (i.e. the formulation of Humalog®).

In one embodiment is provided an aqueous liquid pharmaceutical formulation comprising (i) insulin aspart at a concentration of 500-1000 U/ml and (ii) ionic zinc; wherein the formulation is bioequivalent to a commercial formulation of insulin aspart at a concentration of 100 U/ml e.g. an aqueous formulation consisting of: insulin aspart (100 U/ml), sodium phosphate (7 mM), glycerol (174 mM), sodium chloride (10 mM), phenol (15.9 mM), m-cresol (15.9 mM) and ionic zinc (19.7 μg/ml, excluding counter-anion) adjusted to pH 7.4 (i.e. the formulation of NovoRapid®).

In one embodiment of the formulation, the total percentage increase in related species during storage (e.g. at 30° C. for 1, 2 or 3 months) is no higher than that of a corresponding formulation comprising the insulin compound at a concentration of 100 U/ml. In another embodiment, the formulation comprises a zinc binding species at a concentration of 1 mM or more selected from species having a log K with respect to zinc ion binding in the range 4.5-12.3 at 25° C., which is suitably citrate. In one embodiment, the concentration of zinc binding species is from 30 mM to 50 mM. In one embodiment, the formulation comprises a non-ionic surfactant, especially a non-ionic surfactant such as an alkyl glycoside e.g. dodecyl maltoside. In one embodiment, the formulation is substantially free of EDTA and any other zinc binding species having a log K with respect to zinc ion binding of more than 12.3 at 25° C. In one embodiment, a Student's t-test applied to the TMAX of the aqueous liquid pharmaceutical formulation comprising an insulin compound at a concentration of 500-1000 U/ml and the corresponding formulation comprising the same insulin compound at a concentration of 100 U/ml provides a p-value of ≥0.05. In one embodiment, the formulation does not contain a vasodilator. In a further embodiment, the formulation does not contain treprostinil, nicotinamide, nicotinic acid or a salt thereof.

According to further aspects of the invention, there is provided a formulation of the invention for use in the treatment of a subject suffering from diabetes mellitus. There is also provided a method of treatment of diabetes mellitus which comprises administering to a subject in need thereof an effective amount of a formulation of the invention.

A typical insulin compound dose of the composition of the invention is 2-30 U, e.g. 5-15 U. Administration should suitably occur in the window between 15 minutes before eating (i.e. before start of a meal) and 15 minutes after eating (i.e. after end of a meal).

In one embodiment, the formulation of the invention is co-administered with a long acting insulin such as insulin glargine or insulin degludec, suitably at a concentration of 50-1000 U/ml e.g. 100-500 U/ml or 100-200 U/ml.

In one embodiment, the composition of the invention is for administration by intravenous injection or infusion, or subcutaneous or intramuscular injection. In one embodiment, the composition of the invention is not for administration by intranasal delivery.

An aspect of the invention is a container e.g. made of plastics or glass containing one dose or a plurality of doses of the formulation of the invention. The container can, for example, be a cartridge designed to be a replaceable item for use with an injection device.

The formulations of the invention may suitably be packaged for injection, especially sub-cutaneous or intramuscular injection. Sub-cutaneous injection is preferred. Injection may be by conventional syringe or more preferably via a pen device adapted for use by diabetic subjects. Exemplary pen devices include the Kwikpen® device and the Flexpen® device.

An aspect of the invention is an injection device, particularly a device adapted for subcutaneous or intramuscular injection, for single or multiple use comprising a container containing one dose or a plurality of doses of the formulation of the invention together with an injection needle. In an embodiment, the container is a replaceable cartridge which contains a plurality of doses. In an embodiment, the needle is replaceable e.g. after each occasion of use.

Another aspect of the invention is a medical device comprising a reservoir comprising a plurality of doses of the formulation of the invention and a pump adapted for automatic or remote operation such that upon automatic or remote operation one or more doses of the formulation of the invention is administered to the body e.g. subcutaneously or intramuscularly. Such devices may be worn on the outside of the body or implanted in the body.

Formulations of the invention may be prepared by mixing the ingredients. For example, the insulin compound may be dissolved in an aqueous formulation comprising the other components. Alternatively, the insulin compound may be dissolved in a strong acid (typically HCl), after dissolution diluted with an aqueous formulation comprising the other components, and then pH adjusted to the desired pH with addition of alkali (e.g. NaOH). As a variation on this method, a step of neutralising the acid solution may be performed before the dilution step and it may then not be necessary to adjust the pH after the dilution step (or a small adjustment only may be necessary).

According to another aspect of the invention there is provided a dry solid pharmaceutical composition suitable for reconstitution with an aqueous medium which comprises, following reconstitution, (i) an insulin compound, (ii) ionic zinc e.g. at a concentration of 0.05% or more e.g. 0.5% or more by weight of zinc based on the weight of insulin compound in the formulation, (iii) a zinc binding species at a concentration of 1 mM or more selected from species having a log K with respect to zinc ion binding in the range 4.5-12.3 at 25° C., and (iv) a non-ionic surfactant which is an alkyl glycoside; and wherein the composition is substantially free of EDTA and any other zinc binding species having a log K with respect to zinc ion binding of more than 12.3 at 25° C. Thus, a formulation of the invention may be prepared by dissolving such a dry solid pharmaceutical composition in an aqueous medium e.g. water or saline. Such a dry solid pharmaceutical composition may be prepared by dehydrating (e.g. freeze drying) a formulation of the invention. The invention also provides a container containing one dose or a plurality of doses of such a dry solid pharmaceutical composition.

Further aspects of the invention include:

A method of improving the storage stability of an aqueous liquid pharmaceutical formulation comprising (i) an insulin compound, (ii) ionic zinc e.g. at a concentration of 0.05% or more e.g. 0.5% or more by weight of zinc based on the weight of insulin compound in the formulation and (iii) a zinc binding species at a concentration of 1 mM or more selected from species having a log K with respect to zinc ion binding in the range 4.5-12.3 at 25° C. e.g. citrate; wherein the formulation is substantially free of EDTA and any other zinc binding species having a log K with respect to zinc ion binding of more than 12.3 at 25° C.; which comprises adding a non-ionic surfactant which is an alkyl glycoside, particularly dodecyl maltoside, to the formulation. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate and the citrate concentration in the formulation is 1-100 mM, e.g. 15-60 mM, e.g. 20-50, 20-30 mM, e.g. 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

A method of improving the storage stability of an aqueous liquid pharmaceutical formulation consisting of (i) an insulin compound, (ii) ionic zinc e.g. at a concentration of 0.05% or more e.g. 0.5% or more by weight of zinc based on the weight of insulin compound in the formulation; (iii) a zinc binding species at a concentration of 1 mM or more selected from species having a log K with respect to zinc ion binding in the range 4.5-12.3 at 25° C. e.g. citrate; (iv) optionally one or more buffers e.g. phosphate such as sodium phosphate; (v) optionally one or more preservatives e.g. phenol and m-cresol; and (vi) optionally one or more tonicity modifiers e.g. glycerol or NaCl; wherein the formulation is substantially free of EDTA and any other zinc binding species having a log K with respect to zinc ion binding of more than 12.3 at 25° C.; which comprises adding a non-ionic surfactant which is an alkyl glycoside, particularly dodecyl maltoside, to the formulation. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate and the citrate concentration in the formulation is 1-100 mM, e.g. 15-60 mM, e.g. 20-50, 20-30 mM, e.g. 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

A method of improving the storage stability of an aqueous liquid pharmaceutical formulation consisting of (i) an insulin compound, (ii) ionic zinc e.g. at a concentration of 0.05% or more e.g. 0.5% or more by weight of zinc based on the weight of insulin compound in the formulation; (iii) a zinc binding species at a concentration of 1 mM or more selected from species having a log K with respect to zinc ion binding in the range 4.5-12.3 at 25° C. e.g. citrate; (iv) optionally one or more buffers e.g. phosphate such as sodium phosphate; (v) optionally one or more preservatives e.g. phenol and m-cresol; and (vi) optionally one or more tonicity modifiers e.g. glycerol or NaCl; which comprises adding a non-ionic surfactant which is an alkyl glycoside, particularly dodecyl maltoside, to the formulation. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate and the citrate concentration in the formulation is 1-100 mM, e.g. 15-60 mM, e.g. 20-50, 20-30 mM, e.g. 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

Use of a non-ionic surfactant which is an alkyl glycoside, particularly dodecyl maltoside, to improve the storage stability of an aqueous liquid pharmaceutical formulation comprising (i) an insulin compound, (ii) ionic zinc e.g. at a concentration of 0.05% or more e.g. 0.5% or more by weight of zinc based on the weight of insulin compound in the formulation and (iii) a zinc binding species at a concentration of 1 mM or more selected from species having a log K with respect to zinc ion binding in the range 4.5-12.3 at 25° C. e.g. citrate; wherein the formulation is substantially free of EDTA and any other zinc binding species having a log K with respect to zinc ion binding of more than 12.3 at 25° C. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate and the citrate concentration in the formulation is 1-100 mM, e.g. 15-60 mM, e.g. 20-50, 20-30 mM, e.g. 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

Use of a non-ionic surfactant which is an alkyl glycoside, particularly dodecyl maltoside, to improve the storage stability of an aqueous liquid pharmaceutical formulation consisting of (i) an insulin compound, (ii) ionic zinc e.g. at a concentration of 0.05% or more e.g. 0.5% or more by weight of zinc based on the weight of insulin compound in the formulation; (iii) a zinc binding species at a concentration of 1 mM or more selected from species having a log K with respect to zinc ion binding in the range 4.5-12.3 at 25° C. e.g. citrate; (iv) optionally one or more buffers e.g. phosphate such as sodium phosphate; (v) optionally one or more preservatives e.g. phenol and m-cresol; and (vi) optionally one ore more tonicity modifiers e.g. glycerol or NaCl, wherein the formulation is substantially free of EDTA and any other zinc binding species having a log K with respect to zinc ion binding of more than 12.3 at 25° C. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate and the citrate concentration in the formulation is 1-100 mM, e.g. 15-60 mM, e.g. 20-50, 20-30 mM, e.g. 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

Use of a non-ionic surfactant which is an alkyl glycoside, particularly dodecyl maltoside, to improve the storage stability of an aqueous liquid pharmaceutical formulation consisting of (i) an insulin compound, (ii) ionic zinc e.g. at a concentration of 0.05% or more e.g. 0.5% or more by weight of zinc based on the weight of insulin compound in the formulation; (iii) a zinc binding species at a concentration of 1 mM or more selected from species having a log K with respect to zinc ion binding in the range 4.5-12.3 at 25° C. e.g. citrate; (iv) optionally one or more buffers e.g. phosphate such as sodium phosphate; (v) optionally one or more preservatives e.g. phenol and m-cresol; and (vi) optionally one ore more tonicity modifiers e.g. glycerol or NaCl. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate and the citrate concentration in the formulation is 1-100 mM, e.g. 15-60 mM, e.g. 20-50, 20-30 mM, e.g. 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation comprising (i) an insulin compound, (ii) ionic zinc, (iii) a zinc binding species at a concentration of 1 mM or more selected from species having a log K with respect to zinc ion binding in the range 4.5-10 at 25° C. e.g. citrate, and (iv) a non-ionic surfactant which is an alkyl glycoside, particularly dodecyl maltoside; and wherein the formulation is substantially free of EDTA and any other zinc binding species having a log K with respect to zinc ion binding of more than 10 at 25° C. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration is 1-100 mM, e.g. 15-60 mM, e.g. 20-50, 20-30 mM, e.g. 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation consisting of (i) an insulin compound, (ii) ionic zinc, (iii) a zinc binding species at a concentration of 1 mM or more selected from species having a log K with respect to zinc ion binding in the range 4.5-10 at 25° C. e.g. citrate, (iv) a non-ionic surfactant which is an alkyl glycoside, particularly dodecyl maltoside; (v) optionally one or more buffers e.g. phosphate such as sodium phosphate; (vi) optionally one or more preservatives e.g. phenol and m-cresol; (vii) optionally one or more tonicity modifiers e.g. glycerol or NaCl, and (viii) optionally one or more additional active agents such as an amylin analogue such as pramlintide or a GLP-1 agonist such as liraglutide, dulaglutide, albiglutide, exenatide or lixisenatide; and wherein the formulation is substantially free of EDTA and any other zinc binding species having a log K with respect to zinc ion binding of more than 10 at 25° C. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, e.g. 20-50, 20-30 mM, e.g. 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation consisting of (i) an insulin compound, (ii) ionic zinc, (iii) a zinc binding species at a concentration of 1 mM or more selected from species having a log K with respect to zinc ion binding in the range 4.5-10 at 25° C. e.g. citrate, (iv) a non-ionic surfactant which is an alkyl glycoside, particularly dodecyl maltoside; (v) optionally one or more buffers e.g. phosphate such as sodium phosphate; (vi) optionally one or more preservatives e.g. phenol and m-cresol; (vii) optionally one or more tonicity modifiers e.g. glycerol or NaCl, and (viii) optionally one or more additional active agents such as an amylin analogue such as pramlintide or a GLP-1 agonist such as liraglutide, dulaglutide, albiglutide, exenatide or lixisenatide. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, e.g. 20-50, 20-30 mM, e.g. 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation comprising (i) an insulin compound, (ii) ionic zinc, (iii) a zinc binding species at a concentration of 1 mM or more selected from species having a log K with respect to zinc ion binding in the range 4.5-10 at 25° C. e.g. citrate, and (iv) a non-ionic surfactant which is an alkyl glycoside, particularly dodecyl maltoside; and wherein the formulation is substantially free of EDTA and any other zinc binding species having a log K with respect to zinc ion binding of more than 10 at 25° C., wherein the insulin compound is present at a concentration of 10-1000 U/ml, such as 50-500 U/ml, 50-200 U/ml, 100 U/ml, 1000 U/ml, 50-1000 U/ml, 10-500 U/ml, 10 to <500 U/ml, 50-500 U/ml, 50-<500 U/ml, 100-500 U/ml, 100-<500 U/ml, 10-400 U/ml, 10 to <400 U/ml, 50-400 U/ml, 50-<400 U/ml, 100-400 U/ml, 100-<400 U/ml, 10-300 U/ml, 10-<300 U/ml, 50-300 U/ml, 50-<300 U/ml, 100-300 U/ml, 100-<300 U/ml, 10-250 U/ml, 10-<250 U/ml, 50-250 U/ml, 50-<250 U/ml, 100-250 U/ml, 100-<250 U/ml, 10-200 U/ml, 10-<200 U/ml, 50-200 U/ml, 50-<200 U/ml, 100-200 U/ml, 100-<200 U/ml, 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, e.g. 20-50, 20-30 mM, e.g. 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation consisting of (i) an insulin compound, (ii) ionic zinc, (iii) a zinc binding species at a concentration of 1 mM or more selected from species having a log K with respect to zinc ion binding in the range 4.5-10 at 25° C. e.g. citrate, and (iv) a non-ionic surfactant which is an alkyl glycoside, particularly dodecyl maltoside; (v) optionally one or more buffers e.g. phosphate such as sodium phosphate; (vi) optionally one or more preservatives e.g. phenol and m-cresol; (vii) optionally one or more tonicity modifiers e.g. glycerol or NaCl, and (viii) optionally one or more additional active agents such as an amylin analogue such as pramlintide or a GLP-1 agonist such as liraglutide, dulaglutide, albiglutide, exenatide or lixisenatide; and wherein the formulation is substantially free of EDTA and any other zinc binding species having a log K with respect to zinc ion binding of more than 10 at 25° C., wherein the insulin compound is present at a concentration of 10-1000 U/ml, such as 50-500 U/ml, 50-200 U/ml, 100 U/ml, 1000 U/ml, 50-1000 U/ml, 10-500 U/ml, 10 to <500 U/ml, 50-500 U/ml, 50-<500 U/ml, 100-500 U/ml, 100-<500 U/ml, 10-400 U/ml, 10 to <400 U/ml, 50-400 U/ml, 50-<400 U/ml, 100-400 U/ml, 100-<400 U/ml, 10-300 U/ml, 10-<300 U/ml, 50-300 U/ml, 50-<300 U/ml, 100-300 U/ml, 100-<300 U/ml, 10-250 U/ml, 10-<250 U/ml, 50-250 U/ml, 50-<250 U/ml, 100-250 U/ml, 100-<250 U/ml, 10-200 U/ml, 10-<200 U/ml, 50-200 U/ml, 50-<200 U/ml, 100-200 U/ml, 100-<200 U/ml, 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, e.g. 20-50, 20-30 mM, e.g. 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation consisting of (i) an insulin compound, (ii) ionic zinc, (iii) a zinc binding species at a concentration of 1 mM or more selected from species having a log K with respect to zinc ion binding in the range 4.5-10 at 25° C. e.g. citrate (iv) a non-ionic surfactant which is an alkyl glycoside, particularly dodecyl maltoside; (v) optionally one or more buffers e.g. phosphate such as sodium phosphate; (vi) optionally one or more preservatives e.g. phenol and m-cresol; (vii) optionally one or more tonicity modifiers e.g. glycerol or NaCl, and (viii) optionally one or more additional active agents such as an amylin analogue such as pramlintide or a GLP-1 agonist such as liraglutide, dulaglutide, albiglutide, exenatide or lixisenatide; wherein the insulin compound is present at a concentration of 10-1000 U/ml, such as 50-500 U/ml, 50-200 U/ml, 100 U/ml, 1000 U/ml, 50-1000 U/ml, 10-500 U/ml, 10 to <500 U/ml, 50-500 U/ml, 50-<500 U/ml, 100-500 U/ml, 100-<500 U/ml, 10-400 U/ml, 10 to <400 U/ml, 50-400 U/ml, 50-<400 U/ml, 100-400 U/ml, 100-<400 U/ml, 10-300 U/ml, 10-<300 U/ml, 50-300 U/ml, 50-<300 U/ml, 100-300 U/ml, 100-<300 U/ml, 10-250 U/ml, 10-<250 U/ml, 50-250 U/ml, 50-<250 U/ml, 100-250 U/ml, 100-<250 U/ml, 10-200 U/ml, 10-<200 U/ml, 50-200 U/ml, 50-<200 U/ml, 100-200 U/ml, 100-<200 U/ml, 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, e.g. 20-50, 20-30 mM, e.g. 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation comprising (i) an insulin compound, (ii) ionic zinc, (iii) citrate as a zinc binding species at a concentration of 1 mM, and (iv) a non-ionic surfactant which is an alkyl glycoside, particularly dodecyl maltoside; and wherein the formulation is substantially free of EDTA and any other zinc binding species having a log K with respect to zinc ion binding of more than 10 at 25° C., wherein the insulin compound is present at a concentration of 10-1000 U/ml, such as 50-500 U/ml, 50-200 U/ml, 100 U/ml, 1000 U/ml, 50-1000 U/ml, 10-500 U/ml, 10 to <500 U/ml, 50-500 U/ml, 50-<500 U/ml, 100-500 U/ml, 100-<500 U/ml, 10-400 U/ml, 10 to <400 U/ml, 50-400 U/ml, 50-<400 U/ml, 100-400 U/ml, 100-<400 U/ml, 10-300 U/ml, 10-<300 U/ml, 50-300 U/ml, 50-<300 U/ml, 100-300 U/ml, 100-<300 U/ml, 10-250 U/ml, 10-<250 U/ml, 50-250 U/m, 50-<250 U/ml, 100-250 U/ml, 100-<250 U/ml, 10-200 U/ml, 10-<200 U/ml, 50-200 U/ml, 50-<200 U/ml, 100-200 U/ml, 100-<200 U/ml, 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the citrate concentration is 1-100 mM, e.g. 15-60 mM, 20-50 mM, 20-30 or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation consisting of (i) an insulin compound, (ii) ionic zinc, (iii) citrate as a zinc binding species at a concentration of 1 mM or more, (iv) a non-ionic surfactant which is an alkyl glycoside, particularly dodecyl maltoside; (v) optionally one or more buffers e.g. phosphate such as sodium phosphate; (vi) optionally one or more preservatives e.g. phenol and m-cresol; (vii) optionally one or more tonicity modifiers e.g. glycerol or NaCl, and (viii) optionally one or more additional active agents such as an amylin analogue such as pramlintide or a GLP-1 agonist such as liraglutide, dulaglutide, albiglutide, exenatide or lixisenatide, and wherein the formulation is substantially free of EDTA and any other zinc binding species having a log K with respect to zinc ion binding of more than 10 at 25° C., wherein the insulin compound is present at a concentration of 10-1000 U/ml, such as 50-500 U/ml, 50-200 U/ml, 100 U/ml, 1000 U/ml, 50-1000 U/ml, 10-500 U/ml, 10 to <500 U/ml, 50-500 U/ml, 50-<500 U/ml, 100-500 U/ml, 100-<500 U/ml, 10-400 U/ml, 10 to <400 U/ml, 50-400 U/ml, 50-<400 U/ml, 100-400 U/ml, 100-<400 U/ml, 10-300 U/ml, 10-<300 U/ml, 50-300 U/ml, 50-<300 U/ml, 100-300 U/ml, 100-<300 U/ml, 10-250 U/ml, 10-<250 U/ml, 50-250 U/ml, 50-<250 U/ml, 100-250 U/ml, 100-<250 U/ml, 10-200 U/ml, 10-<200 U/ml, 50-200 U/ml, 50-<200 U/ml, 100-200 U/ml, 100-<200 U/ml, 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the citrate concentration is 1-100 mM, e.g. 15-60 mM, e.g. 20-50, 20-30 mM, e.g. 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation consisting of (i) an insulin compound, (ii) ionic zinc, (iii) citrate as a zinc binding species at a concentration of 1 mM or more, (iv) a non-ionic surfactant which is an alkyl glycoside, particularly dodecyl maltoside; (v) optionally one or more buffers e.g. phosphate such as sodium phosphate; (vi) optionally one or more preservatives e.g. phenol and m-cresol; (vii) optionally one or more tonicity modifiers e.g. glycerol or NaCl, and (viii) optionally one or more additional active agents such as an amylin analogue such as pramlintide or a GLP-1 agonist such as liraglutide, dulaglutide, albiglutide, exenatide or lixisenatide, wherein the insulin compound is present at a concentration of 10-1000 U/ml, such as 50-500 U/ml, 50-200 U/ml, 100 U/ml, 1000 U/ml, 50-1000 U/ml, 10-500 U/ml, 10 to <500 U/ml, 50-500 U/ml, 50-<500 U/ml, 100-500 U/ml, 100-<500 U/ml, 10-400 U/ml, 10 to <400 U/ml, 50-400 U/ml, 50-<400 U/ml, 100-400 U/ml, 100-<400 U/ml, 10-300 U/ml, 10-<300 U/ml, 50-300 U/ml, 50-<300 U/ml, 100-300 U/ml, 100-<300 U/ml, 10-250 U/ml, 10-<250 U/ml, 50-250 U/ml, 50-<250 U/ml, 100-250 U/ml, 100-<250 U/ml, 10-200 U/ml, 10-<200 U/ml, 50-200 U/ml, 50-<200 U/ml, 100-200 U/ml, 100-<200 U/ml, 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the citrate concentration is 1-100 mM, e.g. 15-60 mM, e.g. 20-50, 20-30 mM, e.g. 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation comprising (i) an insulin compound, (ii) ionic zinc, (iii) a zinc binding species at a concentration of 1 mM or more selected from species having a log K with respect to zinc ion binding in the range 4.5-10 at 25° C. e.g. citrate, (iv) a non-ionic surfactant which is an alkyl glycoside, particularly dodecyl maltoside; and (v) treprostinil or a salt thereof; and wherein the formulation is substantially free of EDTA and any other zinc binding species having a log K with respect to zinc ion binding of more than 10 at 25° C., wherein the insulin compound is present at a concentration of 10-1000 U/ml, such as 50-500 U/ml, 50-200 U/ml, 100 U/ml, 1000 U/ml, 50-1000 U/ml, 10-500 U/ml, 10 to <500 U/ml, 50-500 U/ml, 50-<500 U/ml, 100-500 U/ml, 100-<500 U/ml, 10-400 U/ml, 10 to <400 U/ml, 50-400 U/ml, 50-<400 U/ml, 100-400 U/ml, 100-<400 U/ml, 10-300 U/ml, 10-<300 U/ml, 50-300 U/ml, 50-<300 U/ml, 100-300 U/ml, 100-<300 U/ml, 10-250 U/ml, 10-<250 U/ml, 50-250 U/ml, 50-<250 U/ml, 100-250 U/ml, 100-<250 U/ml, 10-200 U/ml, 10-<200 U/ml, 50-200 U/ml, 50-<200 U/ml, 100-200 U/ml, 100-<200 U/ml, 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the treprostinil is at a concentration in the range 0.1-12 μg/ml e.g. 0.1-10 μg/ml, 0.1-9 μg/ml, 0.1-8 μg/ml, 0.1-7 μg/ml, 0.1-6 μg/ml, 0.1-5 μg/ml, 0.1-4 μg/ml, 0.1-3 μg/ml, 0.1-2 μg/ml, 0.5-2 μg/ml e.g. about 1 μg/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation consisting of (i) an insulin compound, (ii) ionic zinc, (iii) a zinc binding species at a concentration of 1 mM or more selected from species having a log K with respect to zinc ion binding in the range 4.5-10 at 25° C., (iv) a non-ionic surfactant which is an alkyl glycoside, particularly dodecyl maltoside; (v) treprostinil or a salt thereof; (vi) optionally one or more buffers e.g. phosphate such as sodium phosphate; (vii) optionally one or more preservatives e.g. phenol and m-cresol; (viii) optionally one or more tonicity modifiers e.g. glycerol or NaCl, and (viii) optionally one or more additional active agents such as an amylin analogue such as pramlintide or a GLP-1 agonist such as liraglutide, dulaglutide, albiglutide, exenatide or lixisenatide, and wherein the formulation is substantially free of EDTA and any other zinc binding species having a log K with respect to zinc ion binding of more than 10 at 25° C., wherein the insulin compound is present at a concentration of 10-1000 U/ml, such as 50-500 U/ml, 50-200 U/ml, 100 U/ml, 1000 U/ml, 50-1000 U/ml, 10-500 U/ml, 10 to <500 U/ml, 50-500 U/ml, 50-<500 U/ml, 100-500 U/ml, 100-<500 U/ml, 10-400 U/ml, 10 to <400 U/ml, 50-400 U/ml, 50-<400 U/ml, 100-400 U/ml, 100-<400 U/ml, 10-300 U/ml, 10-<300 U/ml, 50-300 U/ml, 50-<300 U/ml, 100-300 U/ml, 100-<300 U/ml, 10-250 U/ml, 10-<250 U/ml, 50-250 U/ml, 50-<250 U/ml, 100-250 U/ml, 100-<250 U/ml, 10-200 U/ml, 10-<200 U/ml, 50-200 U/ml, 50-<200 U/ml, 100-200 U/ml, 100-<200 U/ml, 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the treprostinil is at a concentration in the range 0.1-12 μg/ml e.g. 0.1-10 μg/ml, 0.1-9 μg/ml, 0.1-8 μg/ml, 0.1-7 μg/ml, 0.1-6 μg/ml, 0.1-5 μg/ml, 0.1-4 μg/ml, 0.1-3 μg/ml, 0.1-2

μg/ml, 0.5-2 μg/ml e.g. about 1 μg/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation consisting of (i) an insulin compound, (ii) ionic zinc, (iii) a zinc binding species at a concentration of 1 mM or more selected from species having a log K with respect to zinc ion binding in the range 4.5-10 at 25° C., (iv) a non-ionic surfactant which is an alkyl glycoside, particularly dodecyl maltoside; (v) treprostinil or a salt thereof; (vi) optionally one or more buffers e.g. phosphate such as sodium phosphate; (vii) optionally one or more preservatives e.g. phenol and m-cresol; (viii) optionally one or more tonicity modifiers e.g. glycerol or NaCl, and (viii) optionally one or more additional active agents such as an amylin analogue such as pramlintide or a GLP-1 agonist such as liraglutide, dulaglutide, albiglutide, exenatide or lixisenatide, wherein the insulin compound is present at a concentration of 10-1000 U/ml, such as 50-500 U/ml, 50-200 U/ml, 100 U/ml, 1000 U/ml, 50-1000 U/ml, 10-500 U/ml, 10 to <500 U/ml, 50-500 U/ml, 50-<500 U/ml, 100-500 U/ml, 100-<500 U/ml, 10-400 U/ml, 10 to <400 U/ml, 50-400 U/ml, 50-<400 U/ml, 100-400 U/ml, 100-<400 U/ml, 10-300 U/ml, 10-<300 U/ml, 50-300 U/ml, 50-<300 U/ml, 100-300 U/ml, 100-<300 U/ml, 10-250 U/ml, 10-<250 U/ml, 50-250 U/ml, 50-<250 U/ml, 100-250 U/ml, 100-<250 U/ml, 10-200 U/ml, 10-<200 U/ml, 50-200 U/ml, 50-<200 U/ml, 100-200 U/ml, 100-<200 U/ml, 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the treprostinil is at a concentration in the range 0.1-12 μg/ml e.g. 0.1-10 μg/ml, 0.1-9 μg/ml, 0.1-8 μg/ml, 0.1-7 μg/ml, 0.1-6 μg/ml, 0.1-5 μg/ml, 0.1-4 μg/ml, 0.1-3 μg/ml, 0.1-2 μg/ml, 0.5-2 μg/ml e.g. about 1 μg/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation comprising (i) an insulin compound, (ii) ionic zinc, (iii) a zinc binding species at a concentration of 1 mM or more selected from species having a log K with respect to zinc ion binding in the range 4.5-10 at 25° C. e.g. citrate, (iv) a non-ionic surfactant which is an alkyl glycoside, particularly dodecyl maltoside; and (v) nicotinamide, nicotinic acid or a salt thereof; and wherein the formulation is substantially free of EDTA and any other zinc binding species having a log K with respect to zinc ion binding of more than 10 at 25° C., wherein the insulin compound is present at a concentration of 10-1000 U/ml, such as 50-500 U/ml, 50-200 U/ml, 100 U/ml, 1000 U/ml, 50-1000 U/ml, 10-500 U/ml, 10 to <500 U/ml, 50-500 U/ml, 50-<500 U/ml, 100-500 U/ml, 100-<500 U/ml, 10-400 U/ml, 10 to <400 U/ml, 50-400 U/ml, 50-<400 U/ml, 100-400 U/ml, 100-<400 U/ml, 10-300 U/ml, 10-<300 U/ml, 50-300 U/ml, 50-<300 U/ml, 100-300 U/ml, 100-<300 U/ml, 10-250 U/ml, 10-<250 U/ml, 50-250 U/ml, 50-<250 U/ml, 100-250 U/ml, 100-<250 U/ml, 10-200 U/ml, 10-<200 U/ml, 50-200 U/ml, 50-<200 U/ml, 100-200 U/ml, 100-<200 U/ml, 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the nicotinamide, nicotinic acid or salt thereof is at a concentration in the range 10-150 mM, e.g. 20-100 mM such as around 80 mM. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation comprising (i) an insulin compound, (ii) ionic zinc, (iii) a zinc binding species at a concentration of 1 mM or more selected from species having a log K with respect to zinc ion binding in the range 4.5-10 at 25° C. e.g. citrate, (iv) a non-ionic surfactant which is an alkyl glycoside, particularly dodecyl maltoside; and (v) an amylin analogue such as pramlintide; and wherein the formulation is substantially free of EDTA and any other zinc binding species having a log K with respect to zinc ion binding of more than 10 at 25° C., wherein the insulin compound is present at a concentration of 10-1000 U/ml, such as 50-500 U/ml, 50-200 U/ml, 100 U/ml, 1000 U/ml, 50-1000 U/ml, 10-500 U/ml, 10 to <500 U/ml, 50-500 U/ml, 50-<500 U/ml, 100-500 U/ml, 100-<500 U/ml, 10-400 U/ml, 10 to <400 U/ml, 50-400 U/ml, 50-<400 U/ml, 100-400 U/ml, 100-<400 U/ml, 10-300 U/ml, 10-<300 U/ml, 50-300 U/ml, 50-<300 U/ml, 100-300 U/ml, 100-<300 U/ml, 10-250 U/ml, 10-<250 U/ml, 50-250 U/ml, 50-<250 U/ml, 100-250 U/ml, 100-<250 U/ml, 10-200 U/ml, 10-<200 U/ml, 50-200 U/ml, 50-<200 U/ml, 100-200 U/ml, 100-<200 U/ml, 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the amylin analogue, e.g. pramlintide, is at a concentration in the range 0.1-10 mg/ml, e.g. 0.2-6 mg/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation consisting of (i) an insulin compound, (ii) ionic zinc, (iii) a zinc binding species at a concentration of 1 mM or more selected from species having a log K with respect to zinc ion binding in the range 4.5-10 at 25° C. e.g. citrate, (iv) a non-ionic surfactant which is an alkyl glycoside, particularly dodecyl maltoside; (v) an amylin analogue such as pramlintide; (vi) optionally one or more buffers e.g. phosphate such as sodium phosphate; (vii) optionally one or more preservatives e.g. phenol and m-cresol; and (viii) optionally one or more tonicity modifiers e.g. glycerol or NaCl, and wherein the formulation is substantially free of EDTA and any other zinc binding species having a log K with respect to zinc ion binding of more than 10 at 25° C., wherein the insulin compound is present at a concentration of 10-1000 U/ml, such as 50-500 U/ml, 50-200 U/ml, 100 U/ml, 1000 U/ml, 50-1000 U/ml, 10-500 U/ml, 10 to <500 U/ml, 50-500 U/ml, 50-<500 U/ml, 100-500 U/ml, 100-<500 U/ml, 10-400 U/ml, 10 to <400 U/ml, 50-400 U/ml, 50-<400 U/ml, 100-400 U/ml, 100-<400 U/ml, 10-300 U/ml, 10-<300 U/ml, 50-300 U/ml, 50-<300 U/ml, 100-300 U/ml, 100-<300 U/ml, 10-250 U/ml, 10-<250 U/ml, 50-250 U/ml, 50-<250 U/ml, 100-250 U/ml, 100-<250 U/ml, 10-200 U/ml, 10-<200 U/ml, 50-200 U/ml, 50-<200 U/ml, 100-200 U/ml, 100-<200 U/ml, 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the amylin analogue, e.g. pramlintide is at a concentration in the range 0.1-10 mg/ml, e.g. 0.2-6 mg/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation consisting of (i) an insulin compound, (ii) ionic zinc, (iii) a zinc binding species at a concentration of 1 mM or more selected from species having a log K with respect to zinc ion binding in the range 4.5-10 at 25° C. e.g. citrate, (iv) a non-ionic surfactant which is an alkyl glycoside, particularly dodecyl maltoside; (v) an amylin analogue such as pramlintide; (vi) optionally one or more buffers e.g. phosphate such as sodium phosphate; (vii) optionally one or more preservatives e.g. phenol and m-cresol; and (viii) optionally one or more tonicity modifiers e.g. glycerol or NaCl, wherein the insulin compound is present at a concentration of 10-1000 U/ml, such as 50-500 U/ml, 50-200 U/ml, 100 U/ml, 1000 U/ml, 50-1000 U/ml, 10-500 U/ml, 10 to <500 U/ml, 50-500 U/ml, 50-<500 U/ml, 100-500 U/ml, 100-<500 U/ml, 10-400 U/ml, 10 to <400 U/ml, 50-400 U/ml, 50-<400 U/ml, 100-400 U/ml, 100-<400 U/ml, 10-300 U/ml, 10-<300 U/ml, 50-300 U/ml, 50-<300 U/ml, 100-300 U/ml, 100-<300 U/ml, 10-250 U/ml, 10-<250 U/ml, 50-250 U/ml, 50-<250 U/ml, 100-250 U/ml, 100-<250 U/ml, 10-200 U/ml, 10-<200 U/ml, 50-200 U/ml, 50-<200 U/ml, 100-200 U/ml, 100-<200 U/ml, 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the amylin analogue, e.g. pramlintide is at a concentration in the range 0.1-10 mg/ml, e.g. 0.2-6 mg/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation comprising (i) an insulin compound, (ii) ionic zinc, (iii) a zinc binding species at a concentration of 1 mM or more selected from species having a log K with respect to zinc ion binding in the range 4.5-10 at 25° C. e.g. citrate, (iv) a non-ionic surfactant which is an alkyl glycoside, particularly dodecyl maltoside; and (v) a GLP-1 agonist such as liraglutide, dulaglutide, albiglutide, exenatide or lixisenatide; and wherein the formulation is substantially free of EDTA and any other zinc binding species having a log K with respect to zinc ion binding of more than 10 at 25° C., wherein the insulin compound is present at a concentration of 10-1000 U/ml, such as 50-500 U/ml, 50-200 U/ml, 100 U/ml, 1000 U/ml, 50-1000 U/ml, 10-500 U/ml, 10 to <500 U/ml, 50-500 U/ml, 50-<500 U/ml, 100-500 U/ml, 100-<500 U/ml, 10-400 U/ml, 10 to <400 U/ml, 50-400 U/ml, 50-<400 U/ml, 100-400 U/ml, 100-<400 U/ml, 10-300 U/ml, 10-<300 U/ml, 50-300 U/ml, 50-<300 U/ml, 100-300 U/ml, 100-<300 U/ml, 10-250 U/ml, 10-<250 U/ml, 50-250 U/ml, 50-<250 U/ml, 100-250 U/ml, 100-<250 U/ml, 10-200 U/ml, 10-<200 U/ml, 50-200 U/ml, 50-<200 U/ml, 100-200 U/ml, 100-<200 U/ml, 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the GLP-1 agonist, e.g. liraglutide, dulaglutide, albiglutide, exenatide or lixisenatide is at a concentration range of 10 μg/ml to 50 mg/ml, 200 ug/ml to 10 mg/ml, or 1-10 mg/ml. In one embodiment, the alkyl glycoside is dodecyl maltoside at a concentration in the range 1-1000 μg/ml, e.g. 5-500 μg/ml, e.g.

10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation consisting of (i) an insulin compound, (ii) ionic zinc, (iii) a zinc binding species at a concentration of 1 mM or more selected from species having a log K with respect to zinc ion binding in the range 4.5-10 at 25° C., (iv) a non-ionic surfactant which is an alkyl glycoside, particularly dodecyl maltoside; (v) a GLP-1 agonist such as liraglutide, dulaglutide, albiglutide, exenatide or lixisenatide; (vi) optionally one or more buffers e.g. phosphate such as sodium phosphate; (vii) optionally one or more preservatives e.g. phenol and m-cresol; and (viii) optionally one or more tonicity modifiers e.g. glycerol or NaCl, and wherein the formulation is substantially free of EDTA and any other zinc binding species having a log K with respect to zinc ion binding of more than 10 at 25° C., wherein the insulin compound is present at a concentration of 10-1000 U/ml, such as 50-500 U/ml, 50-200 U/ml, 100 U/ml, 1000 U/ml, 50-1000 U/ml, 10-500 U/ml, 10 to <500 U/ml, 50-500 U/ml, 50-<500 U/ml, 100-500 U/ml, 100-<500 U/ml, 10-400 U/ml, 10 to <400 U/ml, 50-400 U/ml, 50-<400 U/ml, 100-400 U/ml, 100-<400 U/ml, 10-300 U/ml, 10-<300 U/ml, 50-300 U/ml, 50-<300 U/ml, 100-300 U/ml, 100-<300 U/ml, 10-250 U/ml, 10-<250 U/ml, 50-250 U/ml, 50-<250 U/ml, 100-250 U/ml, 100-<250 U/ml, 10-200 U/ml, 10-<200 U/ml, 50-200 U/ml, 50-<200 U/ml, 100-200 U/ml, 100-<200 U/ml, 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the GLP-1 agonist, e.g. liraglutide, dulaglutide, albiglutide, exenatide or lixisenatide is at a concentration range of 10 μg/ml to 50 mg/ml, 200 ug/ml to 10 mg/ml, or 1-10 mg/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, e.g. 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation consisting of (i) an insulin compound, (ii) ionic zinc, (iii) a zinc binding species at a concentration of 1 mM or more selected from species having a log K with respect to zinc ion binding in the range 4.5-10 at 25° C., (iv) a non-ionic surfactant which is an alkyl glycoside, particularly dodecyl maltoside; (v) a GLP-1 agonist such as liraglutide, dulaglutide, albiglutide, exenatide or lixisenatide; (vi) optionally one or more buffers e.g. phosphate such as sodium phosphate; (vii) optionally one or more preservatives e.g. phenol and m-cresol; and (viii) optionally one or more tonicity modifiers e.g. glycerol or NaCl, wherein the insulin compound is present at a concentration of 10-1000 U/ml, such as 50-500 U/ml, 50-200 U/ml, 100 U/ml, 1000 U/ml, 50-1000 U/ml, 10-500 U/ml, 10 to <500 U/ml, 50-500 U/ml, 50-<500 U/ml, 100-500 U/ml, 100-<500 U/ml, 10-400 U/ml, 10 to <400 U/ml, 50-400 U/ml, 50-<400 U/ml, 100-400 U/ml, 100-<400 U/ml, 10-300 U/ml, 10-<300 U/ml, 50-300 U/ml, 50-<300 U/ml, 100-300 U/ml, 100-<300 U/ml, 10-250 U/ml, 10-<250 U/ml, 50-250 U/ml, 50-<250 U/ml, 100-250 U/ml, 100-<250 U/ml, 10-200 U/ml, 10-<200 U/ml, 50-200 U/ml, 50-<200 U/ml, 100-200 U/ml, 100-<200 U/ml, 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the GLP-1 agonist, e.g. liraglutide, dulaglutide, albiglutide, exenatide or lixisenatide is at a concentration range of 10 μg/ml to 50 mg/ml, 200 ug/ml to 10 mg/ml, or 1-10 mg/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, e.g. 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation consisting of (i) an insulin compound, (ii) ionic zinc, (iii) a zinc binding species at a concentration of 1 mM or more selected from species having a log K with respect to zinc ion binding in the range 4.5-10 at 25° C., (iv) a non-ionic surfactant which is an alkyl glycoside, particularly dodecyl maltoside; (v) nicotinamide, nicotinic acid or a salt thereof; (vi) optionally one or more buffers e.g. phosphate such as sodium phosphate; (vii) optionally one or more preservatives e.g. phenol and m-cresol; and (viii) optionally one or more tonicity modifiers e.g. glycerol or NaCl, and wherein the formulation is substantially free of EDTA and any other zinc binding species having a log K with respect to zinc ion binding of more than 10 at 25° C., wherein the insulin compound is present at a concentration of 10-1000 U/ml, such as 50-500 U/ml, 50-200 U/ml, 100 U/ml, 1000 U/ml, 50-1000 U/ml, 10-500 U/ml, 10 to <500 U/ml, 50-500 U/ml, 50-<500 U/ml, 100-500 U/ml, 100-<500 U/ml, 10-400 U/ml, 10 to <400 U/ml, 50-400 U/ml, 50-<400 U/ml, 100-400 U/ml, 100-<400 U/ml, 10-300 U/ml, 10-<300 U/ml, 50-300 U/ml, 50-<300 U/ml, 100-300 U/ml, 100-<300 U/ml, 10-250 U/ml, 10-<250 U/ml, 50-250 U/ml, 50-<250 U/ml, 100-250 U/ml, 100-<250 U/ml, 10-200 U/ml, 10-<200 U/ml, 50-200 U/ml, 50-<200 U/ml, 100-200 U/ml, 100-<200 U/ml, 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml.

In one embodiment, the nicotinamide, nicotinic acid or salt thereof is at a concentration in the range of 10-150 mM, e.g. 20-100 mM such as around 80 mM. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation consisting of (i) an insulin compound, (ii) ionic zinc, (iii) a zinc binding species at a concentration of 1 mM or more selected from species having a log K with respect to zinc ion binding in the range 4.5-10 at 25° C., (iv) a non-ionic surfactant which is an alkyl glycoside, particularly dodecyl maltoside; (v) nicotinamide, nicotinic acid or a salt thereof; (vi) optionally one or more buffers e.g. phosphate such as sodium phosphate; (vii) optionally one or more preservatives e.g. phenol and m-cresol; and (viii) optionally one or more tonicity modifiers e.g. glycerol or NaCl, wherein the insulin compound is present at a concentration of 10-1000 U/ml, such as 50-500 U/ml, 50-200 U/ml, 100 U/ml, 1000 U/ml, 50-1000 U/ml, 10-500 U/ml, 10 to <500 U/ml, 50-500 U/ml, 50-<500 U/ml, 100-500 U/ml, 100-<500 U/ml, 10-400 U/ml, 10 to <400 U/ml, 50-400 U/ml, 50-<400 U/ml, 100-400 U/ml, 100-<400 U/ml, 10-300 U/ml, 10-<300 U/ml, 50-300 U/ml, 50-<300 U/ml, 100-300 U/ml, 100-<300 U/ml, 10-250 U/ml, 10-<250 U/ml, 50-250 U/ml, 50-<250 U/ml, 100-250 U/ml, 100-<250 U/ml, 10-200 U/ml, 10-<200 U/ml, 50-200 U/ml, 50-<200 U/ml, 100-200 U/ml, 100-<200 U/ml, 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the nicotinamide, nicotinic acid or salt thereof is at a concentration in the range of 10-150 mM, e.g. 20-100 mM such as around 80 mM. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation comprising (i) an insulin compound at a concentration of 50-500 U/ml e.g. 50-200 U/ml e.g. around 100 U/ml, (ii) ionic zinc, (iii) citrate as a zinc binding species at a concentration of 1 mM or more (suitably 10-50 mM e.g. 10-30 mM e.g. around 20 mM such as 22 mM), and (iv) a non-ionic surfactant which is an alkyl glycoside such as dodecyl maltoside); and wherein the formulation is substantially free of EDTA and any other zinc binding species having a log K with respect to zinc ion binding of more than 12.3 at 25° C. (for example is substantially free of EDTA and any other zinc binding species having a log K with respect to zinc ion binding of more than 10 at 25° C.). In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the citrate concentration is 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation consisting of (i) an insulin compound at a concentration of 50-500 U/ml e.g. 50-200 U/ml e.g. around 100 U/ml, (ii) ionic zinc, (iii) citrate as a zinc binding species at a concentration of 1 mM or more (suitably 10-50 mM e.g. 10-30 mM e.g. around 20 mM such as 22 mM), (iv) a non-ionic surfactant which is an alkyl glycoside such as dodecyl maltoside; (v) optionally one or more buffers e.g. phosphate such as sodium phosphate; (vi) optionally one or more preservatives e.g. phenol and m-cresol; (vii) optionally one or more tonicity modifiers e.g. glycerol or NaCl, suitably NaCl e.g. at a concentration of 100-300 mM e.g. around 150 mM, and (viii) optionally one or more additional active agents such as an amylin analogue such as pramlintide or a GLP-1 agonist such as liraglutide, dulaglutide, albiglutide, exenatide or lixisenatide; and wherein the formulation is substantially free of EDTA and any other zinc binding species having a log K with respect to zinc ion binding of more than 12.3 at 25° C. (for example is substantially free of EDTA and any other zinc binding species having a log K with respect to zinc ion binding of more than 10 at 25° C.). In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the citrate concentration is 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation consisting of (i) an insulin compound at a concentration of 50-500 U/ml e.g. 50-200 U/ml e.g. around 100 U/ml, (ii) ionic zinc, (iii) citrate as a zinc binding species at a concentration of 1 mM or more (suitably 10-50 mM e.g. 10-30 mM e.g. around 20 mM such as 22 mM), (iv) a non-ionic surfactant which is an alkyl glycoside such as dodecyl maltoside; (v) optionally one or more buffers e.g. phosphate such as sodium phosphate; (vi) optionally one or more preservatives e.g. phenol and m-cresol; (vii) optionally one or more tonicity modifiers e.g. glycerol or NaCl, suitably NaCl e.g. at a concentration of 100-300 mM e.g. around 150 mM, and (viii) optionally one or more additional active agents such as an amylin analogue such as pramlintide or a GLP-1 agonist such as liraglutide, dulaglutide, albiglutide, exenatide or lixisenatide. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the citrate concentration is 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation comprising (i) an insulin compound at a concentration of 500-1000 U/ml e.g. 800-1000 U/ml e.g. around 1000 U/ml, (ii) ionic zinc, (iii) citrate as a zinc binding species at a concentration of 1 mM or more (suitably 30-50 mM e.g. 40-50 mM e.g. around 44 mM), and (iv) a non-ionic surfactant which is an alkyl glycoside such as dodecyl maltoside); and wherein the formulation is substantially free of EDTA and any other zinc binding species having a log K with respect to zinc ion binding of more than 12.3 at 25° C. (for example is substantially free of EDTA and any other zinc binding species having a log K with respect to zinc ion binding of more than 10 at 25° C.). In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the citrate concentration is 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation consisting of (i) an insulin compound at a concentration of 500-1000 U/ml e.g. 800-1000 U/ml e.g. around 1000 U/ml, (ii) ionic zinc, (iii) citrate as a zinc binding species at a concentration of 1 mM or more (suitably 30-50 mM e.g. 40-50 mM e.g. around 44 mM), (iv) a non-ionic surfactant which is an alkyl glycoside such as dodecyl maltoside; (v) optionally one or more buffers e.g. phosphate such as sodium phosphate; (vi) optionally one or more preservatives e.g. phenol and m-cresol; (vii) optionally one or more tonicity modifiers e.g. glycerol or NaCl, suitably glycerol e.g. at a concentration of 100-300 mM e.g. 150-200 mM, 170-180 mM or 174 mM, and (viii) optionally one or more additional active agents such as an amylin analogue such as pramlintide or a GLP-1 agonist such as liraglutide, dulaglutide, albiglutide, exenatide or lixisenatide; and wherein the formulation is substantially free of EDTA and any other zinc binding species having a log K with respect to zinc ion binding of more than 12.3 at 25° C. (for example is substantially free of EDTA and any other zinc binding species having a log K with respect to zinc ion binding of more than 10 at 25° C.). In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the citrate concentration is 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

An aqueous liquid pharmaceutical formulation consisting of (i) an insulin compound at a concentration of 500-1000 U/ml e.g. 800-1000 U/ml e.g. around 1000 U/ml, (ii) ionic zinc, (iii) citrate as a zinc binding species at a concentration of 1 mM or more (suitably 30-50 mM e.g. 40-50 mM e.g. around 44 mM), (iv) a non-ionic surfactant which is an alkyl glycoside such as dodecyl maltoside; (v) optionally one or more buffers e.g. phosphate such as sodium phosphate; (vi) optionally one or more preservatives e.g. phenol and m-cresol; (vii) optionally one or more tonicity modifiers e.g. glycerol or NaCl, suitably glycerol e.g. at a concentration of 100-300 mM e.g. 150-200 mM, 170-180 mM or 174 mM, and (viii) optionally one or more additional active agents such as an amylin analogue such as pramlintide or a GLP-1 agonist such as liraglutide, dulaglutide, albiglutide, exenatide or lixisenatide. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the citrate concentration is 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

A dry solid pharmaceutical composition suitable for reconstitution with an aqueous medium which comprises, following reconstitution, (i) an insulin compound, (ii) ionic zinc, (iii) a zinc binding species at a concentration of 1 mM or more selected from species having a log K with respect to zinc ion binding in the range 4.5-10 at 25° C. e.g. citrate, and (iv) a non-ionic surfactant which is an alkyl glycoside, particularly dodecyl maltoside; and wherein the composition is substantially free of EDTA and any other zinc binding species having a log K with respect to zinc ion binding of more than 10 at 25° C. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

A dry solid pharmaceutical composition suitable for reconstitution with an aqueous medium which consists of, following reconstitution, (i) an insulin compound, (ii) ionic zinc, (iii) a zinc binding species at a concentration of 1 mM or more selected from species having a log K with respect to zinc ion binding in the range 4.5-10 at 25° C. e.g. citrate, (iv) a non-ionic surfactant which is an alkyl glycoside, particularly dodecyl maltoside; (v) optionally one or more buffers e.g. phosphate such as sodium phosphate; (vi) optionally one or more preservatives e.g. phenol and m-cresol; (vii) optionally one or more tonicity modifiers e.g. glycerol or NaCl, and (viii) optionally one or more additional active agents such as an amylin analogue such as pramlintide or a GLP-1 agonist such as liraglutide, dulaglutide, albiglutide, exenatide or lixisenatide; and wherein the composition is substantially free of EDTA and any other zinc binding species having a log K with respect to zinc ion binding of more than 10 at 25° C. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

A dry solid pharmaceutical composition suitable for reconstitution with an aqueous medium which consists of, following reconstitution, (i) an insulin compound, (ii) ionic zinc, (iii) a zinc binding species at a concentration of 1 mM or more selected from species having a log K with respect to zinc ion binding in the range 4.5-10 at 25° C. e.g. citrate, (iv) a non-ionic surfactant which is an alkyl glycoside, particularly dodecyl maltoside; (v) optionally one or more buffers e.g. phosphate such as sodium phosphate; (vi) optionally one or more preservatives e.g. phenol and m-cresol; (vii) optionally one or more tonicity modifiers e.g. glycerol or NaCl, and (viii) optionally one or more additional active agents such as an amylin analogue such as pramlintide or a GLP-1 agonist such as liraglutide, dulaglutide, albiglutide, exenatide or lixisenatide. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

A method of improving the storage stability of an aqueous liquid pharmaceutical formulation comprising (i) an insulin compound, (ii) ionic zinc and (iii) a zinc binding species at a concentration of 1 mM or more selected from species having a log K with respect to zinc ion binding in the range 4.5-10 at 25° C. e.g. citrate; wherein the formulation is substantially free of EDTA and any other zinc binding species having a log K with respect to zinc ion binding of more than 10 at 25° C.; which comprises adding a non-ionic surfactant which is an alkyl glycoside, particularly dodecyl maltoside. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

A method of improving the storage stability of an aqueous liquid pharmaceutical formulation consisting of (i) an insulin compound, (ii) ionic zinc (iii) a zinc binding species at a concentration of 1 mM or more selected from species having a log K with respect to zinc ion binding in the range 4.5-10 at 25° C. e.g. citrate; (iv) optionally one or more buffers e.g. phosphate such as sodium phosphate; (v) optionally one or more preservatives e.g. phenol and m-cresol; (vi) optionally one or more tonicity modifiers e.g. glycerol or NaCl, and (vii) optionally one or more additional active agents such as an amylin analogue such as pramlintide or a GLP-1 agonist such as liraglutide, dulaglutide, albiglutide, exenatide or lixisenatide; wherein the formulation is substantially free of EDTA and any other zinc binding species having a log K with respect to zinc ion binding of more than 10 at 25° C.; which comprises adding a non-ionic surfactant which is an alkyl glycoside, particularly dodecyl maltoside. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

A method of improving the storage stability of an aqueous liquid pharmaceutical formulation consisting of (i) an insulin compound, (ii) ionic zinc (iii) a zinc binding species at a concentration of 1 mM or more selected from species having a log K with respect to zinc ion binding in the range 4.5-10 at 25° C. e.g. citrate; (iv) optionally one or more buffers e.g. phosphate such as sodium phosphate; (v) optionally one or more preservatives e.g. phenol and m-cresol; (vi) optionally one or more tonicity modifiers e.g. glycerol or NaCl, and (vii) optionally one or more additional active agents such as an amylin analogue such as pramlintide or a GLP-1 agonist such as liraglutide, dulaglutide, albiglutide, exenatide or lixisenatide; which comprises adding a non-ionic surfactant which is an alkyl glycoside, particularly dodecyl maltoside. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

A method of improving the storage stability of an aqueous liquid pharmaceutical formulation comprising (i) an insulin compound, (ii) ionic zinc and (iii) citrate as a zinc binding species at a concentration of 1 mM; wherein the formulation is substantially free of EDTA and any other zinc binding species having a log K with respect to zinc ion binding of more than 10 at 25° C.; which comprises adding a non-ionic surfactant which is an alkyl glycoside, particularly dodecyl maltoside, wherein the insulin compound is present at a concentration of 10-250 U/ml, 10-<250 U/ml, 50-250 U/ml, 50-<250 U/ml, 100-250 U/ml, 100-<250 U/ml, 10-200 U/ml, 10-<200 U/ml, 50-200 U/ml, 50-<200 U/ml, 100-200 U/ml or 100-<200 U/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

A method of improving the storage stability of an aqueous liquid pharmaceutical formulation consisting of (i) an insulin compound, (ii) ionic zinc (iii) citrate as a zinc binding species at a concentration of 1 mM or more; (iv) optionally one or more buffers e.g. phosphate such as sodium phosphate; (v) optionally one or more preservatives e.g. phenol and m-cresol; (vi) optionally one or more tonicity modifiers e.g. glycerol or NaCl, suitably NaCl e.g. at a concentration of 100-300 mM e.g. around 150 mM, and (vii) optionally one or more additional active agents such as an amylin analogue such as pramlintide or a GLP-1 agonist such as liraglutide, dulaglutide, albiglutide, exenatide or lixisenatide; wherein the formulation is substantially free of EDTA and any other zinc binding species having a log K with respect to zinc ion binding of more than 10 at 25° C.; which comprises adding a non-ionic surfactant which is an alkyl glycoside, particularly dodecyl maltoside, wherein the insulin compound is present at a concentration of 10-250 U/ml, 10-<250 U/ml, 50-250 U/ml, 50-<250 U/ml, 100-250 U/ml, 100-<250 U/ml, 10-200 U/ml, 10-<200 U/ml, 50-200 U/ml, 50-<200 U/ml, 100-200 U/ml or 100-<200 U/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

A method of improving the storage stability of an aqueous liquid pharmaceutical formulation consisting of (i) an insulin compound, (ii) ionic zinc (iii) citrate as a zinc binding species at a concentration of 1 mM or more; (iv) optionally one or more buffers e.g. phosphate such as sodium phosphate; (v) optionally one or more preservatives e.g. phenol and m-cresol; (vi) optionally one or more tonicity modifiers e.g. glycerol or NaCl, suitably NaCl e.g. at a concentration of 100-300 mM e.g. around 150 mM, and (vii) optionally one or more additional active agents such as an amylin analogue such as pramlintide or a GLP-1 agonist such as liraglutide, dulaglutide, albiglutide, exenatide or lixisenatide; which comprises adding a non-ionic surfactant which is an alkyl glycoside, particularly dodecyl maltoside, wherein the insulin compound is present at a concentration of 10-250 U/ml, 10-<250 U/ml, 50-250 U/ml, 50-<250 U/ml, 100-250 U/ml, 100-<250 U/ml, 10-200 U/ml, 10-<200 U/ml, 50-200 U/ml, 50-<200 U/ml, 100-200 U/ml or 100-<200 U/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

A method of improving the storage stability of an aqueous liquid pharmaceutical formulation comprising (i) an insulin compound, (ii) ionic zinc and (iii) citrate as a zinc binding species at a concentration of 1 mM or more; wherein the formulation is substantially free of EDTA and any other zinc binding species having a log K with respect to zinc ion binding of more than 10 at 25° C.; which comprises adding a non-ionic surfactant which is an alkyl glycoside, particularly dodecyl maltoside, wherein the insulin compound is present at a concentration of 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

A method of improving the storage stability of an aqueous liquid pharmaceutical formulation consisting of (i) an insulin compound, (ii) ionic zinc (iii) citrate as a zinc binding species at a concentration of 1 mM or more; (iv) optionally one or more buffers e.g. phosphate such as sodium phosphate; (v) optionally one or more preservatives e.g. phenol and m-cresol; (vi) optionally one or more tonicity modifiers e.g. glycerol or NaCl, suitably glycerol e.g. at a concentration of 100-300 mM e.g. 150-200 mM e.g. 170-180 mM or 174 mM, and (vii) optionally one or more additional active agents such as an amylin analogue such as pramlintide or a GLP-1 agonist such as liraglutide, dulaglutide, albiglutide, exenatide or lixisenatide; wherein the formulation is substantially free of EDTA and any other zinc binding species having a log K with respect to zinc ion binding of more than 10 at 25° C.; which comprises adding a non-ionic surfactant which is an alkyl glycoside, particularly dodecyl maltoside, wherein the insulin compound is present at a concentration of 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

A method of improving the storage stability of an aqueous liquid pharmaceutical formulation consisting of (i) an insulin compound, (ii) ionic zinc (iii) citrate as a zinc binding species at a concentration of 1 mM or more; (iv) optionally one or more buffers e.g. phosphate such as sodium phosphate; (v) optionally one or more preservatives e.g. phenol and m-cresol; (vi) optionally one or more tonicity modifiers e.g. glycerol or NaCl, suitably glycerol e.g. at a concentration of 100-300 mM e.g. 150-200 mM e.g. 170-180 mM or 174 mM, and (vii) optionally one or more additional active agents such as an amylin analogue such as pramlintide or a GLP-1 agonist such as liraglutide, dulaglutide, albiglutide, exenatide or lixisenatide; which comprises adding a non-ionic surfactant which is an alkyl glycoside, particularly dodecyl maltoside, wherein the insulin compound is present at a concentration of 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

Use of a non-ionic surfactant which is an alkyl glycoside, particularly dodecyl maltoside, to improve the storage stability of an aqueous liquid pharmaceutical formulation comprising (i) an insulin compound, (ii) ionic zinc and (iii) a zinc binding species at a concentration of 1 mM or more selected from species having a log K with respect to zinc ion binding in the range 4.5-10 at 25° C. e.g. citrate; wherein the formulation is substantially free of EDTA and any other zinc binding species having a log K with respect to zinc ion binding of more than 10 at 25° C. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

Use of a non-ionic surfactant which is an alkyl glycoside, particularly dodecyl maltoside, to improve the storage stability of an aqueous liquid pharmaceutical formulation consisting of (i) an insulin compound, (ii) ionic zinc, (iii) a zinc binding species at a concentration of 1 mM or more selected from species having a log K with respect to zinc ion binding in the range 4.5-10 at 25° C. e.g citrate; (iv) optionally one or more buffers e.g. phosphate such as sodium phosphate; (v) optionally one or more preservatives e.g. phenol and m-cresol; (vi) optionally one or more tonicity modifiers e.g. glycerol or NaCl, and (vii) optionally one or more additional active agents such as an amylin analogue such as pramlintide or a GLP-1 agonist such as liraglutide, dulaglutide, albiglutide, exenatide or lixisenatide; wherein the formulation is substantially free of EDTA and any other zinc binding species having a log K with respect to zinc ion binding of more than 10 at 25° C. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

Use of a non-ionic surfactant which is an alkyl glycoside, particularly dodecyl maltoside, to improve the storage stability of an aqueous liquid pharmaceutical formulation consisting of (i) an insulin compound, (ii) ionic zinc, (iii) a zinc binding species at a concentration of 1 mM or more selected from species having a log K with respect to zinc ion binding in the range 4.5-10 at 25° C. e.g citrate; (iv) optionally one or more buffers e.g. phosphate such as sodium phosphate; (v) optionally one or more preservatives e.g. phenol and m-cresol; (vi) optionally one or more tonicity modifiers e.g. glycerol or NaCl, and (vii) optionally one or more additional active agents such as an amylin analogue such as pramlintide or a GLP-1 agonist such as liraglutide, dulaglutide, albiglutide, exenatide or lixisenatide. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

Use of a non-ionic surfactant which is an alkyl glycoside, particularly dodecyl maltoside, to improve the storage stability of an aqueous liquid pharmaceutical formulation comprising (i) an insulin compound, (ii) ionic zinc and (iii) citrate as a zinc binding species at a concentration of 1 mM or more; wherein the formulation is substantially free of EDTA and any other zinc binding species having a log K with respect to zinc ion binding of more than 10 at 25° C., wherein the insulin compound is present at a concentration of 10-250 U/ml, 10-<250 U/ml, 50-250 U/ml, 50-<250 U/ml, 100-250 U/ml, 100-<250 U/ml, 10-200 U/ml, 10-<200 U/ml, 50-200 U/ml, 50-<200 U/ml, 100-200 U/ml or 100-<200 U/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

Use of a non-ionic surfactant which is an alkyl glycoside, particularly dodecyl maltoside, to improve the storage stability of an aqueous liquid pharmaceutical formulation consisting of (i) an insulin compound, (ii) ionic zinc, (iii) citrate as a zinc binding species at a concentration of 1 mM or more; (iv) optionally one or more buffers e.g. phosphate such as sodium phosphate; (v) optionally one or more preservatives e.g. phenol and m-cresol; (vi) optionally one or more tonicity modifiers e.g. glycerol or NaCl, suitably NaCl e.g. at a concentration of 100-300 mM e.g. around 150 mM, and (vii) optionally one or more additional active agents such as an amylin analogue such as pramlintide or a GLP-1 agonist such as liraglutide, dulaglutide, albiglutide, exenatide or lixisenatide; wherein the formulation is substantially free of EDTA and any other zinc binding species having a log K with respect to zinc ion binding of more than 10 at 25° C., wherein the insulin compound is present at a concentration of 10-250 U/ml, 10-<250 U/ml, 50-250 U/ml, 50-<250 U/ml, 100-250 U/ml, 100-<250 U/ml, 10-200 U/ml, 10-<200 U/ml, 50-200 U/ml, 50-<200 U/ml, 100-200 U/ml or 100-<200 U/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

Use of a non-ionic surfactant which is an alkyl glycoside, particularly dodecyl maltoside, to improve the storage stability of an aqueous liquid pharmaceutical formulation consisting of (i) an insulin compound, (ii) ionic zinc, (iii) citrate as a zinc binding species at a concentration of 1 mM or more; (iv) optionally one or more buffers e.g. phosphate such as sodium phosphate; (v) optionally one or more preservatives e.g. phenol and m-cresol; (vi) optionally one or more tonicity modifiers e.g. glycerol or NaCl, suitably NaCl e.g. at a concentration of 100-300 mM e.g. around 150 mM, and (vii) optionally one or more additional active agents such as an amylin analogue such as pramlintide or a GLP-1 agonist such as liraglutide, dulaglutide, albiglutide, exenatide or lixisenatide, wherein the insulin compound is present at a concentration of 10-250 U/ml, 10-<250 U/ml, 50-250 U/ml, 50-<250 U/ml, 100-250 U/ml, 100-<250 U/ml, 10-200 U/ml, 10-<200 U/ml, 50-200 U/ml, 50-<200 U/ml, 100-200 U/ml or 100-<200 U/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

Use of a non-ionic surfactant which is an alkyl glycoside, particularly dodecyl maltoside, to improve the storage stability of an aqueous liquid pharmaceutical formulation comprising (i) an insulin compound, (ii) ionic zinc and (iii) citrate as a zinc binding species at a concentration of 1 mM or more; wherein the formulation is substantially free of EDTA and any other zinc binding species having a log K with respect to zinc ion binding of more than 10 at 25° C., wherein the insulin compound is present at a concentration of 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

Use of a non-ionic surfactant which is an alkyl glycoside, particularly dodecyl maltoside, to improve the storage stability of an aqueous liquid pharmaceutical formulation consisting of (i) an insulin compound, (ii) ionic zinc, (iii) citrate as a zinc binding species at a concentration of 1 mM or more; iv) optionally one or more buffers e.g. phosphate such as sodium phosphate; (v) optionally one or more preservatives e.g. phenol and m-cresol; (vi) optionally one or more tonicity modifiers e.g. glycerol or NaCl, suitably glycerol e.g. at a concentration of 100-300 mM e.g. 150-200 mM e.g. 170-

180 mM or 174 mM, and (vii) optionally one or more additional active agents such as an amylin analogue such as pramlintide or a GLP-1 agonist such as liraglutide, dulaglutide, albiglutide, exenatide or lixisenatide; wherein the formulation is substantially free of EDTA and any other zinc binding species having a log K with respect to zinc ion binding of more than 10 at 25° C., wherein the insulin compound is present at a concentration of 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

Use of a non-ionic surfactant which is an alkyl glycoside, particularly dodecyl maltoside, to improve the storage stability of an aqueous liquid pharmaceutical formulation consisting of (i) an insulin compound, (ii) ionic zinc, (iii) citrate as a zinc binding species at a concentration of 1 mM or more; iv) optionally one or more buffers e.g. phosphate such as sodium phosphate; (v) optionally one or more preservatives e.g. phenol and m-cresol; (vi) optionally one or more tonicity modifiers e.g. glycerol or NaCl, suitably glycerol e.g. at a concentration of 100-300 mM e.g. 150-200 mM e.g. 170-180 mM or 174 mM, and (vii) optionally one or more additional active agents such as an amylin analogue such as pramlintide or a GLP-1 agonist such as liraglutide, dulaglutide, albiglutide, exenatide or lixisenatide, wherein the insulin compound is present at a concentration of 400-1000 U/ml, >400-1000 U/ml, 500-1000 U/ml, >500-1000 U/ml, 600-1000 U/ml, >600-1000 U/ml, 700-1000 U/ml, >700-1000 U/ml, 750-1000 U/ml, >750-1000 U/ml, 800-1000 U/ml, >800-1000 U/ml, 900-1000 U/ml or >900-1000 U/ml. In one embodiment, the alkyl glycoside is dodecyl maltoside at a concentration in the range 1-1000 μg/ml, e.g. 5-500 μg/ml, e.g. 10-200 μg/ml, such as 10-100 μg/ml especially around 50 μg/ml. In a further embodiment, the zinc binding species is citrate at a concentration of 1-100 mM, e.g. 15-60 mM, 20-50 mM, 20-30 mM or 30-60 mM. In a first further embodiment, the insulin compound is insulin lispro. In a second further embodiment, the insulin compound is insulin aspart. In a third further embodiment, the insulin compound is insulin glulisine. In a fourth further embodiment, the insulin compound is recombinant human insulin.

Formulations of the invention in at least some embodiments are expected to have one or more of the following advantageous properties:

rapid speed of action, typically faster than normal human insulin, upon administration to a subject;

good physical stability upon storage, especially as measured by the amount of HMWS or visual detection of particles;

good chemical stability upon storage, especially as measured by the amount of related products e.g. products of deamidation.

ABBREVIATIONS

DETA diethylenetriamine
EDTA ethylenediaminetetraacetate
EGTA ethyleneglycoltetraacetate
HPLC high performance liquid chromatography
HMWS high molecular weight species
RP reverse phase
SEC size-exclusion chromatography
TETA triethylenetetramine
PD pharmacodynamic
PK pharmacokinetic

EXAMPLES

General Methods (a) Size Exclusion Chromatography (SEC)

Ultra-high performance size exclusion chromatography of insulin preparations was performed using the Waters ACQUITY H-class Bio UPLC® system with a 1.7 μm Ethylene Bridged Hybrid 125 Å pore packing material in a 300 mm by 4.6 mm column. The column was equilibrated in 0.65 mg/ml L-arginine, 20% v/v acetonitrile, 15% v/v glacial acetic acid mobile phase and 10 μl of sample, acidified with 0.01M HCl, was analysed at 0.4 mL/min, with 276 nm UV detection. All analyses were performed at ambient temperature.

(b) Reversed-Phase Chromatography (RP-HPLC)

Ultra-high performance reverse phase chromatography was performed using the Waters ACQUITY H-class Bio UPLC® system with a 1.7 μm Ethylene Bridged Hybrid particle, 130 Å pore resin trifunctionally immobilised with a C18 ligand in a 50 mm by 2.1 mm column. Insulin samples were bound in a 82% w/v $Na_2SO_4$, 18% v/v acetonitrile, pH 2.3 mobile phase and eluted in 50% w/v $Na_2SO_4$, 50% v/v acetonitrile gradient flow. 2 μl of sample was acidified with 0.01M HCl and analysed at 0.61 mL/min, with 214 nm UV detection. All analyses were performed at 40° C.

(c) The Diabetic Pig Pharmacokinetic/Pharmacodynamic Model: Method for Determining Speed of Action:

10 male diabetic Yucatan miniature pigs were used. Pigs were injected subcutaneously with a sample of the test formulation and blood was taken (1 or 2 ml) at various time-points (min) with respect to the injection up to around 240 min after the injection. For pharmacodynamics profile, serum was analysed for glucose (using a commercially available glucometer). For pharmacokinetic profile, insulin concentration was determined in the serum using an immunoassay.

In order to evaluate the formulations for bioequivalence, mean values of TMAX (i.e. time to reach the maximum insulin concentration in serum) and corresponding standard deviation were calculated across the whole set of 10 pigs used in the study. Similarly, mean values of $T_{1/2MAX}$ (i.e. time to reach half of the maximum concentration) and corresponding standard deviation were calculated across the whole set of 10 pigs used in the study. Student t-test (95% confidence interval) was subsequently applied to allow assessment of bioequivalence between any two formulations tested. If the p-value of the t-test applied to the results populations of two samples was ≥0.05 the samples were considered bioequivalent, if the result was <0.05 then the samples were considered non-bioequivalent.

(d) Visual Assessment

Visible particles are suitably detected using the 2.9.20. European Pharmacopoeia Monograph (Particulate Contamination: Visible Particles). The apparatus required consists of a viewing station comprising:

- a matt black panel of appropriate size held in a vertical position
- a non-glare white panel of appropriate size held in a vertical position next to the black panel
- an adjustable lampholder fitted with a suitable, shaded, white-light source and with a suitable light diffuser (a viewing illuminator containing two 13 W fluorescent tubes, each 525 mm in length, is suitable). The intensity of illumination at the viewing point is maintained between 2000 lux and 3750 lux.

Any adherent labels are removed from the container and the outside washed and dried. The container is gently swirled or inverted, ensuring that air bubbles are not introduced, and observed for about 5 s in front of the white panel. The procedure is repeated in front of the black panel. The presence of any particles is recorded.

The visual scores are ranked as follows:

Visual Assessment Scoring Method A

- Visual score 1: clear solution free of visible particles
- Visual score 2: slight particle formation
- Visual score 3: more significant precipitation Visual Assessment Scoring Method B

- Visual score 1: Clear solution, virtually free of particles
- Visual score 2: ~5 very small particles
- Visual score 3: ~10-20 very small particles
- Visual score 4: 20-50 particles, including larger particles
- Visual score 5: >50 particles, including larger particles Whilst the particles in samples with visual scores 4 and 5 are clearly detectable on casual visual assessment under normal light, samples with visual score 1-3 generally appear as clear solutions on the same assessment. Samples with visual scores 1-3 are considered to be "Pass"; samples with visual score 4-5 are considered to be "Fail".

Example 1—Example Formulations

The following example formulations may be prepared:

Example A

| | |
|---|---|
| Insulin lispro | 100 U/ml |
| Sodium phosphate | 2 mM |
| phenol | 15.9 mM |
| m-cresol | 15.9 mM |
| Ionic zinc (as $ZnCl_2$) | 19.7 μg/ml (0.3 mM), equals 0.55% (w/w) based on the weight of insulin compound in the formulation |
| Citrate (as trisodium salt) | 22 mM |
| Glycerol | 174 mM |
| Surfactant | dodecyl maltoside (0.05 mg/ml) |
| Water for injection | qs |
| Residual NaCl | Acidification and subsequent neutralisation during preparation results in formation of 2-4 mM NaCl |

pH adjusted to 7.4

Example B

| | |
|---|---|
| Insulin aspart | 100 U/ml |
| Sodium phosphate | 2 mM |
| phenol | 15.9 mM |
| m-cresol | 15.9 mM |
| Ionic zinc (as $ZnCl_2$) | 19.7 μg/ml (0.3 mM), equals 0.55% (w/w) based on the weight of insulin compound in the formulation |
| Citrate (as trisodium salt) | 22 mM |
| Glycerol | 174 mM |
| Surfactant | dodecyl maltoside (0.05 mg/ml) |
| Water for injection | qs |
| Residual NaCl | Acidification and subsequent neutralisation during preparation results in formation of 2-4 mM NaCl |

pH adjusted to 7.4

Example C

| | |
|---|---|
| Insulin aspart | 100 U/ml |
| Sodium phosphate | 2 mM |
| phenol | 15.9 mM |
| m-cresol | 15.9 mM |
| Ionic zinc (as $ZnCl_2$) | 19.7 μg/ml (0.3 mM), equals 0.55% (w/w) based on the weight of insulin compound in the formulation |
| Citrate (as trisodium salt) | 22 mM |
| NaCl | 150 mM |
| Surfactant | dodecyl maltoside (0.05 mg/ml) |
| Water for injection | qs |
| Additional NaCl | Acidification and subsequent neutralisation during preparation results in formation of 2-4 mM NaCl |

pH adjusted to 7.4

Example D

| | |
|---|---|
| Insulin glulisine | 100 U/ml |
| Sodium phosphate | 2 mM |
| phenol | 15.9 mM |
| m-cresol | 15.9 mM |
| Ionic zinc (as $ZnCl_2$) | 19.7 μg/ml (0.3 mM), equals 0.55% (w/w) based on the weight of insulin compound in the formulation |
| Citrate (as trisodium salt) | 22 mM |
| Glycerol | 174 mM |
| Surfactant | dodecyl maltoside (0.05 mg/ml) |
| Water for injection | qs |
| Residual NaCl | Acidification and subsequent neutralisation during preparation results in formation of 2-4 mM NaCl |

pH adjusted to 7.4

Example E

| | |
|---|---|
| Insulin lispro | 100 U/ml |
| Sodium phosphate | 2 mM |
| phenol | 15.9 mM |
| m-cresol | 15.9 mM |
| Ionic zinc (as $ZnCl_2$) | 19.7 μg/ml (0.3 mM), equals 0.55% (w/w) based on the weight of insulin compound in the formulation |
| Citric acid | 22 mM |
| Glycerol | 174 mM |

-continued

| | |
|---|---|
| Surfactant | dodecyl maltoside (0.05 mg/ml) |
| Water for injection | qs |
| Residual NaCl | Acidification and subsequent neutralisation during preparation results in formation of 2-4 mM NaCl |

pH adjusted to 7.8

Example F

| | |
|---|---|
| Insulin aspart | 100 U/ml |
| Sodium phosphate | 2 mM |
| phenol | 15.9 mM |
| m-cresol | 15.9 mM |
| Ionic zinc (as $ZnCl_2$) | 19.7 μg/ml (0.3 mM), equals 0.55% (w/w) based on the weight of insulin compound in the formulation |
| Citric acid | 22 mM |
| NaCl | 150 mM |
| Surfactant | dodecyl maltoside (0.05 mg/ml) |
| Water for injection | qs |
| Residual NaCl | Acidification and subsequent neutralisation during preparation results in formation of 2-4 mM NaCl |

pH adjusted to 7.4

Example G

| | |
|---|---|
| Insulin aspart | 100 U/ml |
| Sodium phosphate | 2 mM |
| phenol | 15.9 mM |
| m-cresol | 15.9 mM |
| Ionic zinc (as $ZnCl_2$) | 19.7 μg/ml (0.3 mM), equals 0.55% (w/w) based on the weight of insulin compound in the formulation |
| Citric acid | 22 mM |
| NaCl | 150 mM |
| Surfactant | dodecyl maltoside (0.05 mg/ml) |
| Water for injection | qs |
| Additional NaCl | Acidification and subsequent neutralisation during preparation results in formation of 2-4 mM NaCl |

pH adjusted to 7.8

Example H

| | |
|---|---|
| Insulin aspart | 1000 U/ml |
| Sodium phosphate | 2 mM |
| phenol | 15.9 mM |
| m-cresol | 15.9 mM |
| Ionic zinc (as $ZnCl_2$) | 197 μg/ml (3 mM), equals 0.55% (w/w) based on the weight of insulin compound in the formulation |
| Citric acid | 44 mM |
| Glycerol | 174 mM |
| Surfactant | dodecyl maltoside (0.05 mg/ml) |
| Water for injection | qs |
| Residual NaCl | Acidification and subsequent neutralisation during preparation results in formation of 2-4 mM NaCl |

pH adjusted to 7.4

Example I

| | |
|---|---|
| Insulin lispro | 1000 U/ml |
| Sodium phosphate | 2 mM |
| phenol | 15.9 mM |
| m-cresol | 15.9 mM |
| Ionic zinc (as $ZnCl_2$) | 197 μg/ml (3 mM), equals 0.55% (w/w) based on the weight of insulin compound in the formulation |
| Citric acid | 44 mM |
| Glycerol | 174 mM |
| Surfactant | dodecyl maltoside (0.05 mg/ml) |
| Water for injection | qs |
| Residual NaCl | Acidification and subsequent neutralisation during preparation results in formation of 2-4 mM NaCl |

pH adjusted to 7.4

Example J

| | |
|---|---|
| Insulin glulisine | 1000 U/ml |
| Sodium phosphate | 2 mM |
| phenol | 15.9 mM |
| m-cresol | 15.9 mM |
| Ionic zinc (as $ZnCl_2$) | 197 μg/ml (3 mM), equals 0.55% (w/w) based on the weight of insulin compound in the formulation |
| Citric acid | 44 mM |
| Glycerol | 174 mM |
| Surfactant | dodecyl maltoside (0.05 mg/ml) |
| Water for injection | qs |
| Residual NaCl | Acidification and subsequent neutralisation during preparation results in formation of 2-4 mM NaCl |

pH adjusted to 7.4

Example K

| | |
|---|---|
| Insulin aspart | 1000 U/ml |
| Sodium phosphate | 2 mM |
| phenol | 15.9 mM |
| m-cresol | 15.9 mM |
| Ionic zinc (as $ZnCl_2$) | 197 μg/ml (3 mM), equals 0.55% (w/w) based on the weight of insulin compound in the formulation |
| Citric acid | 44 mM |
| Glycerol | 174 mM |
| Surfactant | dodecyl maltoside (0.05 mg/ml) |
| Water for injection | qs |
| Residual NaCl | Acidification and subsequent neutralisation during preparation results in formation of 2-4 mM NaCl |

pH adjusted to 7.8

Example L

| | |
|---|---|
| Insulin lispro | 1000 U/ml |
| Sodium phosphate | 2 mM |
| phenol | 15.9 mM |
| m-cresol | 15.9 mM |
| Ionic zinc (as $ZnCl_2$) | 197 μg/ml (3 mM), equals 0.55% (w/w) based on the weight of insulin compound in the formulation |

-continued

| | |
|---|---|
| Citric acid | 44 mM |
| Glycerol | 174 mM |
| Surfactant | dodecyl maltoside (0.05 mg/ml) |
| Water for injection | qs |
| Residual NaCl | Acidification and subsequent neutralisation during preparation results in formation of 2-4 mM NaCl |

pH adjusted to 7.8

Example M

| | |
|---|---|
| Insulin glulisine | 1000 U/ml |
| Sodium phosphate | 2 mM |
| phenol | 15.9 mM |
| m-cresol | 15.9 mM |
| Ionic zinc (as $ZnCl_2$) | 197 μg/ml (3 mM), equals 0.55% (w/w) based on the weight of insulin compound in the formulation |
| Citric acid | 44 mM |
| Glycerol | 174 mM |
| Surfactant | dodecyl maltoside (0.05 mg/ml) |
| Water for injection | qs |
| Residual NaCl | Acidification and subsequent neutralisation during preparation results in formation of 2-4 mM NaCl |

pH adjusted to 7.8

Example N

| | |
|---|---|
| Insulin lispro | 100 U/ml |
| Sodium phosphate | 2 mM |
| phenol | 15.9 mM |
| m-cresol | 15.9 mM |
| Ionic zinc (as $ZnCl_2$) | 19.7 μg/ml (0.3 mM), equals 0.55% (w/w) based on the weight of insulin compound in the formulation |
| TETA | 0.5 mM |
| Glycerol | 174 mM |
| Surfactant | dodecyl maltoside (0.05 mg/ml) |
| Water for injection | qs |
| Residual NaCl | Acidification and subsequent neutralisation during preparation results in formation of 2-4 mM NaCl |

pH adjusted to 7.4

Example O

| | |
|---|---|
| Insulin aspart | 100 U/ml |
| Sodium phosphate | 2 mM |
| phenol | 15.9 mM |
| m-cresol | 15.9 mM |
| Ionic zinc (as $ZnCl_2$) | 19.7 μg/ml (0.3 mM), equals 0.55% (w/w) based on the weight of insulin compound in the formulation |
| TETA | 0.5 mM |
| NaCl | 150 mM |
| Surfactant | dodecyl maltoside (0.05 mg/ml) |
| Water for injection | qs |
| Residual NaCl | Acidification and subsequent neutralisation during preparation results in formation of 2-4 mM NaCl |

pH adjusted to 7.4

Example P

| | |
|---|---|
| Insulin aspart | 1000 U/ml |
| Sodium phosphate | 2 mM |
| phenol | 15.9 mM |
| m-cresol | 15.9 mM |
| Ionic zinc (as $ZnCl_2$) | 197 μg/ml (3 mM), equals 0.55% (w/w) based on the weight of insulin compound in the formulation |
| TETA | 5 mM |
| Glycerol | 174 mM |
| Surfactant | dodecyl maltoside (0.05 mg/ml) |
| Water for injection | qs |
| Residual NaCl | Acidification and subsequent neutralisation during preparation results in formation of 2-4 mM NaCl |

pH adjusted to 7.4

Example Q

| | |
|---|---|
| Insulin lispro | 100 U/ml |
| Sodium phosphate | 2 mM |
| phenol | 15.9 mM |
| m-cresol | 15.9 mM |
| Ionic zinc (as $ZnCl_2$) | 19.7 μg/ml (0.3 mM), equals 0.55% (w/w) based on the weight of insulin compound in the formulation |
| TETA | 0.5 mM |
| Glycerol | 174 mM |
| Surfactant | dodecyl maltoside (0.05 mg/ml) |
| Water for injection | qs |
| Residual NaCl | Acidification and subsequent neutralisation during preparation results in formation of 2-4 mM NaCl |

pH adjusted to 7.8

Example R

| | |
|---|---|
| Insulin aspart | 100 U/ml |
| Sodium phosphate | 2 mM |
| phenol | 15.9 mM |
| m-cresol | 15.9 mM |
| Ionic zinc (as $ZnCl_2$) | 19.7 μg/ml (0.3 mM), equals 0.55% (w/w) based on the weight of insulin compound in the formulation |
| TETA | 0.5 mM |
| NaCl | 150 mM |
| Surfactant | dodecyl maltoside (0.05 mg/ml) |
| Water for injection | qs |
| Residual NaCl | Acidification and subsequent neutralisation during preparation results in formation of 2-4 mM NaCl |

pH adjusted to 7.8

Example S

| | |
|---|---|
| Insulin aspart | 1000 U/ml |
| Sodium phosphate | 2 mM |
| phenol | 15.9 mM |
| m-cresol | 15.9 mM |
| Ionic zinc (as $ZnCl_2$) | 197 μg/ml (3 mM), equals 0.55% (w/w) based on the weight of insulin compound in the formulation |

-continued

| | |
|---|---|
| TETA | 5 mM |
| Glycerol | 174 mM |
| Surfactant | dodecyl maltoside (0.05 mg/ml) |
| Water for injection | qs |
| Residual NaCl | Acidification and subsequent neutralisation during preparation results in formation of 2-4 mM NaCl |

pH adjusted to 7.8

Example T

| | |
|---|---|
| Insulin lispro | 100 U/ml |
| Sodium phosphate | 2 mM |
| phenol | 15.9 mM |
| m-cresol | 15.9 mM |
| Ionic zinc (as $ZnCl_2$) | 19.7 μg/ml (0.3 mM), equals 0.55% (w/w) based on the weight of insulin compound in the formulation |
| DETA | 5 mM |
| Glycerol | 174 mM |
| Surfactant | dodecyl maltoside (0.05 mg/ml) |
| Water for injection | qs |
| Residual NaCl | Acidification and subsequent neutralisation during preparation results in formation of 2-4 mM NaCl |

pH adjusted to 7.4

Example U

| | |
|---|---|
| Insulin aspart | 100 U/ml |
| Sodium phosphate | 2 mM |
| phenol | 15.9 mM |
| m-cresol | 15.9 mM |
| Ionic zinc (as $ZnCl_2$) | 19.7 μg/ml (0.3 mM), equals 0.55% (w/w) based on the weight of insulin compound in the formulation |
| DETA | 5 mM |
| NaCl | 150 mM |
| Surfactant | dodecyl maltoside (0.05 mg/ml) |
| Water for injection | qs |
| Residual NaCl | Acidification and subsequent neutralisation during preparation results in formation of 2-4 mM NaCl |

pH adjusted to 7.4

Example V

| | |
|---|---|
| Insulin aspart | 1000 U/ml |
| Sodium phosphate | 2 mM |
| phenol | 15.9 mM |
| m-cresol | 15.9 mM |
| Ionic zinc (as $ZnCl_2$) | 197 μg/ml (3 mM), equals 0.55% (w/w) based on the weight of insulin compound in the formulation |
| DETA | 5 mM |
| Glycerol | 174 mM |
| Surfactant | dodecyl maltoside (0.05 mg/ml) |
| Water for injection | qs |
| Residual NaCl | Acidification and subsequent neutralisation during preparation results in formation of 2-4 mM NaCl |

pH adjusted to 7.4

Example W

| | |
|---|---|
| Insulin lispro | 100 U/ml |
| Sodium phosphate | 2 mM |
| phenol | 15.9 mM |
| m-cresol | 15.9 mM |
| Ionic zinc (as $ZnCl_2$) | 19.7 μg/ml (0.3 mM), equals 0.55% (w/w) based on the weight of insulin compound in the formulation |
| DETA | 0.5 mM |
| Glycerol | 174 mM |
| Surfactant | dodecyl maltoside (0.05 mg/ml) |
| Water for injection | qs |
| Residual NaCl | Acidification and subsequent neutralisation during preparation results in formation of 2-4 mM NaCl |

pH adjusted to 7.8

Example X

| | |
|---|---|
| Insulin aspart | 100 U/ml |
| Sodium phosphate | 2 mM |
| phenol | 15.9 mM |
| m-cresol | 15.9 mM |
| Ionic zinc (as $ZnCl_2$) | 19.7 μg/ml (0.3 mM), equals 0.55% (w/w) based on the weight of insulin compound in the formulation |
| TETA | 0.5 mM |
| NaCl | 150 mM |
| Surfactant | dodecyl maltoside (0.05 mg/ml) |
| Water for injection | qs |
| Residual NaCl | Acidification and subsequent neutralisation during preparation results in formation of 2-4 mM NaCl |

pH adjusted to 7.8

Example Y

| | |
|---|---|
| Insulin aspart | 1000 U/ml |
| Sodium phosphate | 2 mM |
| phenol | 15.9 mM |
| m-cresol | 15.9 mM |
| Ionic zinc (as $ZnCl_2$) | 197 μg/ml (3 mM), equals 0.55% (w/w) based on the weight of insulin compound in the formulation |
| TETA | 5 mM |
| Glycerol | 174 mM |
| Surfactant | dodecyl maltoside (0.05 mg/ml) |
| Water for injection | qs |
| Residual NaCl | Acidification and subsequent neutralisation during preparation results in formation of 2-4 mM NaCl |

pH adjusted to 7.8

Method for Preparation for the Above Formulations:

Insulin powder is added to water and HCl is added until the powder is fully dissolved (pH has to be <3 in order to achieve full dissolution). $ZnCl_2$ is added to the required level. Once dissolved, pH is adjusted to approximately 7 and volume is adjusted with water so that the insulin concentration is 2× the required concentration. The composition is then mixed 1:1 (v/v) with a mixture of additional excipients (all at 2× the required concentration).

Example 2—Stability of Insulin Aspart Formulations of the Invention in the Presence of Citrate The effect of citrate on stability of insulin aspart was investigated. In addition, it was investigated in this experiment how various surfactants influence the effect of citrate on insulin aspart stability. The effects were investigated both in the presence of NaCl and in the presence of glycerol as tonicity modifiers. Stability of insulin aspart was assessed by:

Visual Assessment (as described in General Methods using Visual Assessment Scoring Method A)

SEC (formation of soluble aggregates, as described in General Methods)

TABLE 1

Stability of insulin aspart assessed using Visual Assessment Scoring Method A following storage at 30° C. for 4 and 8 weeks. All formulations contained insulin aspart (100 U/ml), sodium phosphate (2 mM), phenol (15.9 mM), m-cresol (15.9 mM), NaCl (150 mM) and 19.7 μg/ml zinc (0.55% (w/w) based on the weight of insulin compound in the formulation, as $ZnCl_2$) and were adjusted to pH 7.4. Extent of visible precipitation is graded on a scale 1-3; 1 = clear solution free of visible particles; 2 = slight particle formation, 3 = more significant precipitation.

| Additive(s) | Visual assessment (0 weeks) | Visual assessment (4 weeks) | Visual assessment (8 weeks) |
|---|---|---|---|
| None | 1 | 1 | 1 |
| Citrate (22 mM) | 1 | 2 | 3 |
| Citrate (22 mM) + Tween 20 (0.05 mg/ml) | 1 | 2 | 2 |
| Citrate (22 mM) + dodecyl maltoside (0.05 mg/ml) | 1 | 1 | 1 |

TABLE 2

Stability of insulin aspart assessed by SEC following storage at 30° C. for 4 and 8 weeks. All formulations contained insulin aspart (100 U/ml), sodium phosphate (2 mM), phenol (15.9 mM), m-cresol (15.9 mM), NaCl (150 mM) and 19.7 μg/ml zinc (0.55% (w/w) based on the weight of insulin compound in the formulation, as $ZnCl_2$) and were adjusted to pH 7.4.

| Additive | SEC main peak (%) (0 weeks) | SEC main peak (%) (4 weeks) | SEC main peak (%) (8 weeks) |
|---|---|---|---|
| None | 99.83 | 99.62 | 99.43 |
| Citrate (22 mM) | 99.82 | 99.50 | 99.22 |
| Citrate (22 mM) + Tween 20 (0.05 mg/ml) | 99.82 | 99.51 | 99.27 |
| Citrate (22 mM) + dodecyl maltoside (0.05 mg/ml) | 99.82 | 99.71 | 99.55 |

TABLE 3

Stability of insulin aspart assessed using Visual Assessment Scoring Method A following storage at 30° C. for 4 and 8 weeks. All formulations contained insulin aspart (100 U/ml), sodium phosphate (2 mM), phenol (15.9 mM), m-cresol (15.9 mM), glycerol (174 mM) and 19.7 μg/ml zinc (0.55% (w/w) based on the weight of insulin compound in the formulation, as $ZnCl_2$) and were adjusted to pH 7.4. Extent of visible precipitation is graded on a scale 1-3; 1 = clear solution free of visible particles; 2 = slight particle formation, 3 = more significant precipitation.

| Additive(s) | Visual assessment (0 weeks) | Visual assessment (4 weeks) | Visual assessment (8 weeks) |
|---|---|---|---|
| None | 1 | 1 | 1 |
| Citrate (22 mM) | 1 | 3 | 3 |
| Citrate (22 mM) + Tween 20 (0.05 mg/ml mM) | 1 | 2 | 3 |
| Citrate (22 mM) + dodecyl maltoside (0.05 mg/ml) | 1 | 1 | 1 |

TABLE 4

Stability of insulin aspart assessed by SEC following storage at 30° C. for 4 and 8 weeks. All formulations contained insulin aspart (100 U/ml), sodium phosphate (2 mM), phenol (15.9 mM), m-cresol (15.9 mM), glycerol (174 mM) and 19.7 μg/ml zinc (0.55% (w/w) based on the weight of insulin compound in the formulation, as $ZnCl_2$) and were adjusted to pH 7.4.

| Additive | SEC main peak (%) (0 weeks) | SEC main peak (%) (4 weeks) | SEC main peak (%) (8 weeks) |
|---|---|---|---|
| None | 99.82 | 99.69 | 99.48 |
| Citrate (22 mM) | 99.80 | 98.58 | 97.43 |
| Citrate (22 mM) + Tween 20 (0.05 mg/ml) | 99.80 | 98.59 | 97.86 |
| Citrate (22 mM) + dodecyl maltoside (0.1 mg/ml) | 99.80 | 98.99 | 98.24 |

Using NaCl as a tonicity modifier, it was shown (Tables 1 and 2) that addition of citrate (22 mM) to the composition of insulin aspart resulted in impairment of insulin aspart stability, particularly with respect to formation of visible particles. Clear formation of particles was observed after 4 weeks incubation at 30° C., and a more significant precipitation was observed after 8 weeks. Addition of citrate also had a slight negative impact on the formation of soluble aggregates (expressed as retention of main peak on SEC chromatogram in Table 2). The detrimental effect of citrate appeared to be completely reversed in the presence of dodecyl maltoside. Some improvement was also observed in the presence of Tween 20, but the effect was not as clear as in the case of dodecyl maltoside. Clear particle formation was still observed following 8 weeks incubation at 30° C. in the presence of Tween 20.

Using glycerol as a tonicity modifier (Tables 3 and 4), similar effects of citrate and surfactants were also observed. However, in this case the destabilization of insulin aspart by citrate was more significant. Whilst a stabilizing effect of dodecyl maltoside was also observed, particularly with respect to visual assessment, the overall stability was worse than in corresponding compositions in the presence of NaCl. Thus, at 100 U/ml of insulin aspart, low ionic strength formulations may be less stable than higher ionic strength formulations. Tween 20 also had a mild stabilising effect, but it was not as significant as that of dodecyl maltoside.

Example 3—Stability of Insulin Aspart Formulations in the Presence of TETA and EDTA The effect TETA and EDTA on stability of insulin aspart was investigated. The stability was compared to that of the ultra-rapid acting formulation disclosed in WO2010/149772 (Formulation K in Example 1 of WO2010/149772). All formulations tested comprised insulin aspart (100 U/ml), phenol (16 mM), m-cresol (16 mM), and zinc (from $ZnCl_2$, 19.7 μg/ml with respect to zinc=0.3 mM) and were adjusted to pH 7.4. The additional components of each formulation are listed in Table 5.

TABLE 5

Additional components in formulations of insulin aspart tested.

| Formulation | Na phosphate (mM) | TRIS (mM) | NaCl (mM) | Glycerol (mM) | EDTA (mM) | TETA (mM) | Nicotin-amide (mM) | Arginine (mM) | Dodecyl maltoside (mg/ml) |
|---|---|---|---|---|---|---|---|---|---|
| 3A (NovoRapid ® control) | 13.2 | | 10 | 174 | | | | | |
| 3B (Formulation K in WO2010/149772) | | 7 | 10 | 83.6 | | | 80 | 30 | |
| 3C | 2 | | 150 | | 0.5 | | | | |
| 3D | 2 | | 150 | | 2 | | | | |
| 3E | 2 | | 150 | | 0.5 | | | | 0.05 |
| 3F | 2 | | 150 | | 2 | | | | 0.05 |
| 3G | 2 | | 150 | | | 0.5 | | | |
| 3H | 2 | | 150 | | | 2 | | | |
| 3I | 2 | | 150 | | | 0.5 | | | 0.05 |
| 3J | 2 | | 150 | | | 2 | | | 0.05 |

Stability of insulin aspart was tested using the Visual Assessment Scoring Method B, as described in General Methods. Results are shown in Table 6. The composition of NovoRapid® remained clear and particle-free following 4 weeks storage at 30° C. The nicotinamide-based composition (Formulation K in Example 1 of WO2010/149772) also showed good stability over 4 weeks at 30° C., although slight particle formation was observed at the 4 weeks time-point. Significant precipitation was observed in the EDTA-based formulations. Whilst the presence of dodecyl maltoside appeared to delay the precipitation, significant particle formation was still observed at the 4 weeks time-point. Slow precipitation was also observed in the TETA-based formulation. However, in the presence of dodecyl maltoside, the TETA-based formulations remained clear and particle-free following 4 weeks storage at 30° C.

TABLE 6

Visual scores of insulin aspart compositions using Visual Assessment Scoring Method B following storage at 30° C. Visual score 1: clear solution, virtually free of particles; visual score 2: ~5 very small particles; visual score 3: ~10-20 very small particles; visual score 4: 20-50 particles, including larger particles; visual score 5: >50 particles, including larger particles.

| | 0 weeks | 1 week | 2 weeks | 4 weeks |
|---|---|---|---|---|
| Formulation 3A (NovoRapid ® control) | 1 | 1 | 1 | 1 |
| Formulation 3B (Formulation K in WO2010/149772) | 1 | 1 | 1 | 2 |
| Formulation 3C | 1 | 3 | 4 | 5 |
| Formulation 3D | 1 | 4 | 5 | 5 |
| Formulation 3E | 1 | 1 | 3 | 4 |
| Formulation 3F | 1 | 3 | 4 | 5 |
| Formulation 3G | 1 | 1 | 2 | 3 |
| Formulation 3H | 1 | 2 | 3 | 5 |
| Formulation 3I | 1 | 1 | 1 | 1 |
| Formulation 3J | 1 | 1 | 1 | 1 |

Example 4—Comparison of Pharmacodynamic Profiles of Insulin Aspart Formulations in the Presence of (a) TETA, (b) EDTA and (c) Nicotinamide Pharmacodynamic profile of the following compositions was tested using the Diabetic Pig Pharmacokinetic/Pharmacodynamic Model (see General Methods (c)):

Formulation 1: insulin aspart (100 U/ml), NaCl (10 mM), TRIS (7 mM), glycerol (83.6 mM), arginine (30 mM), nicotinamide (80 mM), phenol (16 mM), m-cresol (16 mM), zinc (from $ZnCl_2$, 19.7 μg/ml with respect to zinc), pH 7.4

Formulation 2: insulin aspart (100 U/ml), NaCl (150 mM), sodium phosphate (2 mM), EDTA (0.5 mM), dodecyl maltoside (0.05 mg/ml), phenol (16 mM), m-cresol (16 mM), zinc (from $ZnCl_2$, 19.7 μg/ml with respect to zinc), pH 7.4

Formulation 3: insulin aspart (100 U/ml), NaCl (150 mM), sodium phosphate (2 mM), TETA (0.5 mM), dodecyl maltoside (0.05 mg/ml), phenol (16 mM), m-cresol (16 mM), zinc (from $ZnCl_2$, 19.7 μg/ml with respect to zinc), pH 7.4

Formulation 1 is identical to Formulation K in Example 1 of WO2010/149772, which was shown to have a significantly more rapid onset of action compared with that of commercially available NovoRapid® product (Formulation A in Example 1 of WO2010/149772)—see FIGS. 4 and 5 of WO2010/149772. Formulations 1, 2 and 3 are also the same as Formulations 3B, 3E and 31, respectively, referred to in Example 3 of the present application. Results are shown in FIG. 1. It was shown that the formulation comprising TETA (Formulation 3) resulted in a comparable PD profile to that of the composition comprising nicotinamide (Formulation 1). The decline in glucose concentration appeared to be slightly more rapid in the TETA-based formulation in the first 50 minutes after injection, but it appeared to slow down beyond that point.

Formulation comprising EDTA (Formulation 2) resulted in a more rapid glucose decrease compared with both the TETA-based and the nicotinamide-based formulation. However, as shown in Example 3, this formulation is unstable and therefore not suitable for a viable pharmaceutical product.

Example 5—Effect of pH and the Source of Citrate on Stability of Insulin Aspart The stability of insulin aspart (100 U/ml) in the formulation of currently marketed NovoRapid® rapid-acting product (formulation 5A in Table 7) was compared with that of insulin aspart in a number of compositions comprising dodecyl maltoside and either trisodium citrate or citric acid (formulations 5B-5I in Table 7) following storage at 37° C. and 30° C.

The formulations were prepared as follows:

Insulin powder was added to water and HCl was added until the powder was fully dissolved (pH has to be <3 in order to achieve full dissolution). $ZnCl_2$ was added to the required level. Once $ZnCl_2$ was fully dissolved, pH was adjusted to approximately 7 and volume was adjusted with deionised water so that the insulin concentration was 200 U/ml. Separately, a background solution was prepared for each of the formulations tested containing all of the required excipients at 2× the required concentration. Each background solution was then adjusted to the required level. For example, the background solution for formulation 5B contained 4 mM sodium phosphate, 300 mM sodium chloride, 0.1 mg/ml dodecyl maltoside, 44 mM trisodium citrate and was adjusted to pH 7.0. Similarly, the background solution for formulation 5H contained 4 mM sodium phosphate, 300 mM sodium chloride, 0.1 mg/ml dodecyl maltoside, 44 mM citric acid and was adjusted to pH 7.8. Formulations 5A-5I were then prepared by mixing 1 part (v/v) of the 200 U/ml insulin solution with 1 part (v/v) of the background solution. The pH of each composition was subsequently checked to ensure it was at the correct level.

TABLE 7

Compositions of formulations (5A-5I) of insulin aspart tested. All formulations contained insulin aspart (100 U/ml), zinc (0.3 mM), phenol (16 mM) and m-cresol (16 mM) and were adjusted to the required pH by either sodium hydroxide or hydrochloric acid.

| | Sodium phosphate (mM) | Sodium chloride (mM) | Glycerol (mM) | Dodecyl maltoside (mg/ml) | Triodium citrate (mM) | Citric acid (mM) | pH |
|---|---|---|---|---|---|---|---|
| 5A | 7 | 10 | 174 | | | | 7.4 |
| 5B | 2 | 150 | | 0.05 | 22 | | 7.0 |
| 5C | 2 | 150 | | 0.05 | 22 | | 7.4 |
| 5D | 2 | 150 | | 0.05 | 22 | | 7.8 |
| 5E | 2 | 150 | | 0.05 | 22 | | 8.0 |
| 5F | 2 | 150 | | 0.05 | | 22 | 7.0 |
| 5G | 2 | 150 | | 0.05 | | 22 | 7.4 |
| 5H | 2 | 150 | | 0.05 | | 22 | 7.8 |
| 5I | 2 | 150 | | 0.05 | | 22 | 8.0 |

Results of the visual assessment (using Visual Assessment Scoring Method B) and the formation of related species (by RP-HPLC) of formulations 5A-5I are shown in Table 8. It was shown that in the presence of trisodium citrate there was a significant particle formation at pH 7.0 and 7.4 at 37° C. (accelerated storage temperature). The rate of particle formation was considerably lower at higher pH levels, particularly at pH 7.8. A similar trend was observed at 30° C. where pH 7.8 also appeared to be optimal. The use of citric acid instead of trisodium citrate resulted in lower particle formation across the whole pH range. The rate of particle formation at pH 7.8, both using citric acid and using trisodium citrate, was in fact lower than that in the formulation of the currently marketed NovoRapid® product. Whilst at pH 7.8 there was minimal difference between the use of trisodium citrate and citric acid, use of citric acid appears preferable to ensure safety of the product, because small variability around the target pH of the product is expected by the regulatory authorities and citric acid would thus ensure lower particle formation in case the product was formulated slightly below the target pH during manufacturing.

Whilst a slight increase in the rate of related species formation was observed with increasing pH of the formulation, the use of citric acid also resulted in lower rate of related species formation compared with corresponding formulations based on trisodium citrate, further highlighting the benefit of using citric acid. Importantly, the composition based on citric acid at pH 7.8 showed better stability than the formulation of the currently marketed NovoRapid® product in every respect.

TABLE 8

Visual scores and formation of related species of insulin aspart formulations 5A-5I using Visual Assessment Scoring Method B following storage at 37° C. and 30° C. for 4 weeks. Visual score 1: clear solution, virtually free of particles; visual score 2: ~5 very small particles; visual score 3: ~10-20 very small particles; visual score 4: 20-50 particles, including larger particles; visual score 5: >50 particles, including larger particles.

| | Visual score (0 weeks) | Visual score (37° C., 4 weeks) | Visual score (30° C., 4 weeks) | Increase in % related species (37° C., 4 weeks) | Increase in % related species (30° C., 4 weeks) |
|---|---|---|---|---|---|
| 5A | 1 | 4 | 2 | 8.47 | 3.06 |
| 5B | 1 | 5 | 5 | Not analysed* | Not analysed* |
| 5C | 1 | 5 | 2 | Not analysed* | 2.50 |
| 5D | 1 | 2 | 1 | 8.71 | 2.99 |
| 5E | 1 | 3 | 2 | 8.88 | 3.09 |
| 5F | 1 | 3 | 2 | 5.94 | 2.24 |
| 5G | 1 | 2 | 2 | 6.23 | 2.37 |
| 5H | 1 | 2 | 1 | 6.72 | 2.54 |
| 5I | 1 | 3 | 1 | 8.34 | 3.08 |

*Sample not analysed due to excessive precipitation.

Example 6—Effect of Alkyl Glycosides and Other Non-Ionic Surfactants on the Stability of Insulin Aspart in the Presence of Trisodium Citrate, L-Histidine and Pyrophosphate Stability of insulin aspart (100 U/ml) was investigated in compositions comprising trisodium citrate (22 mM), L-histidine (10 mM) or pyrophosphate (5 mM), both in the presence and in the absence of alkyl glycosides and other selected non-ionic surfactants. All compositions tested further comprised sodium chloride (150 mM), phenol (15.9 mM), m-cresol (15.9 mM), sodium phosphate (2 mM), ionic zinc (19.7 μg/ml, excluding counter-anion, as $ZnCl_2$) and were adjusted to pH 7.4.

It was shown (Table 9) that the presence of trisodium citrate, L-histidine or pyrophosphate increased considerably the rate of particle formation in formulations of insulin aspart, using the Visual Assessment Scoring Method B. The presence of alkyl glycosides, particularly dodecyl maltoside, appeared to mitigate the increase in particle formation rate. Polysorbate 80 also showed a stabilising effect, although not as significant an effect as dodecyl maltoside. The ability of poloxamer 188 to mitigate the increase in particle formation rate was shown to be worse than that of the other non-ionic surfactants tested. Polysorbate 20 was not effective at all in this experiment.

TABLE 9

| Accelerator | Surfactant (all at 50 µg/ml) | 0 days | 4 days | 7 days | 14 days | 28 days |
|---|---|---|---|---|---|---|
| None | None | 1 | 1 | 1 | 1 | 1 |
| Trisodium citrate (22 mM) | None | 1 | 3 | 4 | 5 | 5 |
| Trisodium citrate (22 mM) | Polysorbate 80 | 1 | 1 | 3 | 3 | 3 |
| Trisodium citrate (22 mM) | Polysorbate 20 | 1 | 3 | 4 | 5 | 5 |
| Trisodium citrate (22 mM) | Poloxamer 188 | 1 | 2 | 4 | 5 | 5 |
| Trisodium citrate (22 mM) | Dodecyl maltoside | 1 | 1 | 1 | 1 | 1 |
| Trisodium citrate (22 mM) | Decyl glucopyranoside | 1 | 1 | 3 | 3 | 4 |
| L-Histidine (10 mM) | None | 1 | 4 | 5 | 5 | 5 |
| L-Histidine (10 mM) | Polysorbate 80 | 1 | 4 | 4 | 4 | 5 |
| L-Histidine (10 mM) | Polysorbate 20 | 1 | 4 | 5 | 5 | 5 |
| L-Histidine (10 mM) | Poloxamer 188 | 1 | 4 | 4 | 5 | 5 |
| L-Histidine (10 mM) | Dodecyl maltoside | 1 | 2 | 2 | 2 | 3 |
| L-Histidine (10 mM) | Decyl glucopyranoside | 1 | 3 | 4 | 4 | 4 |
| Pyrophosphate (5 mM) | None | 1 | 5 | 5 | 5 | 5 |
| Pyrophosphate (5 mM) | Polysorbate 80 | 1 | 4 | 5 | 5 | 5 |
| Pyrophosphate (5 mM) | Polysorbate 20 | 1 | 5 | 5 | 5 | 5 |
| Pyrophosphate (5 mM) | Poloxamer 188 | 1 | 5 | 5 | 5 | 5 |
| Pyrophosphate (5 mM) | Dodecyl maltoside | 1 | 1 | 1 | 2 | 2 |
| Pyrophosphate (5 mM) | Decyl glucopyranoside | 1 | 2 | 4 | 5 | 5 |

Visual scores of insulin aspart (100 U/ml) formulations using Visual Assessment Scoring Method B following storage at 30° C.

Example 7—Effect of Dodecyl Maltoside and Other Non-Ionic Surfactants on the Stability of Insulin Lispro in the Presence of Citric Acid Stability of insulin lispro (100 U/ml) was investigated in formulations comprising citric acid (22 mM), both in the presence and in the absence of dodecyl maltoside and other selected non-ionic surfactants. All formulations (except Humalog® control, see below) contained: phenol (15.9 mM), m-cresol (15.9 mM), sodium phosphate (2 mM), ionic zinc (19.7 µg/ml, excluding counter-anion, as $ZnCl_2$) and were adjusted to pH 7.8. Formulations contained either glycerol (174 mM) or NaCl (150 mM) as a tonicity modifier. For comparison, the formulation of the commercial insulin lispro product (Humalog®) was also included in the study. This formulation was prepared using the same procedure as that used for all other formulations studied in this experiment and contained the excipients of the commercial Humalog® product. The composition of Humalog® is: sodium phosphate (13.2 mM), glycerol (174 mM), m-cresol (29 mM), ionic zinc (19.7 µg/ml, excluding counter-ion), adjusted to pH 7.3.

It was shown (Table 10) that the presence of citric acid (22-44 mM) resulted in an increased formation of particles in compositions of insulin lispro in the absence of dodecyl maltoside or other non-ionic surfactants, using the Visual Assessment Scoring Method B. Higher concentrations of citric acid led to higher rate of particle formation. The nature of the tonicity modifier had a minimal impact on the particle formation rate. Thus, whether the formulation is of higher or lower ionic strength does not appear to significantly impact the stability of insulin lispro at a concentration of 100 U/ml. The presence of dodecyl maltoside mitigated the destabilising effect. The destabilising effect was completely reversed by dodecyl maltoside in formulations comprising 22 and 34 mM citric acid. In the formulation comprising 44 mM the effect was almost completely reversed, the particle formation rate being only very slightly higher than in the reference formulation that did not comprise citric acid. The stabilising effect of dodecyl maltoside appeared to be stronger at 50 µg/ml or 100 µg/ml than at 200 µg/ml, indicating there may be an advantage in using lower dodecyl maltoside concentrations.

Polysorbate 80 also appeared to mitigate the destabilising effect, although not to the same extent as dodecyl maltoside. The stabilising effects of polysorbate 20 and poloxamer 188 were considerably weaker than those of dodecyl maltoside and polysorbate 80.

TABLE 10

Visual scores of insulin lispro (100 U/ml) formulations using Visual Assessment Scoring Method B following storage at indicated temperatures.

| Citric acid (mM) | Surfactant | Tonicity modifier | T = 0 weeks | 2-8° C. (8 weeks) | 30° C. (4 weeks) | 30° C. (8 weeks) | 37° C. (4 weeks) |
|---|---|---|---|---|---|---|---|
| 0 mM | None | Glycerol (174 mM) | 1 | 1 | 1 | 1 | 2 |
| 0 mM | None | NaCl (150 mM) | 1 | 1 | 1 | 1 | 3 |
| 22 mM | None | Glycerol (174 mM) | 1 | 1 | 4 | 5 | 5 |
| 34 mM | None | Glycerol (174 mM) | 1 | 1 | 5 | 5 | 5 |
| 44 mM | None | Glycerol (174 mM) | 1 | 3 | 5 | 5 | 5 |
| 22 mM | None | NaCl (150 mM) | 1 | 1 | 4 | 5 | 5 |
| 22 mM | Polysorbate 80 (50 µg/ml) | Glycerol (174 mM) | 1 | 1 | 2 | 2 | 3 |
| 22 mM | Polysorbate 20 (50 g/mL) | Glycerol (174 mM) | 1 | 1 | 3 | 4 | 4 |

TABLE 10-continued

Visual scores of insulin lispro (100 U/ml) formulations using Visual Assessment Scoring Method B following storage at indicated temperatures.

| Citric acid (mM) | Surfactant | Tonicity modifier | T = 0 weeks | 2-8° C. (8 weeks) | 30° C. (4 weeks) | 30° C. (8 weeks) | 37° C. (4 weeks) |
|---|---|---|---|---|---|---|---|
| 22 mM | Poloxamer 188 (50 μg/ml) | Glycerol (174 mM) | 1 | 1 | 4 | 4 | 5 |
| 22 mM | Dodecyl maltoside (50 μg/ml) | Glycerol (174 mM) | 1 | 1 | 1 | 1 | 1 |
| 22 mM | Dodecyl maltoside (100 μg/ml) | Glycerol (174 mM) | 1 | 1 | 1 | 1 | 1 |
| 22 mM | Dodecyl maltoside (200 μg/ml) | Glycerol (174 mM) | 1 | 1 | 1 | 1 | 2 |
| 22 mM | Dodecyl maltoside (100 μg/ml) | NaCl (150 mM) | 1 | 1 | 1 | 1 | 1 |
| 34 mM | Dodecyl maltoside (50 μg/ml) | Glycerol (174 mM) | 1 | 1 | 1 | 1 | 2 |
| 44 mM | Dodecyl maltoside (50 μg/ml) | Glycerol (174 mM) | 1 | 1 | 1 | 2 | 3 |
| Humalog ® control | | | 1 | 1 | 1 | 1 | 2 |

Example 8—Effect of Dodecyl Maltoside and Polysorbate 80 on the Stability of Insulin Aspart (1000 U/ml) in the Presence of Trisodium Citrate, L-Histidine and Pyrophosphate Stability of insulin aspart (1000 U/ml) was investigated in formulations comprising trisodium citrate (44 mM), L-histidine (22 mM) or pyrophosphate (22 mM), both in the presence and in the absence of dodecyl maltoside or polysorbate 80. All compositions (except control based on NovoRapid® composition, see below) further comprised phenol (15.9 mM), m-cresol (15.9 mM), sodium phosphate (2 mM), glycerol (174 mM), sodium chloride (10 mM) and ionic zinc (197 μg/ml, excluding counter-anion, as $ZnCl_2$) and were adjusted to pH 7.4.

For comparison, a formulation of insulin aspart (1000 U/ml) in the composition of the 100 U/ml commercial insulin aspart product (NovoRapid®) was also included in the study. This formulation was prepared using the same procedure as that used for all other 1000 U/ml formulations studied in this experiment and contained the excipients of the commercial NovoRapid® product. The concentration of ionic zinc was adjusted to ensure the ratio between insulin aspart and ionic zinc was the same as that in the 100 U/ml NovoRapid® product. The formulation thus comprised sodium phosphate (7 mM), glycerol (174 mM), sodium chloride (10 mM), phenol (15.9 mM), m-cresol (15.9 mM) and ionic zinc (197 μg/ml, excluding counter-anion) and was adjusted to pH 7.4.

It was shown (Table 11) that the presence of trisodium citrate, L-histidine or pyrophosphate resulted in a considerable increase in the rate of particle formation of insulin aspart, using the Visual Assessment Scoring Method B. The presence of dodecyl maltoside mitigated the destabilising effect. Polysorbate 80 also showed a stabilising effect, although not to the same extent as that of dodecyl maltoside.

TABLE 11

Visual scores of insulin aspart (1000 U/ml) formulations using Visual Assessment Scoring Method B following storage at indicated temperatures.

| Accelerator | Surfactant | Ionic strength* (mM) | T = 0 weeks | 2-8° C. (12 weeks) | 30° C. (4 weeks) | 30° C. (12 weeks) | 37° C. (4 weeks) |
|---|---|---|---|---|---|---|---|
| None | None | 24.16 | 1 | 1 | 2 | 2 | 3 |
| Citrate (44 mM) | None | 24.16 | 1 | 2 | 4 | 5 | 5 |
| Citrate (44 mM) | Dodecyl maltoside (50 μg/ml) | 24.16 | 1 | 1 | 1 | 2 | 3 |
| Citrate (44 mM) | Polysorbate 80 (50 μg/ml) | 24.16 | 1 | 2 | 1 | 3 | 5 |
| Histidine (22 mM) | None | 24.16 | 1 | 2 | 4 | 5 | 5 |
| Histidine (22 mM) | Dodecyl maltoside (50 μg/ml) | 24.16 | 1 | 1 | 2 | 3 | 4 |
| Histidine (22 mM) | Polysorbate 80 (50 μg/ml) | 24.16 | 1 | 2 | 4 | 5 | 4 |
| Pyrophosphate (22 mM) | None | 24.16 | 1 | 3 | 5 | 5 | 5 |

TABLE 11-continued

Visual scores of insulin aspart (1000 U/ml) formulations using Visual Assessment Scoring Method B following storage at indicated temperatures.

| Accelerator | Surfactant | Ionic strength* (mM) | T = 0 weeks | 2-8° C. (12 weeks) | 30° C. (4 weeks) | 30° C. (12 weeks) | 37° C. (4 weeks) |
|---|---|---|---|---|---|---|---|
| Pyrophosphate (22 mM) | Dodecyl maltoside (50 μg/ml) | 24.16 | 1 | 1 | 2 | 3 | 4 |
| Pyrophosphate (22 mM) | Polysorbate 80 (50 μg/ml) | 24.16 | 1 | 1 | 4 | 5 | 5 |
| NovoRapid ® control (formulated at 1000 U/ml) | | 35.83 | 1 | 1 | 2 | 2 | 3 |

*ionic strength calculation takes into account all ions in the formulation except for the zinc binding species (trisodium citrate, L-histidine or pyrophosphate) and the insulin compound using formula Ia.

Example 9—Effect of NaCl Concentration on the Stability of Insulin Aspart (1000 U/ml) Both in the Presence and in the Absence of Trisodium Citrate/Dodecyl Maltoside Combination The effect of NaCl concentration on the stability of insulin aspart (1000 U/ml) was investigated both in the presence and in the absence of trisodium citrate (44 mM)/dodecyl maltoside (50 μg/ml) combination. All formulations further comprised phenol (15.9 mM), m-cresol (15.9 mM), sodium phosphate (2 mM), ionic zinc (197 μg/ml, excluding counter-anion, as $ZnCl_2$) and were adjusted to pH 7.4.

The formulations comprised either glycerol (174 mM) or NaCl (150 mM) or a mixture of glycerol and NaCl as a tonicity modifier (See Table 12). The concentration of glycerol in the formulations comprising a mixture of glycerol and NaCl was less than 174 mM so that the overall osmolarity of the compositions remained the same as in the compositions comprising glycerol only.

It was shown (Table 12) that the stability of insulin aspart (1000 U/ml) was negatively impacted by the presence of NaCl, both in the absence and in the presence of trisodium citrate (44 mM)/dodecyl maltoside (50 μg/ml) combination. In the absence of the trisodium citrate (44 mM)/dodecyl maltoside (50 μg/ml) combination, the stability was comparable using glycerol (174 mM) and glycerol (154 mM)/NaCl (10 mM) mixture as a tonicity modifier. However, considerable impairment in stability was observed when 150 mM NaCl was used. Interestingly, the impairment was observed only at 2-8° C. where a marked increase in the rate of particle formation was observed in the presence of 150 mM NaCl. The detrimental impact of increasing NaCl concentration on the stability of insulin aspart (1000 U/ml) was also observed in the presence of trisodium citrate (44 mM)/dodecyl maltoside (50 μg/ml) combination. Whilst only a small difference was observed between compositions comprising glycerol (174 mM) and glycerol (154 mM)/NaCl (10 mM) mixture as tonicity modifiers, a composition comprising glycerol (154 mM)/NaCl (50 mM) mixture showed a considerably impaired stability at 2-8° C.

It was thus demonstrated that increasing the ionic strength of the composition of insulin aspart at 1000 U/ml leads to an increased rate of particle formation.

TABLE 12

Visual scores of insulin aspart (1000 U/ml) formulations using Visual Assessment Scoring Method B following storage at indicated temperatures.

| Citrate | Tonicity modifier | Dodecyl maltoside (μg/ml) | Ionic strength* (mM) | T = 0 weeks | 2-8° C. (12 weeks) | 30° C. (4 weeks) | 30° C. (12 weeks) | 37° C. (4 weeks) |
|---|---|---|---|---|---|---|---|---|
| 0 mM | Glycerol (174 mM) | 0 | 14.16 | 1 | 1 | 1 | 2 | 3 |
| 0 mM | Glycerol (154 mM) + NaCl (10 mM) | 0 | 24.16 | 1 | 1 | 2 | 2 | 3 |
| 0 mM | NaCl (150 mM) | 0 | 164.16 | 1 | 5 | 2 | 2 | 2 |
| 44 mM | Glycerol (174 mM) | 50 | 14.16 | 1 | 1 | 1 | 2 | 3 |
| 44 mM | Glycerol (154 mM) + NaCl (10 mM) | 50 | 24.16 | 1 | 1 | 1 | 2 | 3 |
| 44 mM | Glycerol (74 mM) + NaCl (50 mM) | 50 | 64.16 | 1 | 5 | 3 | 3 | 5 |

*ionic strength calculation takes into account all ions in the formulation except for the zinc binding species (trisodium citrate) and the insulin compound using formula Ia.

Example 10: Comparison of the Source of Citrate and the pH of the Formulation on the Stability of Insulin Aspart (1000 U/ml)

The effect of the source of citrate anion and the pH of the formulation on the stability of insulin aspart (1000 U/ml) was investigated. Citric acid and trisodium citrate were compared as the source of the citrate anion. The formulation comprising citric acid was tested at pH 7.8 and the formulation comprising trisodium citrate was tested at pH 7.4. Both formulations further comprised phenol (15.9 mM), m-cresol (15.9 mM), sodium phosphate (2 mM), glycerol (174 mM), dodecyl maltoside (50 μg/ml) and ionic zinc (197 μg/ml, excluding counter-anion, as $ZnCl_2$).

It was shown (Table 13) that the source of citrate and the pH had a minimal impact on the stability of insulin aspart. The formulation comprising citric acid (pH 7.8) appeared to be very slightly more stable at the 8 weeks time-point at 30° C.

TABLE 13

Visual scores of insulin aspart (1000 U/ml) formulations using Visual Assessment Scoring Method B following storage at indicated temperatures.

| Source of citrate anion | pH | Ionic strength* (mM) | T = 0 weeks | 2-8° C. (8 weeks) | 30° C. (4 weeks) | 30° C. (8 weeks) | 37° C. (4 weeks) |
|---|---|---|---|---|---|---|---|
| Citric acid (44 mM) | 7.8 | 14.84 | 1 | 1 | 1 | 2 | 3 |
| Trisodium citrate (44 mM) | 7.4 | 14.16 | 1 | 1 | 1 | 3 | 3 |

*ionic strength calculation takes into account all ions in the formulation except for the zinc binding species (trisodium citrate, citric acid) and the insulin compound using formula Ia.

Example 11: Investigation of the Effect of Citric Acid Concentration on the Stability of Insulin Aspart (1000 U/ml) in the Presence of Dodecyl Maltoside The effect of citric acid concentration on the stability of insulin aspart (1000 U/ml) was investigated in the presence of dodecyl maltoside (0.05 mg/ml). All formulations tested further comprised phenol (15.9 mM), m-cresol (15.9 mM), sodium phosphate (2 mM), glycerol (174 mM), dodecyl maltoside (0.05 mg/ml) and ionic zinc (197 μg/ml, excluding counter-anion, as $ZnCl_2$) and were adjusted to pH 7.8.

It was shown (Table 14) that increasing the concentration of citric acid from 0 to 44 mM had only a very small impact on the stability of insulin aspart (1000 U/ml) in the presence of dodecyl maltoside (0.05 mg/ml). No effect was observed at 2-8° C. and 37° C. for the duration of the experiment, and the rate of particle formation was only very slightly higher in the compositions comprising 22, 33 and 44 mM citric acid compared with compositions comprising 0 and 11 mM citric acid at 30° C.

TABLE 14

Visual scores of insulin aspart (1000 U/ml) formulations using Visual Assessment Scoring Method B following storage at indicated temperatures.

| Citric acid | Ionic strength* (mM) | T = 0 weeks | 2-8° C. (8 weeks) | 30° C. (4 weeks) | 30° C. (8 weeks) | 37° C. (4 weeks) |
|---|---|---|---|---|---|---|
| 0 mM | 14.84 | 1 | 1 | 1 | 1 | 3 |
| 11 mM | 14.84 | 1 | 1 | 1 | 1 | 3 |
| 22 mM | 14.84 | 1 | 1 | 1 | 2 | 3 |
| 33 mM | 14.84 | 1 | 1 | 1 | 2 | 3 |
| 44 mM | 14.84 | 1 | 1 | 1 | 2 | 3 |

*ionic strength calculation takes into account all ions in the formulation except for the zinc binding species (citric acid) and the insulin compound using formula Ia.

Example 12: Investigation of the Optimal Concentration of Dodecyl Maltoside and Polysorbate 80 on the Stability of Insulin Aspart (1000 U/ml) in the Presence of Different Concentrations of Citric Acid The stability of insulin aspart (1000 U/ml) was investigated in the presence of different concentrations of citric acid and different concentrations of either dodecyl maltoside or polysorbate 80. All formulations tested further comprised phenol (15.9 mM), m-cresol (15.9 mM), sodium phosphate (2 mM), glycerol (174 mM) and ionic zinc (197 μg/ml, excluding counter-anion, as $ZnCl_2$) and were adjusted to pH 7.8. Three concentrations of citric acid (44, 66 and 88 mM) and four concentrations of each non-ionic surfactant were tested as well as corresponding surfactant-free compositions.

The rate of particle formation in formulations of insulin aspart (1000 U/ml) was found to be proportional to citric acid concentration in the range between 44 and 88 mM, with the lower citric acid concentration of 44 mM being most suitable (Table 15). Whilst the presence of both dodecyl maltoside and polysorbate 80 led to a reduction in the rate of particle formation, dodecyl maltoside was found more effective in inhibiting the particle formation than polysorbate 80. The lower concentrations of dodecyl maltoside (0.05 and 0.1 mg/ml) appeared to be more effective in inhibiting the particle formation than higher concentrations (0.2 and 0.3 mg/ml). In contrast, in the case of polysorbate 80 it was the higher concentrations (0.3 and 0.5 mg/ml) that showed a greater ability to reduce the particle formation rate than the lower concentrations (0.05 and 0.1 mg/ml).

TABLE 15

Visual scores of insulin aspart (1000 U/ml) formulations using Visual Assessment Scoring Method B following storage at indicated temperatures.

| Citric acid | Dodecyl maltoside (mg/ml) | Polysorbate 80 (mg/ml) | Ionic strength* (mM) | T = 0 weeks | 2-8° C. (8 weeks) | 30° C. (4 weeks) | 30° C. (8 weeks) | 37° C. (4 weeks) |
|---|---|---|---|---|---|---|---|---|
| 44 mM | 0 | 0 | 14.84 | 1 | 3 | 4 | 5 | 5 |
| 44 mM | 0.05 | 0 | 14.84 | 1 | 1 | 1 | 2 | 3 |
| 44 mM | 0.1 | 0 | 14.84 | 1 | 1 | 1 | 2 | 3 |
| 44 mM | 0.2 | 0 | 14.84 | 1 | 1 | 2 | 2 | 4 |
| 44 mM | 0.3 | 0 | 14.84 | 1 | 2 | 2 | 3 | 5 |
| 44 mM | 0 | 0.05 | 14.84 | 1 | 3 | 2 | 3 | 4 |
| 44 mM | 0 | 0.1 | 14.84 | 1 | 2 | 2 | 3 | 4 |
| 44 mM | 0 | 0.3 | 14.84 | 1 | 2 | 2 | 3 | 4 |
| 44 mM | 0 | 0.5 | 14.84 | 1 | 1 | 1 | 3 | 4 |
| 66 mM | 0 | 0 | 14.84 | 1 | 5 | 5 | 5 | 5 |
| 66 mM | 0.05 | 0 | 14.84 | 1 | 2 | 2 | 4 | 4 |
| 66 mM | 0.1 | 0 | 14.84 | 1 | 3 | 2 | 3 | 4 |
| 66 mM | 0.2 | 0 | 14.84 | 1 | 3 | 2 | 5 | 5 |
| 66 mM | 0.3 | 0 | 14.84 | 1 | 4 | 3 | 5 | 5 |
| 66 mM | 0 | 0.05 | 14.84 | 1 | 5 | 4 | 5 | 5 |
| 66 mM | 0 | 0.1 | 14.84 | 1 | 5 | 4 | 5 | 5 |
| 66 mM | 0 | 0.3 | 14.84 | 1 | 4 | 3 | 4 | 4 |
| 66 mM | 0 | 0.5 | 14.84 | 1 | 4 | 4 | 5 | 5 |
| 88 mM | 0 | 0 | 14.84 | 1 | 5 | 5 | 5 | 5 |
| 88 mM | 0.05 | 0 | 14.84 | 1 | 4 | 2 | 4 | 5 |
| 88 mM | 0.1 | 0 | 14.84 | 1 | 5 | 3 | 3 | 5 |
| 88 mM | 0.2 | 0 | 14.84 | 1 | 5 | 4 | 5 | 5 |
| 88 mM | 0.3 | 0 | 14.84 | 1 | 5 | 4 | 5 | 5 |
| 88 mM | 0 | 0.05 | 14.84 | 1 | 5 | 4 | 5 | 5 |
| 88 mM | 0 | 0.1 | 14.84 | 1 | 5 | 4 | 4 | 5 |
| 88 mM | 0 | 0.3 | 14.84 | 1 | 5 | 3 | 4 | 5 |
| 88 mM | 0 | 0.5 | 14.84 | 1 | 5 | 3 | 5 | 5 |

*ionic strength calculation takes into account all ions in the formulation except for the zinc binding species (citric acid) and the insulin compound using formula Ia.

Example 13—Effect of Trisodium Citrate and Dodecyl Maltoside on the Pharmacodynamic Profile of Insulin Aspart (100 U/ml)

Pharmacodynamic profile of insulin aspart was compared in the following formulations using the Diabetic Pig Pharmacokinetic/Pharmacodynamic Model (see General Methods (c)):

- Insulin aspart (100 U/ml) in the formulation of the currently marketed NovoRapid® (100 U/ml) rapid-acting product
- Insulin aspart (100 U/ml) in the formulation comprising 22 mM trisodium citrate and 0.05 mg/ml dodecyl maltoside Both formulations tested comprised phenol (15.9 mM), m-cresol (15.9 mM) and ionic zinc (19.7 μg/ml, excluding counter-anion, as $ZnCl_2$) and were adjusted to pH 7.4. The additional components of each formulation are listed in Table 16.

TABLE 16

Additional components in formulations of insulin aspart (100 U/ml) tested.

| Formulation. | Sodium phosphate (mM) | NaCl (mM) | Glycerol (mM) | Trisodium citrate (mM) | Dodecyl maltoside (mg/ml) |
|---|---|---|---|---|---|
| 13A (i.e. composition of NovoRapid ®) | 7 | 10 | 174 | | |
| 13B | 2 | 150 | | 22 | 0.05 |

Pharmacodynamic profiles of formulations 13A and 13B are shown in FIG. 2. The formulation of insulin aspart comprising trisodium citrate and dodecyl maltoside resulted in a considerably more rapid onset of action compared with the composition of the currently marketed NovoRapid® rapid-acting product.

Example 14: Effect of Excipients on Pharmacodynamics and Pharmacokinetic Profile of Insulin Aspart (100 U/ml)

Pharmacodynamic profile of insulin aspart was compared in the following formulations using the Diabetic Pig Pharmacokinetic/Pharmacodynamic Model (see General Methods (c)):

- Insulin aspart (100 U/ml) in the formulation K in Example 1 of WO2010/149772 which was shown to have a significantly more rapid onset of action compared with NovoRapid® (100 U/ml) rapid-acting product
- Insulin aspart (100 U/ml) in the formulation of the currently marketed NovoRapid® (100 U/ml) rapid-acting product
- Insulin aspart (100 U/ml) in the formulation comprising 22 mM trisodium citrate and 0.05 mg/ml dodecyl maltoside
- Insulin aspart (100 U/ml) in the formulation comprising 22 mM L-histidine and 0.05 mg/ml dodecyl maltoside All formulations tested comprised phenol (16 mM), m-cresol (16 mM) and ionic zinc (19.7 μg/ml, excluding counter-anion, as $ZnCl_2$) and were adjusted to pH 7.4. The additional components of each formulation are listed in Table 17.

TABLE 17

Additional components in formulations of insulin aspart (100 U/ml) tested.

| | Na phosphate (mM) | TRIS (mM) | NaCl (mM) | Glycerol (mM) | Trisodium citrate (mM) | Histidine (mM) | Nicotinamide (mM) | Arginine (mM) | Dodecyl maltoside (mg/ml) |
|---|---|---|---|---|---|---|---|---|---|
| 14A* | | 7 | 10 | 83.6 | | | 80 | 30 | |
| 14B** | 7 | | 10 | 174 | | | | | |
| 14C | 2 | | 150 | | 22 | | | | 0.05 |
| 14D | 2 | | 150 | | | 22 | | | 0.05 |

*Formulation K in WO2010/149772

**Formulation of NovoRapid ®

Pharmacodynamic profiles of formulations 14A-14D are shown in FIG. 3. The formulation K of WO2010/149772 was confirmed to result in a more rapid onset of action compared with the composition of the currently marketed NovoRapid® rapid-acting product of insulin aspart (Formulation 14A vs Formulation 14B). Formulations comprising either trisodium citrate and dodecyl maltoside (14C) or histidine and dodecyl maltoside (14D) also resulted in a considerably more rapid onset of action compared with the formulation of the currently marketed NovoRapid® rapid-acting product (14B).

The pharmacokinetic profiles of formulations 14A, 14B and 14C (using the Diabetic Pig Pharmacokinetic/Pharmacodynamic Model (see General Methods (c)), FIG. 4) were in line with the pharmacodynamic profiles, showing that formulation K of WO2010/149772 and formulation comprising trisodium citrate and dodecyl maltoside resulted in a more rapid increase in serum insulin level compared with the formulation of the marketed NovoRapid® product. The pharmacokinetic profile of formulation 14D was not tested.

Example 15—Comparison of Pharmacodynamic and Pharmacodynamic Profiles of Insulin Aspart (100 and 1000 U/ml) Formulations in the Presence and in the Absence of Citrate and Dodecyl Maltoside Pharmacodynamic and pharmacokinetic profile of insulin aspart was compared in the following compositions using the Diabetic Pig Pharmacokinetic/Pharmacodynamic Model (see General Methods (c)):

- Insulin aspart (100 U/ml) in the formulation of the currently marketed NovoRapid® (100 U/ml) rapid-acting product
- Insulin aspart (1000 U/ml) in the formulation of the currently marketed NovoRapid® (100 U/ml) rapid-acting product
- Insulin aspart (1000 U/ml) in a formulation of the invention comprising 22 mM trisodium citrate and 0.1 mg/ml dodecyl maltoside
- Insulin aspart (1000 U/ml) in a formulation of the invention comprising 44 mM trisodium citrate and 0.1 mg/ml dodecyl maltoside All formulations tested comprised phenol (15.9 mM) and m-cresol (15.9 mM) and were adjusted to pH 7.4. The additional components of each formulation are listed in Table 18.

TABLE 18

Additional components in formulations of insulin aspart tested.

| Formulation | Insulin aspart (U/ml) | Sodium phosphate (mM) | NaCl (mM) | Glycerol (mM) | Ionic zinc* (μg/ml) | Trisodium citrate (mM) | Dodecyl maltoside (mg/ml) |
|---|---|---|---|---|---|---|---|
| 15A | 100 | 7 | 10 | 174 | 19.7 | | |
| 15B | 1000 | 7 | 10 | 174 | 197 | | |
| 15C | 1000 | 2 | 150 | | 197 | 22 | 0.1 |
| 16D | 1000 | 2 | 150 | | 197 | 44 | 0.1 |

*Does not include the contribution of counter-anion

Pharmacodynamic profiles of formulations 15A-15D are shown in FIG. 5. It was shown that increasing the concentration of insulin aspart from 100 U/ml to 1000 U/ml in the formulation of the marketed NovoRapid® product led to a slower onset of action. This is in line with previous reports of dose-dependent delays of the glucose reduction effect of rapid-acting insulins (e.g. de la Peña et al. Pharmacokinetics and Pharmacodynamics of high-dose human regular U-500 insulin versus human regular U-100 insulin in healthy obese subjects, Diabetes Care, 24, pp 2496-2501, 2011). It was also shown (FIG. 5) that a formulation of insulin aspart (1000 U/ml) comprising 44 mM trisodium citrate and 0.1 mg/ml dodecyl maltoside resulted in a pharmacodynamic profile that was comparable with that achieved by the formulation of the marketed NovoRapid® product (100 U/ml). Such acceleration of the onset of the glucose reduction was not observed in a composition comprising 22 mM trisodium citrate and 0.1 mg/ml dodecyl maltoside, indicating that this concentration of citrate is too low to achieve the accelerating effect at this concentration of insulin aspart.

The pharmacokinetic profiles of formulations 15A, 15B and 15D (FIG. 6) were in line with the pharmacodynamic profiles, showing that increasing the concentration of insulin aspart from 100 U/ml to 1000 U/ml in the formulation of the marketed NovoRapid® product led to a slower increase in serum insulin level, whereas the formulation comprising 44 mM trisodium citrate and 0.1 mg/ml dodecyl maltoside resulted in a profile that was comparable with that achieved by the formulation of the marketed NovoRapid® product (100 U/ml). The pharmacokinetic profile of Formulation 15C was not tested.

The $T_{MAX}$ and $T_{1/2MAX}$ mean values and standard deviations (SD) relating to the pharmacokinetic profiles of formulations 15A, 15B and 15D are shown in Table 19 below.

TABLE 19

$T_{MAX}$ and $T_{1/2MAX}$ mean values and standard deviations (SD) relating to the pharmacokinetic profiles of formulations 15A, 15B and 15D.

| | $T_{MAX}$ (mean) | $T_{MAX}$ (SD) | $T_{1/2MAX}$ (mean) | $T_{1/2MAX}$ (SD) |
|---|---|---|---|---|
| 15A | 25.71 | 8.38 | 8.01 | 2.35 |
| 15B | 90.83 | 21.68 | 28.67 | 8.02 |
| 15D | 20.71 | 6.07 | 7.00 | 3.53 |

Results of the Student's t-test performed to evaluate bioequivalence between formulations 15A, 15B and 15D are shown in Table 20 below. Formulation 15A and 15D were shown to be bioequivalent, whereas formulations 15A and 15B and formulations 15B and 15D were shown to be non-bioequivalent.

TABLE 20

Bioequivalence t-test analysis of the pharmacokinetic profiles of formulations 15A, 15B and 15D.

| | $T_{MAX}$ p-value | $T_{1/2MAX}$ p-value |
|---|---|---|
| 15A vs 15B | 0.0118 | 0.0115 |
| 15A vs 15D | 0.2507 | 0.3762 |
| 15B vs 15D | 0.0177 | 0.0107 |

Example 16—Stability of Insulin Lispro in the Presence of Trisodium Citrate and Non-Ionic Surfactants—Comparison with Formulations Disclosed in WO2016/100042

The following composition of insulin lispro (100 U/ml) of WO2016/100042 was selected based on the description on page 50 (lines 15-20): citrate (25 mM—from sodium citrate), poloxamer 188 (0.09% w/v), glycerol (16 mg/ml), m-cresol (3.15 mg/ml), zinc (0.3 mM, from zinc chloride), magnesium chloride (5 mM), sodium chloride (13 mM), pH 7.45. This composition is referred to as the "base formulation" below.

The effect of the following parameters was investigated on stability of insulin lispro by changing selected components and/or their concentrations in the base formulation:

- Effect of poloxamer 188 concentration
- Effect of NaCl concentration (i.e. effect of total chloride concentration)
- Effect of the presence of magnesium chloride
- Effect of dodecyl maltoside (as a replacement for poloxamer 188)

To allow further comparison all of the above effects were also investigated using insulin aspart.

Stability of insulin lispro and insulin aspart was tested under two separate stress conditions, in line with the stresses described in WO2016/100042:

- Storage at 30° C. (without agitation)
- Shaking stress (75 strokes per minute, 30° C.)

All formulations tested comprised insulin lispro or insulin aspart (100 U/ml), trisodium citrate (25 mM), glycerol (16 mg/ml), m-cresol (3.15 mg/ml) and zinc (0.3 mM, from zinc chloride) and were adjusted to pH 7.45. Additional components are stated in Tables 21-24.

Using insulin lispro it was shown (Tables 21 and 22) that:

- The stability of insulin lispro achieved in the presence of dodecyl maltoside was considerably better than that achieved in corresponding compositions comprising poloxamer 188. The effect was observed under both stress conditions.
- Lower concentrations of dodecyl maltoside appeared to provide better stability of insulin lispro than higher ones. The effect was observed under both stress conditions.
- Removing magnesium chloride (whilst maintaining the total chloride concentration by increasing the concentration of NaCl) led to impairment of stability of insulin lispro under both stress conditions. This indicates a stabilising effect of magnesium ions. It was noted that the presence of magnesium chloride had a modestly stabilising effect on dodecyl maltoside-containing formulations.
- The concentration total chloride (by increasing concentration of NaCl) had a minimal impact on stability of insulin lispro at this concentration of insulin lispro.

Similar observations were made using insulin aspart (Tables 23 and 24).

TABLE 21

Visual scores of insulin lispro (100 U/ml) formulations using Visual Assessment Scoring Method B following non-agitated storage at 30° C.

| Surfactant | Sodium chloride | Magnesium chloride | 0 weeks | 1 week | 2 weeks | 4 weeks | 8 weeks |
|---|---|---|---|---|---|---|---|
| Poloxamer 188 (0.09%) | 13 mM | 5 mM | 1 | 1 | 2 | 3 | 3 |
| Poloxamer 188 (0.06%) | 13 mM | 5 mM | 1 | 1 | 2 | 3 | 4 |
| Poloxamer 188 (0.03%) | 13 mM | 5 mM | 1 | 1 | 2 | 3 | 4 |
| Poloxamer 188 (0.01%) | 13 mM | 5 mM | 1 | 2 | 2 | 4 | 4 |
| Poloxamer 188 (0.005%) | 13 mM | 5 mM | 1 | 2 | 3 | 4 | 5 |
| None | 13 mM | 5 mM | 1 | 2 | 2 | 4 | 5 |
| Dodecyl maltoside (0.09%) | 13 mM | 5 mM | 1 | 1 | 1 | 2 | 3 |
| Dodecyl maltoside (0.06%) | 13 mM | 5 mM | 1 | 1 | 1 | 1 | 2 |
| Dodecyl maltoside (0.03%) | 13 mM | 5 mM | 1 | 1 | 1 | 1 | 2 |
| Dodecyl maltoside (0.01%) | 13 mM | 5 mM | 1 | 1 | 1 | 1 | 1 |
| Dodecyl maltoside (0.005%) | 13 mM | 5 mM | 1 | 1 | 1 | 1 | 1 |
| Poloxamer 188 (0.09%) | 150 mM | 5 mM | 1 | 1 | 2 | 3 | 4 |
| Poloxamer 188 (0.005%) | 150 mM | 5 mM | 1 | 2 | 2 | 3 | 4 |
| Dodecyl maltoside (0.09%) | 150 mM | 5 mM | 1 | 1 | 2 | 2 | 3 |

TABLE 21-continued

Visual scores of insulin lispro (100 U/ml) formulations using Visual Assessment Scoring Method B following non-agitated storage at 30° C.

| Surfactant | Sodium chloride | Magnesium chloride | 0 weeks | 1 week | 2 weeks | 4 weeks | 8 weeks |
|---|---|---|---|---|---|---|---|
| Dodecyl maltoside (0.005%) | 150 mM | 5 mM | 1 | 1 | 1 | 2 | 2 |
| Poloxamer 188 (0.09%) | 60 mM | 5 mM | 1 | 1 | 2 | 2 | 4 |
| Poloxamer 188 (0.005%) | 60 mM | 5 mM | 1 | 2 | 2 | 3 | 4 |
| Dodecyl maltoside (0.09%) | 60 mM | 5 mM | 1 | 1 | 1 | 2 | 3 |
| Dodecyl maltoside (0.005%) | 60 mM | 5 mM | 1 | 1 | 1 | 2 | 2 |
| Poloxamer 188 (0.09%) | 23 mM | 0 mM | 1 | 2 | 3 | 4 | 5 |
| Poloxamer 188 (0.005%) | 23 mM | 0 mM | 1 | 2 | 4 | 4 | 5 |
| Dodecyl maltoside (0.09%) | 23 mM | 0 mM | 1 | 1 | 3 | 4 | 4 |
| Dodecyl maltoside (0.005%) | 23 mM | 0 mM | 1 | 1 | 1 | 2 | 2 |

TABLE 22

Visual scores of insulin lispro (100 U/ml) formulations using Visual Assessment Scoring Method B following shaking stress (75 strokes per minute, 30° C.).

| Surfactant | Sodium chloride | Magnesium chloride | 0 day | 1 days | 3 days | 8 days | 13 days |
|---|---|---|---|---|---|---|---|
| Poloxamer 188 (0.09%) | 13 mM | 5 mM | 1 | 1 | 2 | 4 | 5 |
| Poloxamer 188 (0.06%) | 13 mM | 5 mM | 1 | 1 | 1 | 2 | 3 |
| Poloxamer 188 (0.03%) | 13 mM | 5 mM | 1 | 1 | 2 | 3 | 5 |
| Poloxamer 188 (0.01%) | 13 mM | 5 mM | 1 | 1 | 3 | 4 | 5 |
| Poloxamer 188 (0.005%) | 13 mM | 5 mM | 1 | 2 | 3 | 5 | 5 |
| None | 13 mM | 5 mM | 1 | 1 | 2 | 4 | 5 |
| Dodecyl maltoside (0.09%) | 13 mM | 5 mM | 1 | 1 | 1 | 1 | 2 |
| Dodecyl maltoside (0.06%) | 13 mM | 5 mM | 1 | 1 | 1 | 1 | 1 |
| Dodecyl maltoside (0.03%) | 13 mM | 5 mM | 1 | 1 | 1 | 1 | 1 |
| Dodecyl maltoside (0.01%) | 13 mM | 5 mM | 1 | 1 | 1 | 1 | 1 |
| Dodecyl maltoside (0.005%) | 13 mM | 5 mM | 1 | 1 | 1 | 1 | 1 |
| Poloxamer 188 (0.09%) | 150 mM | 5 mM | 1 | 1 | 1 | 2 | 3 |
| Poloxamer 188 (0.005%) | 150 mM | 5 mM | 1 | 1 | 2 | 3 | 5 |
| Dodecyl maltoside (0.09%) | 150 mM | 5 mM | 1 | 1 | 1 | 1 | 1 |
| Dodecyl maltoside (0.005%) | 150 mM | 5 mM | 1 | 1 | 1 | 1 | 1 |
| Poloxamer 188 (0.09%) | 60 mM | 5 mM | 1 | 1 | 2 | 3 | 5 |
| Poloxamer 188 (0.005%) | 60 mM | 5 mM | 1 | 1 | 4 | 5 | 5 |
| Dodecyl maltoside (0.09%) | 60 mM | 5 mM | 1 | 1 | 1 | 1 | 2 |
| Dodecyl maltoside (0.005%) | 60 mM | 5 mM | 1 | 1 | 1 | 1 | 2 |
| Poloxamer 188 (0.09%) | 23 mM | 0 mM | 1 | 4 | 5 | 5 | 5 |
| Poloxamer 188 (0.005%) | 23 mM | 0 mM | 1 | 4 | 5 | 5 | 5 |
| Dodecyl maltoside (0.09%) | 23 mM | 0 mM | 1 | 1 | 1 | 1 | 3 |
| Dodecyl maltoside (0.005%) | 23 mM | 0 mM | 1 | 1 | 1 | 1 | 2 |

TABLE 23

Visual scores of insulin aspart (100 U/ml) formulations using Visual Assessment Scoring Method B following non-agitated storage at 30° C.

| Surfactant | Sodium chloride | Magnesium chloride | 0 weeks | 1 week | 2 weeks | 4 weeks |
|---|---|---|---|---|---|---|
| Poloxamer 188 (0.09%) | 13 mM | 5 mM | 1 | 3 | 4 | 4 |
| Poloxamer 188 (0.06%) | 13 mM | 5 mM | 1 | 2 | 4 | 4 |
| Poloxamer 188 (0.03%) | 13 mM | 5 mM | 1 | 3 | 4 | 5 |
| Poloxamer 188 (0.01%) | 13 mM | 5 mM | 1 | 3 | 4 | 5 |
| Poloxamer 188 (0.005%) | 13 mM | 5 mM | 1 | 3 | 5 | 5 |
| None | 13 mM | 5 mM | 1 | 3 | 4 | 5 |
| Dodecyl maltoside (0.09%) | 13 mM | 5 mM | 1 | 3 | 4 | 5 |
| Dodecyl maltoside (0.06%) | 13 mM | 5 mM | 1 | 3 | 3 | 3 |
| Dodecyl maltoside (0.03%) | 13 mM | 5 mM | 1 | 2 | 3 | 3 |
| Dodecyl maltoside (0.01%) | 13 mM | 5 mM | 1 | 2 | 2 | 2 |
| Dodecyl maltoside (0.005%) | 13 mM | 5 mM | 1 | 1 | 1 | 1 |
| Poloxamer 188 (0.09%) | 150 mM | 5 mM | 1 | 4 | 4 | 4 |
| Poloxamer 188 (0.005%) | 150 mM | 5 mM | 1 | 2 | 4 | 5 |
| Dodecyl maltoside (0.09%) | 150 mM | 5 mM | 1 | 1 | 2 | 3 |
| Dodecyl maltoside (0.005%) | 150 mM | 5 mM | 1 | 1 | 2 | 2 |

TABLE 23-continued

Visual scores of insulin aspart (100 U/ml) formulations using Visual Assessment Scoring Method B following non-agitated storage at 30° C.

| Surfactant | Sodium chloride | Magnesium chloride | 0 weeks | 1 week | 2 weeks | 4 weeks |
|---|---|---|---|---|---|---|
| Poloxamer 188 (0.09%) | 60 mM | 5 mM | 1 | 3 | 3 | 4 |
| Poloxamer 188 (0.005%) | 60 mM | 5 mM | 1 | 2 | 3 | 5 |
| Dodecyl maltoside (0.09%) | 60 mM | 5 mM | 1 | 1 | 3 | 4 |
| Dodecyl maltoside (0.005%) | 60 mM | 5 mM | 1 | 1 | 1 | 1 |
| Poloxamer 188 (0.09%) | 23 mM | 0 mM | 1 | 5 | 5 | 5 |
| Poloxamer 188 (0.005%) | 23 mM | 0 mM | 1 | 5 | 5 | 5 |
| Dodecyl maltoside (0.09%) | 23 mM | 0 mM | 1 | 2 | 3 | 4 |
| Dodecyl maltoside (0.005%) | 23 mM | 0 mM | 1 | 1 | 1 | 2 |

TABLE 24

Visual scores of insulin aspart (100 U/ml) compositions using Visual Assessment Scoring Method B following shaking stress (75 strokes per minute, 30° C.).

| Surfactant | Sodium chloride | Magnesium chloride | 0 day | 1 days | 3 days | 8 days | 13 days |
|---|---|---|---|---|---|---|---|
| Poloxamer 188 (0.09%) | 13 mM | 5 mM | 1 | 2 | 5 | 5 | 5 |
| Poloxamer 188 (0.06%) | 13 mM | 5 mM | 1 | 2 | 5 | 5 | 5 |
| Poloxamer 188 (0.03%) | 13 mM | 5 mM | 1 | 3 | 3 | 5 | 5 |
| Poloxamer 188 (0.01%) | 13 mM | 5 mM | 1 | 3 | 5 | 5 | 5 |
| Poloxamer 188 (0.005%) | 13 mM | 5 mM | 1 | 3 | 5 | 5 | 5 |
| None | 13 mM | 5 mM | 1 | 3 | 5 | 5 | 5 |
| Dodecyl maltoside (0.09%) | 13 mM | 5 mM | 1 | 3 | 3 | 4 | 5 |
| Dodecyl maltoside (0.06%) | 13 mM | 5 mM | 1 | 2 | 3 | 3 | 4 |
| Dodecyl maltoside (0.03%) | 13 mM | 5 mM | 1 | 2 | 3 | 4 | 4 |
| Dodecyl maltoside (0.01%) | 13 mM | 5 mM | 1 | 2 | 2 | 3 | 3 |
| Dodecyl maltoside (0.005%) | 13 mM | 5 mM | 1 | 2 | 2 | 3 | 3 |
| Poloxamer 188 (0.09%) | 150 mM | 5 mM | 1 | 1 | 3 | 5 | 5 |
| Poloxamer 188 (0.005%) | 150 mM | 5 mM | 1 | 2 | 5 | 5 | 5 |
| Dodecyl maltoside (0.09%) | 150 mM | 5 mM | 1 | 1 | 2 | 3 | 4 |
| Dodecyl maltoside (0.005%) | 150 mM | 5 mM | 1 | 1 | 1 | 2 | 2 |
| Poloxamer 188 (0.09%) | 60 mM | 5 mM | 1 | 2 | 5 | 5 | 5 |
| Poloxamer 188 (0.005%) | 60 mM | 5 mM | 1 | 3 | 5 | 5 | 5 |
| Dodecyl maltoside (0.09%) | 60 mM | 5 mM | 1 | 2 | 3 | 3 | 4 |
| Dodecyl maltoside (0.005%) | 60 mM | 5 mM | 1 | 1 | 2 | 3 | 3 |
| Poloxamer 188 (0.09%) | 23 mM | 0 mM | 1 | 3 | 5 | 5 | 5 |
| Poloxamer 188 (0.005%) | 23 mM | 0 mM | 1 | 4 | 5 | 5 | 5 |
| Dodecyl maltoside (0.09%) | 23 mM | 0 mM | 1 | 2 | 3 | 4 | 5 |
| Dodecyl maltoside (0.005%) | 23 mM | 0 mM | 1 | 1 | 1 | 3 | 3 |

Example 17—Stability of Insulin Lispro and Insulin Aspart in a Formulation Comprising Dodecyl Maltoside Disclosed in U.S. Pat. No. 7,998,927

The following composition of U.S. Pat. No. 7,998,927 was selected based on the description in Example 1 (column 25): sodium acetate buffer (5 mM), saline (0.9% w/v), dodecyl maltoside (0.18% w/v), pH 6.0. Insulin aspart (100 U/ml) and insulin lispro (100 U/ml) were prepared in the above formulation.

It was found that following their preparation the formulations of both insulin analogues were cloudy, with a large number of particles (scoring 5 by Visual Assessment Scoring Method B) even in the absence of any stress. Stirring of the samples for 24 hours has not achieve any improvements and the compositions remained very cloudy. It is very likely that the impossibility of preparing the formulations as clear solutions was due to the fact that the pH was very close to the isoelectric point of the insulin analogues (pI=~5.4). Adjusting the pH of the composition to ≥7.0 led to a clear solution very quickly, but it was found impossible to achieve a clear solution at pH 6.0. Therefore, the composition of U.S. Pat. No. 7,998,927 is not useable as a formulation of a therapeutic product at 100 U/ml or more.

Example 18—Stability of Human Insulin in Formulations Comprising Dodecyl Maltoside at pH 6.0 and 7.4—Comparison with Formulations Disclosed in U.S. Pat. No. 7,998,927

Recombinant human insulin was obtained from Sigma Aldrich, St. Louis, MO (USA).

The following composition of U.S. Pat. No. 7,998,927 was selected based on the description in Example 1 (column 25): sodium acetate buffer (5 mM), saline (0.9% w/v), dodecyl maltoside (0.18% w/v), pH 6.0.

Example 1 of U.S. Pat. No. 7,998,927 describes compositions of human insulin in the above formulation at 5 U/ml (i.e. 0.5 U in 100 μl) and 25 U/ml (i.e. 0.5 U in 20 μl). In both cases the insulin concentration was lower than that in the marketed insulin products for human use (≥100 U/ml).

Formulations of human insulin were prepared in the above formulation at 5 U/ml, 25 U/ml and 100 U/ml. It was found impossible to prepare the above formulation of human insulin as a clear solution at any of the three insulin concentrations tested (Table 25). The compositions showed a number of particles even in the absence of any stress, scoring 3 (5 U/ml insulin formulation), 4 (25 U/ml insulin formulation) and 5 (100 U/ml insulin formulation) by Visual Assessment Scoring Method B. Subsequent stress at 30 led to further rapid particle formation, all three formulations scoring 5 by Visual Assessment Scoring Method B following 4 weeks incubation at 30° C.

TABLE 25

Visual scores of human insulin formulations using Visual Assessment Scoring Method B following storage at 30° C.

| Human insulin (U/ml) | Sodium acetate (mM) | Sodium chloride (mM) | Dodecyl maltoside (% w/v) | pH | 0 weeks | 2 weeks | 4 weeks |
|---|---|---|---|---|---|---|---|
| 5 | 5 | 154* | 0.18 | 6.0 | 3 | 4 | — |
| 25 | 5 | 154* | 0.18 | 6.0 | 4 | 5 | — |
| 100 | 5 | 154* | 0.18 | 6.0 | 5 | 5 | — |

*0.9% w/v

The effect of the addition of citric acid to formulations comprising dodecyl maltoside at 0.18% w/v and 0.005% w/v concentrations was also compared. All formulations tested comprised human insulin (100 U/ml), phenol (15.9 mM), m-cresol (15.9 mM), sodium phosphate (2 mM), ionic zinc (19.7 μg/ml, excluding counter-anion, as $ZnCl_2$) and were adjusted to pH 7.4. Additional components are shown in Table 26.

It was shown (Table 26) that in the presence of citrate, formulations could be prepared as a clear liquid. However, only the formulations comprising the lower level of dodecyl maltoside remained stable following storage at 30° C. The formulations comprising 0.18% dodecyl maltoside showed a considerably greater particle formation.

TABLE 26

Visual scores of human insulin formulations using Visual Assessment Scoring Method B following storage at 30° C.

| Glycerol (mM) | Sodium chloride (mM) | Dodecyl maltoside (% w/v) | 0 weeks | 2 weeks | 4 weeks |
|---|---|---|---|---|---|
| | 150 | 0.18 | 1 | 3 | 4 |
| | 150 | 0.005 | 1 | 1 | 1 |
| 174 | | 0.18 | 1 | 3 | 4 |
| 174 | | 0.005 | 1 | 1 | 2 |

Throughout the specification and the claims which follow, unless the context requires otherwise, the word ‘comprise’, and variations such as ‘comprises’ and ‘comprising’, will be understood to imply the inclusion of a stated integer, step, group of integers or group of steps but not to the exclusion of any other integer, step, group of integers or group of steps.

The term “and/or” as used in a phrase such as “A and/or B” herein is intended to include both A and B; A or B; A (alone); and B (alone). Likewise, the term “and/or” as used in a phrase such as “A, B, and/or C” is intended to encompass each of the following embodiments: A, B, and C; A, B, or C; A or C; A or B; B or C; A and C; A and B; B and C; A (alone); B (alone); and C (alone).

All publications, patents, patent applications, internet sites, and accession numbers/database sequences (including both polynucleotide and polypeptide sequences) cited are herein incorporated by reference in their entirety for all purposes to the same extent as if each individual publication, patent, patent application, internet site, or accession number/database sequence were specifically and individually indicated to be so incorporated by reference.

SEQUENCE LISTING

```
SEQ ID NO: 1:    GIVEQCCTSICSLYQLENYCN
SEQ ID NO: 2:    FVNQHLCGSHLVEALYLVCGERGFFYTPKT
SEQ ID NO: 3:    FVNQHLCGSHLVEALYLVCGERGFFYTKPT
SEQ ID NO: 4:    FVNQHLCGSHLVEALYLVCGERGFFYTDKT
SEQ ID NO: 5:    FVKQHLCGSHLVEALYLVCGERGFFYTPET
```

What is claimed is:

1. An aqueous liquid pharmaceutical formulation comprising:

(i) an insulin compound selected from the group consisting of insulin lispro, insulin glulisine, insulin aspart, insulin glargine, and recombinant human insulin, at a concentration of 50-300 U/ml, (ii) ionic zinc at a concentration of 0.05-1%, by weight of zinc based on the weight of insulin compound in the formulation, (iii) a zinc binding species at a concentration of 1-60 mM and having a logK with respect to zinc ion binding in the range 4.5-12.3 at 25° C., (iv) an alkyl glycoside at a concentration of 10-200 μg/ml, and (v) a charged tonicity modifier at a concentration of 100-300 mM;

wherein the formulation concentration of the zinc binding species having a logK with respect to zinc ion binding of more than 12.3 at 25° C. is less than 0.1 mM; wherein the formulation pH is in the range 5.5 to 9.0; and wherein the formulation is for subcutaneous or intramuscular administration, but the formulation is not for administration by intranasal delivery.

2. The formulation according to claim 1, wherein the insulin compound is not insulin glargine.

3. The formulation according to claim 1, wherein the insulin compound is insulin lispro, insulin glulisine, or recombinant human insulin.

4. The formulation according to claim 1, wherein the insulin compound is insulin aspart.

5. The formulation according to claim 1, wherein the insulin compound is present at a concentration of 50-200 U/ml.

6. The formulation according to claim 1, wherein the ionic zinc is present at a concentration of 0.05-1%, by weight of zinc based on the weight of insulin compound in the formulation.

7. The formulation according to claim 1, wherein the zinc binding species having a logK with respect to zinc ion binding in the range 4.5-12.3 is selected from citrate, pyrophosphate, aspartate, glutamate, cysteine, cystine, glutathione, ethylenediamine, histidine, DETA and TETA.

8. The formulation according to claim 7, wherein the zinc binding species is citrate.

9. The formulation according to claim 8, wherein the source of the citrate is citric acid.

10. The formulation according to claim 1, wherein the zinc binding species having a logK with respect to zinc ion binding in the range 4.5-12.3 is present at a concentration of 1-50 mM; and/or wherein the molar ratio of ionic zinc to zinc binding species is 1:3 to 1:175.

11. The formulation according to claim 1, wherein the zinc binding species at a concentration of 1-60 mM has a logK with respect to zinc ion binding in the range 4.5-10 at 25° C.

12. The formulation according to claim 1, wherein the formulation concentration of zinc binding species having a logK with respect to zinc ion binding of 10-12.3 at 25° C. is less than 0.1 mM.

13. The formulation according to claim 1, wherein the alkyl glycoside is selected from the group: dodecyl maltoside, dodecyl glucoside, octyl glucoside, octyl maltoside, decyl glucoside, decyl maltoside, decyl glucopyranoside, tridecyl glucoside, tridecyl maltoside, tetradecyl glucoside, tetradecyl maltoside, hexadecyl glucoside, hexadecyl maltoside, sucrose monooctanoate, sucrose monodecanoate, sucrose monododecanoate, sucrose monotridecanoate, sucrose monotetradecanoate, and sucrose monohexadecanoate.

14. The formulation according to claim 13, wherein the alkyl glycoside is dodecyl maltoside or decyl glucopyranoside.

15. The formulation according to claim 14, wherein the alkyl glycoside is dodecyl maltoside.

16. The formulation according to claim 1, wherein the alkyl glycoside is present at a concentration of 20-200 μg/ml.

17. The formulation according to claim 16, wherein the alkyl glycoside is present at a concentration of 50-200 μg/ml.

18. The formulation according to claim 1, wherein the charged tonicity modifying agent is sodium chloride.

19. The formulation according to claim 18, wherein the sodium chloride is present at a concentration of 100-200 mM.

20. The formulation according to claim 18, wherein the sodium chloride is present at a concentration of 150 mM.

21. The formulation according to claim 1, wherein the osmolarity of the formulation is about 250 to about 500 mOsm/L.

22. The formulation according to claim 1, wherein the pH is in the range 7.0 to 7.5 or 7.6 to 8.0.

23. The formulation according to claim 22, which comprises a phosphate buffer.

24. The formulation according to claim 1, further comprising at least one preservative selected from the group: phenol, m-cresol, chlorocresol, benzyl alcohol, propylparaben, methylparaben, benzalkonium chloride, and benzethonium chloride.

25. The formulation according to claim 1, further comprising at least one of nicotinamide, nicotinic acid or a salt thereof, or treprostinil or a salt thereof.

26. The aqueous liquid pharmaceutical formulation according to claim 1, comprising:

(i) an insulin compound at a concentration of 50-300 U/ml, (ii) ionic zinc at a concentration of 0.05-1%, by weight of zinc based on the weight of insulin compound in the formulation, (iii) citrate as a zinc binding species at a concentration of 1-60 mM, and (iv) an alkylglycoside at a concentration of 20-200 μg/ml; and wherein the formulation concentration of EDTA and any other zinc binding species having a logK with respect to zinc ion binding of more than 12.3 at 25° C. is less than 0.1 mM.

27. The formulation according to claim 26, wherein the citrate is present in the formulation at a concentration of 10-30 mM.

28. The aqueous liquid pharmaceutical formulation according to claim 1 comprising:

(i) an insulin compound at a concentration of 100-200 U/ml, (ii) ionic zinc at a concentration of 0.05-1%, by weight of zinc based on the weight of insulin compound in the formulation, (iii) citrate as a zinc binding species at a concentration of 1-60 mM, (iv) the alkyl glycoside dodecyl maltoside at a concentration of 20-200 μg/ml; and (v) the charged tonicity modifier sodium chloride at a concentration of 100-200 mM; and wherein the formulation concentration of EDTA and any other zinc binding species having a logK with respect to zinc ion binding of more than 12.3 at 25° C. is less than 0.1 mM.

29. The formulation according to claim 28, wherein the citrate is present in the formulation at a concentration of 30-50 mM.

30. A method of treatment of diabetes mellitus which comprises administering to a subject in need thereof an effective amount of a formulation according to claim 1.

31. A container containing one dose or a plurality of doses of the formulation according to claim 1.

32. An injection device for single or multiple use comprising a container containing one dose or a plurality of doses of the formulation according to any one of claim 1 together with an injection needle.

33. A medical device comprising a reservoir comprising a plurality of doses of the formulation according to claim 1 and a pump adapted for automatic or remote operation such that upon automatic or remote operation one or more doses of the formulation is administered to the body.

34. A dry solid pharmaceutical composition suitable for reconstitution with an aqueous medium which comprises, following reconstitution, (i) an insulin compound at a concentration of 50-300 U/ml, wherein the insulin compound is selected from the group consisting of insulin lispro, insulin glulisine, insulin aspart, insulin glargine, and recombinant human insulin, (ii) ionic zinc at a concentration of 0.05-1%, by weight of zinc based on the weight of insulin compound in the formulation, (iii) a zinc binding species at a concentration of 1-60 mM and having a logK with respect to zinc ion binding in the range 4.5-12.3 at 25° C., and (iv) an alkyl glycoside at a concentration of 10-200 μg/ml and (v) a charged tonicity modifier at a concentration of 100-300 mM;

wherein the formulation concentration of the zinc binding species having a logK with respect to zinc ion binding of more than 12.3 at 25° C. is less than 0.1 mM; and wherein the formulation is for subcutaneous or intramuscular administration, but the formulation is not for administration by intranasal delivery.

35. A method of preparing a formulation which comprises dissolving the dry solid pharmaceutical composition according to claim 34 in an aqueous medium.

36. The composition according to claim 34, wherein the zinc binding species at a concentration of 1-60 mM has a logK with respect to zinc ion binding in the range 4.5-10 at 25° C.

37. The composition according to claim 34, wherein the formulation concentration of zinc binding species having a logK with respect to zinc ion binding of 10-12.3 at 25° C. is less than 0.1 mM.

38. The formulation according to claim 1, wherein the formulation does not contain a vasodilator, nicotinamide, nicotinic acid or a salt thereof.

39. The formulation according to claim 1, wherein the formulation further comprises an additional therapeutically active agent of use in the treatment of diabetes.

40. The formulation according to claim 39, wherein the additional active agent is an amylin analogue or a GLP-1 agonist.

41. The formulation according to claim 1, wherein the formulation is co-administered with a long acting insulin.

42. The composition according to claim 34, wherein the alkyl glycoside is present at a concentration of 20-200 μg/ml.

43. The composition according to claim 34, wherein the alkyl glycoside is present at a concentration of 50-200 μg/ml.

44. The formulation according to claim 1, wherein the formulation is for subcutaneous subcutaneous administration.

45. The formulation according to claim 1, wherein the formulation is for intramuscular administration.

46. The aqueous liquid pharmaceutical formulation according to claim 26, wherein the insulin composition is at a concentration of 100-200 U/ml.

47. The aqueous liquid pharmaceutical formulation according to claim 26, wherein the insulin composition is at a concentration of 100 or 200 U/ml.

48. The aqueous liquid pharmaceutical formulation according to claim 26, wherein the formulation comprises sodium chloride at a concentration of 100-200 mM.

49. The aqueous liquid pharmaceutical formulation according to claim 46, wherein the formulation comprises sodium chloride at a concentration of 100-200 mM.

50. The aqueous liquid pharmaceutical formulation according to claim 28, wherein the insulin composition is at a concentration of 100-200 U/ml.

51. The aqueous liquid pharmaceutical formulation according to claim 28, wherein the insulin composition is at a concentration of 100 or 200 U/ml.

* * * * *

```
                    SEQUENCE LISTING

<160> NUMBER OF SEQ ID NOS: 5

<210> SEQ ID NO 1
<211> LENGTH: 21
<212> TYPE: PRT
<213> ORGANISM: Homo sapiens

<400> SEQUENCE: 1

Gly Ile Val Glu Gln Cys Cys Thr Ser Ile Cys Ser Leu Tyr Gln Leu
1               5                   10                  15

Glu Asn Tyr Cys Asn
            20


<210> SEQ ID NO 2
<211> LENGTH: 30
<212> TYPE: PRT
<213> ORGANISM: Homo sapiens
```

-continued

```
<400> SEQUENCE: 2

Phe Val Asn Gln His Leu Cys Gly Ser His Leu Val Glu Ala Leu Tyr
1               5                   10                  15

Leu Val Cys Gly Glu Arg Gly Phe Phe Tyr Thr Pro Lys Thr
            20                  25                  30


<210> SEQ ID NO 3
<211> LENGTH: 30
<212> TYPE: PRT
<213> ORGANISM: Artificial sequence
<220> FEATURE:
<223> OTHER INFORMATION: B chain of insulin lispro

<400> SEQUENCE: 3

Phe Val Asn Gln His Leu Cys Gly Ser His Leu Val Glu Ala Leu Tyr
1               5                   10                  15

Leu Val Cys Gly Glu Arg Gly Phe Phe Tyr Thr Lys Pro Thr
            20                  25                  30


<210> SEQ ID NO 4
<211> LENGTH: 30
<212> TYPE: PRT
<213> ORGANISM: Artificial sequence
<220> FEATURE:
<223> OTHER INFORMATION: B chain of insulin aspart

<400> SEQUENCE: 4

Phe Val Asn Gln His Leu Cys Gly Ser His Leu Val Glu Ala Leu Tyr
1               5                   10                  15

Leu Val Cys Gly Glu Arg Gly Phe Phe Tyr Thr Asp Lys Thr
            20                  25                  30


<210> SEQ ID NO 5
<211> LENGTH: 30
<212> TYPE: PRT
<213> ORGANISM: Artificial sequence
<220> FEATURE:
<223> OTHER INFORMATION: B chain of insulin glulisine

<400> SEQUENCE: 5

Phe Val Lys Gln His Leu Cys Gly Ser His Leu Val Glu Ala Leu Tyr
1               5                   10                  15

Leu Val Cys Gly Glu Arg Gly Phe Phe Tyr Thr Pro Glu Thr
            20                  25                  30
```